United States Patent
Kerton

(10) Patent No.: US 12,416,285 B2
(45) Date of Patent: Sep. 16, 2025

(54) VENTURI DEVICE WITH FORCED INDUCTION SYSTEMS AND METHODS

(71) Applicant: Zero Nox, Inc., Porterville, CA (US)

(72) Inventor: James Matthew Kerton, Duncan (CA)

(73) Assignee: Zero Nox, Inc., Porterville, CA (US)

( * ) Notice: Subject to any disclaimer, the term of this patent is extended or adjusted under 35 U.S.C. 154(b) by 0 days.

(21) Appl. No.: 18/719,465

(22) PCT Filed: Dec. 14, 2022

(86) PCT No.: PCT/US2022/081602
§ 371 (c)(1),
(2) Date: Jun. 13, 2024

(87) PCT Pub. No.: WO2023/114879
PCT Pub. Date: Jun. 22, 2023

(65) Prior Publication Data
US 2025/0237188 A1    Jul. 24, 2025

Related U.S. Application Data

(63) Continuation-in-part of application No. PCT/US2022/050797, filed on Nov. 22, 2022, and a
(Continued)

(51) Int. Cl.
*F03B 13/00* (2006.01)
*F03G 6/02* (2006.01)
*F24V 99/00* (2018.01)

(52) U.S. Cl.
CPC .............. *F03B 13/00* (2013.01); *F03G 6/02* (2013.01); *F24V 99/00* (2018.05)

(58) Field of Classification Search
CPC ............. F03B 13/00; F24V 99/00; F03G 6/02
See application file for complete search history.

(56) References Cited

U.S. PATENT DOCUMENTS

| | | |
|---|---|---|
| 1,626,487 A | 4/1927 | Warren |
| 2,396,290 A | 3/1946 | Schwarz |
| (Continued) | | |

FOREIGN PATENT DOCUMENTS

| | | |
|---|---|---|
| CN | 106532178 A | 3/2017 |
| CN | 114243848 A | 3/2022 |
| (Continued) | | |

OTHER PUBLICATIONS

European Extended Search Report, re EP Application No. 22796580.3, dated Dec. 19, 2024.
(Continued)

*Primary Examiner* — Viet P Nguyen
(74) *Attorney, Agent, or Firm* — Knobbe, Martens Olson & Bear, LLP

(57) ABSTRACT

A Venturi device with a primary flow path and a secondary flow path introduced into the primary flow path, wherein a flow of one or more flowable mediums in the primary flow path and the secondary flow path creates a vortex generating a suction at an inlet of the Venturi device. A hydropower system for converting potential energy of a fluid into electrical energy utilize an upper reservoir and a lower reservoir containing the fluid. A system can be used for converting ambient thermal energy into electrical energy. The system can include a fluid loop to circulate a primary flow of a fluid. A forced induction system for a vehicle to induce ambient airflow can be used to generate electrical energy from the ambient airflow. A cooling system can cool a motor of a vehicle with ambient airflow.

20 Claims, 21 Drawing Sheets

Related U.S. Application Data continuation-in-part of application No. PCT/US2022/026399, filed on Apr. 26, 2022, which is a continuation-in-part of application No. PCT/IB2021/000237, filed on Apr. 27, 2021.

(60) Provisional application No. 63/381,905, filed on Nov. 1, 2022, provisional application No. 63/381,906, filed on Nov. 1, 2022, provisional application No. 63/268,053, filed on Feb. 15, 2022, provisional application No. 63/265,483, filed on Dec. 15, 2021, provisional application No. 63/265,484, filed on Dec. 15, 2021, provisional application No. 63/265,486, filed on Dec. 15, 2021, provisional application No. 63/265,489, filed on Dec. 15, 2021, provisional application No. 63/265,478, filed on Dec. 15, 2021, provisional application No. 63/282,556, filed on Nov. 23, 2021.

(56) References Cited

U.S. PATENT DOCUMENTS

| | | | |
|---|---|---|---|
| 4,372,113 A * | 2/1983 | Ramer | F03B 1/00 417/169 |
| 4,443,707 A | 4/1984 | Scieri et al. | |
| 6,267,106 B1 | 7/2001 | Feucht | |
| 6,886,545 B1 | 5/2005 | Holm | |
| 7,032,578 B2 | 4/2006 | Liu et al. | |
| 8,056,340 B2 | 11/2011 | Vaught et al. | |
| 8,664,781 B2 | 3/2014 | Alvi | |
| 8,807,458 B2 | 8/2014 | Al-Ansary | |
| 9,564,664 B2 | 2/2017 | Tanigaki et al. | |
| 9,567,856 B2 | 2/2017 | Faller | |
| 9,827,872 B1 | 11/2017 | Sloan et al. | |
| 10,625,868 B2 | 4/2020 | Dasilva et al. | |
| 2004/0173192 A1 | 9/2004 | Sorter et al. | |
| 2009/0075160 A1 | 3/2009 | Tezuka et al. | |
| 2009/0183858 A1 | 7/2009 | Williams et al. | |
| 2009/0205745 A1 | 8/2009 | Farese et al. | |
| 2010/0276517 A1 | 11/2010 | Alansary | |
| 2013/0298532 A1 | 11/2013 | Hamad et al. | |
| 2013/0333354 A1 | 12/2013 | Hamad | |
| 2014/0056687 A1 | 2/2014 | Younes et al. | |
| 2014/0292283 A1 | 10/2014 | Timmons et al. | |
| 2016/0153404 A1 | 6/2016 | Paolo | |
| 2016/0319778 A1 | 11/2016 | Shuto et al. | |
| 2016/0369674 A1 | 12/2016 | Younes et al. | |
| 2017/0074213 A1 | 3/2017 | Hamad et al. | |
| 2017/0373511 A1 | 12/2017 | Jo | |
| 2018/0016017 A1 | 1/2018 | Dasilva et al. | |
| 2019/0085758 A1 | 3/2019 | Kurtz | |
| 2019/0097434 A1 | 3/2019 | Kim | |
| 2019/0120106 A1 | 4/2019 | Hamad | |
| 2019/0198945 A1 | 6/2019 | Machida et al. | |
| 2019/0288527 A1 | 9/2019 | Jaensch et al. | |
| 2020/0171975 A1 | 6/2020 | Ueda et al. | |
| 2020/0256266 A1 | 8/2020 | Mastbergen et al. | |
| 2020/0325861 A1 | 10/2020 | Voice et al. | |
| 2021/0135461 A1 | 5/2021 | Wang et al. | |
| 2021/0206290 A1 | 7/2021 | Li et al. | |
| 2022/0126724 A1 | 4/2022 | O'Connor et al. | |
| 2022/0140620 A1 | 5/2022 | Kang et al. | |
| 2024/0191650 A1 | 6/2024 | Kerton | |
| 2024/0350989 A1 | 10/2024 | Kerton | |

FOREIGN PATENT DOCUMENTS

| | | |
|---|---|---|
| EP | 2093475 A1 | 8/2009 |
| EP | 3093475 A1 | 11/2016 |
| EP | 3037300 B1 | 12/2019 |
| EP | 3895933 A1 | 10/2021 |
| GB | 0552747 A | 4/1943 |
| GB | 2516612 A | 2/2015 |
| JP | 5760097 B2 | 8/2015 |
| JP | 5841294 B2 | 1/2016 |
| JP | 6267375 B2 | 1/2018 |
| JP | 6325516 B2 | 5/2018 |
| JP | 6763889 B2 | 9/2020 |
| JP | 2021-522440 A | 8/2021 |
| JP | 7033200 B2 | 3/2022 |
| WO | 2008/136641 A1 | 11/2008 |
| WO | 2012/071632 A1 | 6/2012 |
| WO | 2012/100149 A1 | 7/2012 |
| WO | 2013/142469 A1 | 9/2013 |
| WO | 2014/031996 A1 | 2/2014 |
| WO | 2016/205057 A1 | 12/2016 |
| WO | 2019/079531 A1 | 4/2019 |
| WO | 2019/209542 A1 | 10/2019 |
| WO | 2022/026399 A1 | 2/2022 |
| WO | 2022/232182 A1 | 11/2022 |
| WO | 2023/096938 A1 | 6/2023 |
| WO | 2023/114873 A1 | 6/2023 |
| WO | 2023/114879 A1 | 6/2023 |
| WO | 2023/215526 A1 | 11/2023 |

OTHER PUBLICATIONS

International Preliminary Report on Patentability and Written Opinion, dated Oct. 24, 2023; in International Application No. PCT/US2022/026399, filed Apr. 26, 2022; in 12 pages.

International Search Report and Written Opinion, re PCT Application No. PCT/US2022/081594, mailed Apr. 5, 2023.

International Search Report and Written Opinion, re PCT Application No. PCT/US2022/50797, dated Mar. 28, 2023.

International Search Report and Written Opinion, re PCT Application No. PCT/US2022/81602, dated Apr. 3, 2023.

International Search Report and Written Opinion, re PCT Application No. PCT/US2023/021077, mailed Jul. 31, 2023.

International Search Report/Written Opinion dated Aug. 11, 2022; in International Application No. PCT/US2022/026399, filed Apr. 26, 2022; in 15 pages.

* cited by examiner

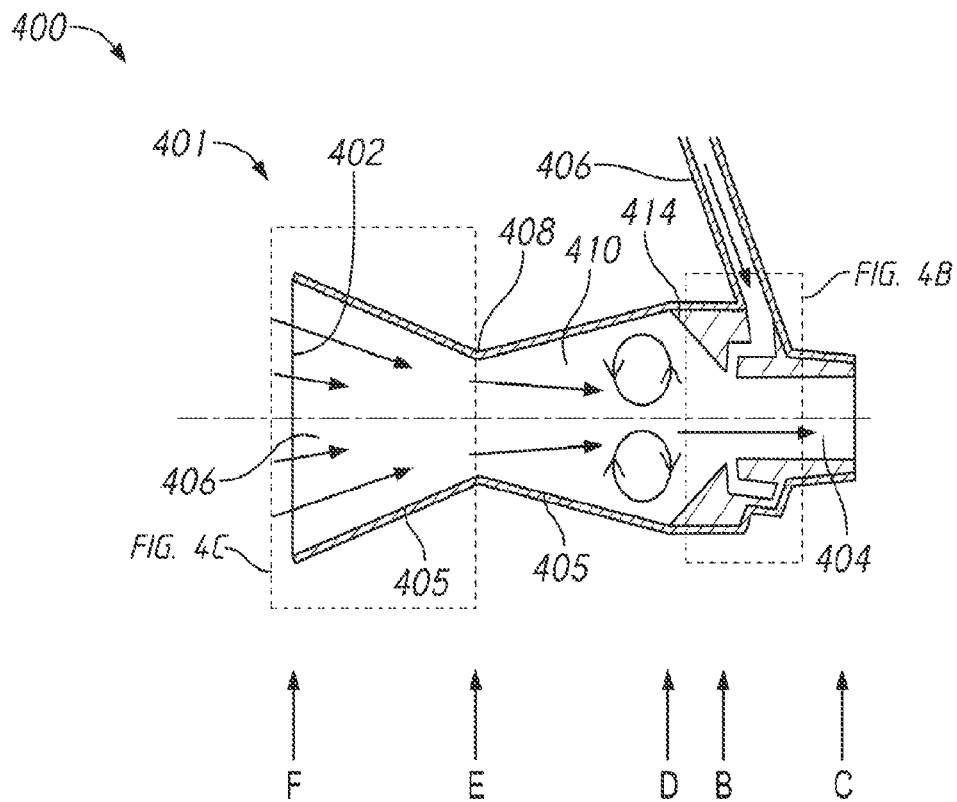
FIG. 4A
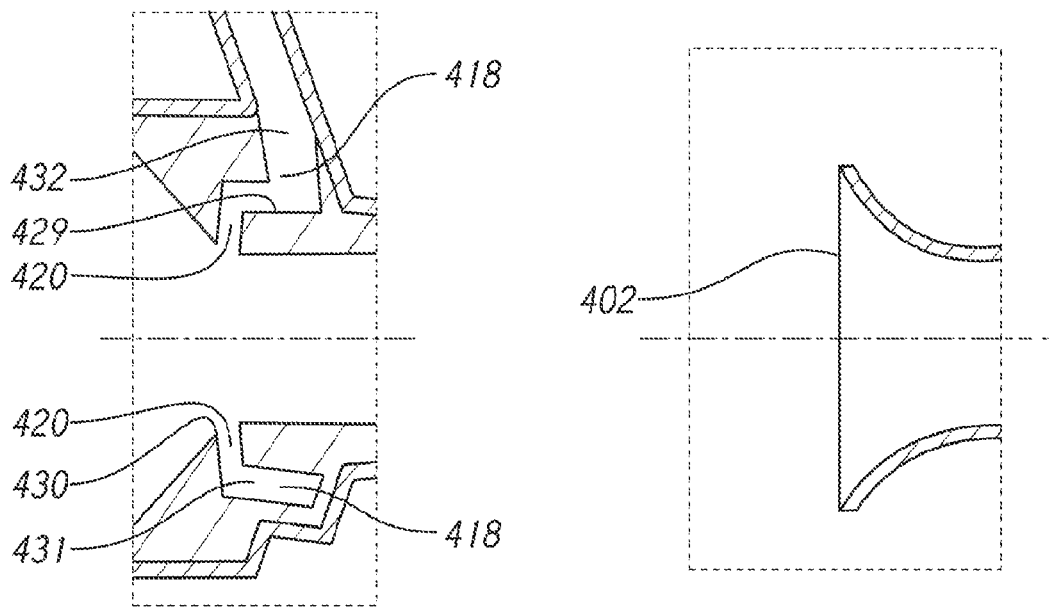
FIG. 4B
FIG. 4C

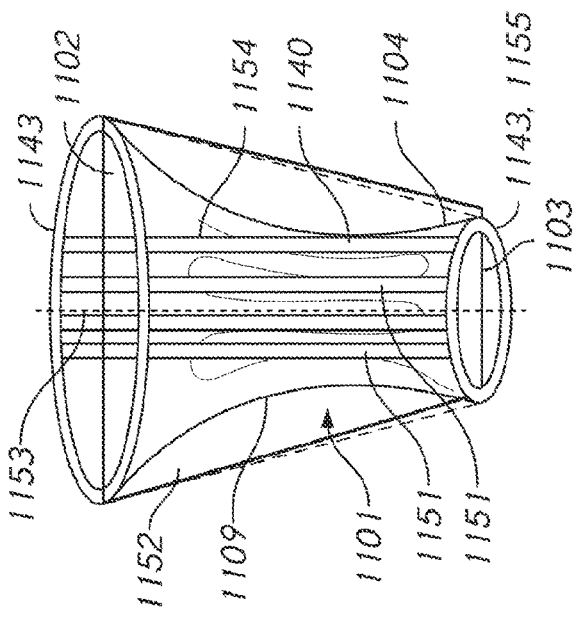
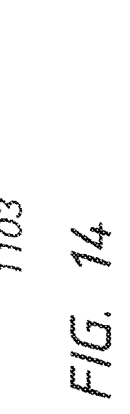
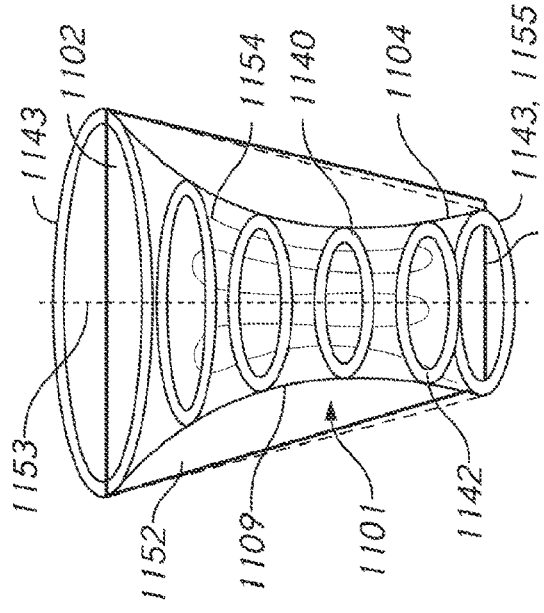
FIG. 12
FIG. 13
FIG. 14

VENTURI DEVICE WITH FORCED INDUCTION SYSTEMS AND METHODS

INCORPORATION BY REFERENCE

This application claims priority to U.S. Provisional Application No. 63/265,478, filed Dec. 15, 2021, entitled "VENTURI THERMAL ENERGY CONVERSION SYSTEM," U.S. Provisional Application No. 63/265,483, filed Dec. 15, 2021, entitled "NPR HYDRO TURBINE SYSTEM," U.S. Provisional Application No. 63/265,489, filed Dec. 15, 2021, entitled "PHASE SHIFTING THERMAL ENERGY CONVERSION SYSTEM," U.S. Provisional Application No. 63/265,484, filed Dec. 15, 2021, entitled "NPR MOTOR COOLING SYSTEM," U.S. Provisional Application No. 63/265,486, filed Dec. 15, 2021, entitled "NPR FORCED INDUCTION CHARGING AND HEATING SYSTEM," U.S. Provisional Application No. 63/268,053, filed Feb. 15, 2022, entitled "STEALTH ORDNANCE THRUSTER," U.S. Provisional Application No. 63/381,905, filed Nov. 1, 2022, entitled "VENTURI DEVICE WITH FORCED INDUCTION," U.S. Provisional Application No. 63/381,906, filed Nov. 1, 2022, entitled "VENTURI DEVICE WITH FORCED INDUCTION," International Patent Application No. PCT/US2022/026399, filed Apr. 26, 2022, entitled "VENTURI DEVICE WITH FORCED INDUCTION," which claims priority to International Patent Application No. PCT/IB2021/000237, filed Apr. 27, 2021, entitled "HYBRID HYDRO-AERODYNAMIC FORCED INDUCTION SYSTEM," and International Patent Application No. PCT/US2022/050797, filed Nov. 22, 2022, entitled "VENTURI DEVICE WITH FORCED INDUCTION SYSTEMS AND METHODS," which claims priority to U.S. Provisional Application No. 63/282,556, filed Nov. 23, 2021, entitled "PARTICULATE BURNER," each of which is hereby incorporated by in its entirety herein and made part of this disclosure. Related German Application Nos. DE 102019003025.7, filed Apr. 26, 2019, and DE 102019006055.5, filed Sep. 4, 2019, each of which is hereby incorporated by reference in its entireties herein and made part of this disclosure. Any and all applications for which a foreign or domestic priority claim is identified in the Application Data Sheet as filed with the present application are hereby incorporated by reference under 37 CFR 1.57.

FIELD

This disclosure relates to Venturi devices, related devices, and applications thereof.

BACKGROUND

The demand for cleaner energy use and fluid mechanics has increased dramatically over the past century. Accordingly, a way to better use or generate cleaner energy is needed.

SUMMARY

Neither the preceding summary nor the following detailed description purports to limit or define the scope of protection. The scope of protection is defined by the claims.

As the demand for energy increases, the demand to harvest energy from untapped or under-exploited sources has increased as well, especially those sources readily available. Accordingly, various devices and systems are disclosed herein that address one or more of these problems. For example, devices and systems are disclosed herein that incorporate a Venturi device with forced induction to convert potential energy of a fluid into electrical energy.

A hydropower system for converting potential energy of a fluid into electrical energy utilize an upper reservoir containing a fluid and a lower reservoir containing the fluid, where the lower reservoir positioned at a lower elevation relative to the upper reservoir such that the fluid flows from the upper reservoir to the lower reservoir via gravity. A fluid loop can circulate a primary flow of the fluid between the upper reservoir and the lower reservoir with a turbine disposed on the fluid loop to be driven by the primary flow from the upper reservoir to the lower reservoir. The turbine can then drive a generator to generate electrical energy. A pump on the fluid loop can pump the primary flow from the lower reservoir to the upper reservoir after the fluid has flows from the top to the bottom reservoir. A first Venturi device downstream of the upper reservoir and upstream of the turbine and second Venturi device Venturi device downstream of the lower reservoir and upstream of the pump can suction in the primary flow of fluid.

A system can be used for converting ambient thermal energy into electrical energy. The system can include a fluid loop to circulate a primary flow of a fluid. The primary flow can drive a turbine disposed on the fluid loop which then drives a generator that generates electrical energy. A first pump on the fluid loop can propel the primary flow through the fluid loop. A cooling coil downstream of the turbine and upstream of the first pump on the fluid loop condenses the primary flow exiting the turbine. A first Venturi device downstream of the first pump and upstream of the turbine on the fluid loop and a second Venturi device downstream of the turbine and upstream of the first pump on the fluid loop can pull the primary flow. A reservoir tank on the fluid looo can contain the fluid flowing through the fluid loop with a first conduit connected to the reservoir tank and the secondary input of the first Venturi device to direct the secondary flow from the primary flow to the secondary input of the first Venturi device. A second pump on the first conduit can drive the secondary flow from the primary flow to the secondary input of the first Venturi device. A heater downstream of the second pump on the first conduit can heat the secondary flow of the first Venturi device such that the secondary flow phase shifts from a liquid state to a gas state.

A Venturi device having an inlet can receive a primary flow of a fluid and an outlet to eject said flow. A body between the inlet and the outlet can include a converging portion and a diverging portion where a Venturi effect pulls the primary flow in through the inlet and which exits through a reducer. A first nozzle partially in the diverging portion forms a first annular space to create a first low pressure fluid in the first annular space relative to a high-pressure fluid flow of the primary flow flowing through the first nozzle to pull the primary flow through the inlet and into the body. A reduction in the high-pressure fluid flow of the primary flow through the first nozzle causes the first low pressure fluid to partially exit the first annular space for the first low pressure fluid to flow toward the outlet. A second nozzle partially in the reducer forms a second annular space between the second nozzle and the body wall and creates a second low pressure fluid in the second annular space relative to the high-pressure fluid flow of the primary flow flowing through the second nozzle to move the primary flow through the outlet. The reduction in the high-pressure fluid flow of the primary flow through the second nozzle causes the second low pressure fluid to partially exit the second annular space for the second low pressure fluid to flow toward the outlet.

The second annular space can be larger than the first annular space. An end of the second nozzle can be spaced axially inward from an end of the reducer such that the end of the reducer partially forms the outlet. A secondary input between the converging portion and the outlet can direct a secondary flow of the fluid into the primary flow to create a vortex that pulls the primary flow through the inlet and into the body.

A forced induction system for a vehicle to induce ambient airflow can be used to generate electrical energy from the ambient airflow. The system can use an intake funnel having an inlet, an outlet, and a body between the inlet and the outlet to direct an ambient airflow. The inlet of the intake funnel has a cross-sectional flow area larger than a cross-section flow area of the outlet of the intake funnel and the body has a shape changing portion that expands or contracts to change a cross-sectional flow area of the body of the intake funnel for the ambient airflow. A Venturi device connected to the intake funnel has an inlet connected to the outlet of the intake funnel to receive a primary flow of ambient air exiting the outlet of the intake funnel. An outlet of the Venturi device can eject the primary flow. A body of the Venturi device between the inlet and outlet of the Venturi device includes a converging portion and a diverging portion which produces a Venturi effect to pull the primary flow through the inlet of the Venturi device. A secondary input between the converging portion and the outlet that can direct a secondary flow of fluid into the primary flow to create a vortex for producing a suction at the inlet of the Venturi device. A turbine can receive the primary flow from the Venturi device. A generator can then be connected to the turbine which then generates electrical energy. A bypass conduit can recirculate the secondary flow from the primary flow flowing through the turbine to the secondary input of the Venturi device. A passenger cabin duct can be connected to the outlet of the turbine to receive the primary flow from the outlet and direct the primary flow toward a passenger cabin of a vehicle. A valve can control the primary flow coming from the turbine. A bypass duct connected to the valve can direct the primary flow outside of the vehicle.

A cooling system can cool a motor of a vehicle with ambient airflow. A Venturi device open to ambient air has an inlet connected to the outlet of the intake funnel to receive a primary flow of ambient air exiting the outlet of the intake funnel. An outlet of the Venturi device can eject the primary flow. A body of the Venturi device between the inlet and outlet of the Venturi device includes a converging portion and a diverging portion which produces a Venturi effect to pull the primary flow through the inlet of the Venturi device. A secondary input between the converging portion and the outlet that can direct a secondary flow of fluid into the primary flow to create a vortex for producing a suction at the inlet of the Venturi device. An air compressor can compress ambient air and direct the compressed air into the secondary input of the Venturi device to provide the secondary flow. A cooling duct can be connected to the outlet of the Venturi device and receive the primary flow ejected from the outlet of the Venturi device. The cooling duct can direct the primary flow to a motor of a vehicle to cool the motor and utilize fins to direct the primary flow to the warmest parts of the motor.

BRIEF DESCRIPTION OF THE DRAWINGS

The abovementioned and other features of the embodiments disclosed herein are described below with reference to the drawings of the embodiments. The illustrated embodiments are intended to illustrate, but not to limit, the scope of protection. Various features of the different disclosed embodiments can be combined to form further embodiments, which are part of this disclosure. In the drawings, similar elements may have reference numerals with the same last two digits.

FIGS. 4A-4D illustrate a section view of a configuration of an example Venturi device.

FIGS. 12-14 illustrate different configurations of an intake funnel of the forced induction system of FIG. 11.

DETAILED DESCRIPTION

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below. Furthermore, this disclosure describes many embodiments in reference to power generation or phase shifting but any embodiment and modifications or equivalents thereof should not be limited to the foregoing.

According to the 1st Theorem of Thermodynamics, energy can neither be generated nor consumed. It can only be transformed in its form, that is, from one form of energy into another form. For this reason, the total energy in a closed system remains constant.

There are differences in valence between the forms of energy. Thus, as a possible form of energy, heat can never flow without action, that is to say, from a body of lesser temperature to a body of higher temperature, although the total amount of energy stored in the bodies in the form of heat may be equal. In the opposite direction, this is quite possible and inevitable, that is, the transition of heat from the warmer to the colder body takes place spontaneously and automatically (2nd Theorem of Thermodynamics). The heat in the warmer body is thus of higher value than the heat in the colder body. This heat can at least be partially converted into mechanical energy in heat engines, in which this automatic flow of heat from the warmer body to the colder body is exploited. The proportion of the mechanical energy which can be obtained can be shown by way of a ratio of the two temperatures according to the formula below.

$$Anteil_{Mech} = \frac{T_{warm} - T_{cold}}{T_{warm}}$$

This proportion can be referred to as the efficiency of the Carnot process.

As disclosed herein, thermal energy can be converted into mechanical energy by suctioning mechanisms. Described herein are systems and devices for converting low-grade thermal energy (e.g., ambient temperature) into high-quality energy (electricity). For example, Venturi devices are described herein that form one or more flow-induced vortices within a fluid (e.g., air, water, gas, etc.) flowing through the Venturi devices. The one or more vortices can occur at a location within the Venturi device where a secondary fluid flow merges (e.g., mixes, fuses) with a primary fluid flow through the Venturi device. The one or more vortices can form a suction, sucking the primary flow into the Venturi device through an inlet. In some configurations, the suction and the Venturi effect, created by the flow of fluid through the Venturi device, can lower a temperature of the primary flow through at least a portion of the Venturi device, causing thermal energy in an ambient environment outside the Venturi device to be transferred to the primary flow (e.g., charging the primary flow).

Venturi Device with Forced Induction

Figure 1A:
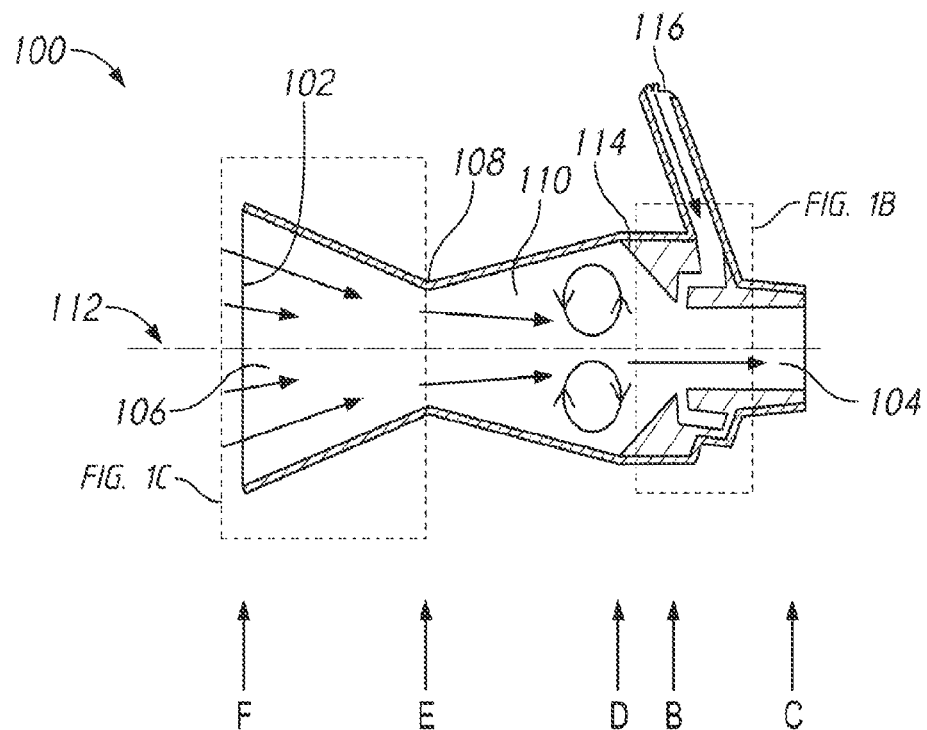
FIGS. 1A-1C illustrate a section view of an example Venturi device.
Figures 1B, 1C:
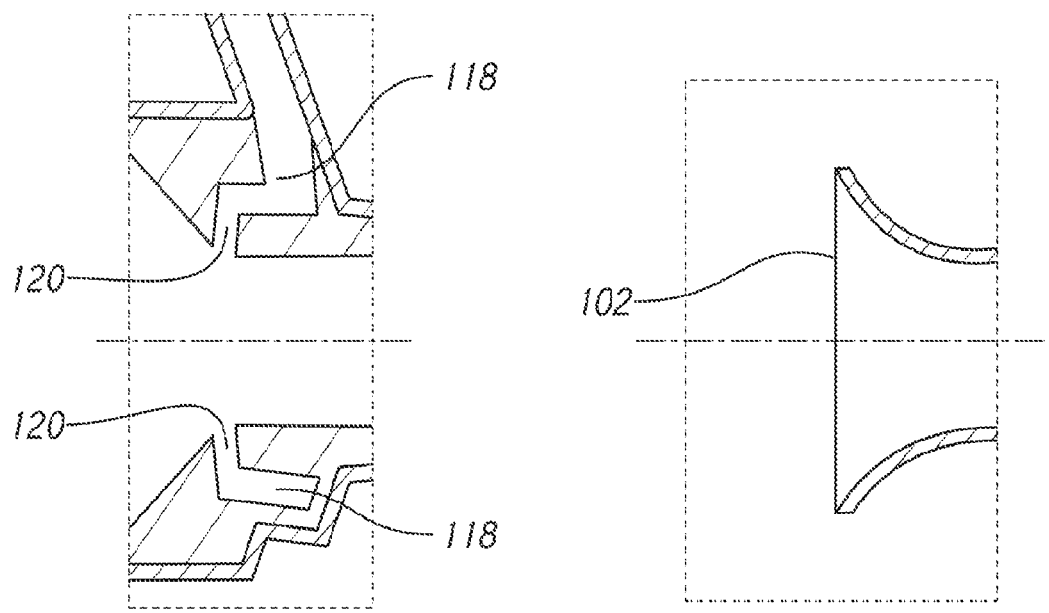

FIGS. 1A-1C illustrates a section view of an example Venturi device 100, which can also be referred to as a vortex fusion charger or VFC. The Venturi device 100 can, in some configurations, include a rotationally symmetrical inner periphery, which can include rotational symmetry about the central axis 112. The Venturi device 100 can be a tubular structure. The inner periphery of the Venturi device 100 can define primary flow path, which can be an inner region, cavity, lumen, etc., that receives a primary flow of a fluid (e.g., water, gas, air, exhaust gases, etc.). In some configurations, the inner periphery of the Venturi device 100 can be a circular shape. In some variations, the inner periphery may be other shapes, such as an oval, polygon, irregular, and/or others. The inner periphery may define a flow path for the primary flow of the fluid in the direction of the arrows in FIGS. 1A-1C. The inner periphery of the Venturi device 100 can define cross-sectional flow areas for the primary flow of fluid, which can be circular. The inner periphery can change such that the cross-sectional flow areas change in size and/or shape along a length of the Venturi device 100. For example, the inner periphery of the Venturi device 100 can include an inner diameter that assumes different sizes along its length or central axis 112.

The primary flow of fluid can enter the Venturi device 100 through the inlet 102. The inlet 102 can be connected to a conduit (e.g., tube) that can circulate the primary flow. In some variants, the inlet 102 can be open to the ambient air. An inner periphery of the inlet 102 can be circular. In some variants, the inner periphery of the inlet 102 can be oval, polygonal, irregular, and/or others. The inlet 102 can, as shown in FIG. 1B, include a velocity stack, trumpet shape, and/or air horn shape. The inlet 102 can include an inner periphery that converges. The inlet 102 can include cross-sectional flow area that converges. The inlet 102 can include an inner periphery that decreases in size in the direction of flow of the primary flow. The inlet 102 can include an inner periphery that continuously decreases in size in the direction of flow of the primary flow. The inlet 102 can include cross-sectional flow areas that that decrease in size in the direction of flow of the primary flow. The inlet 102 can include cross-sectional flow areas that continuously decreases in size in the direction of flow of the primary flow. The inlet 102 can include a curved peripheral wall, as shown in FIG. 1B. The inner periphery of the inlet 102 can converge. The inlet 102 can increase the velocity of the primary flow through the inlet 102, decreasing a pressure of the primary flow.

The primary flow of fluid can exit the Venturi device 100 through the outlet 104. The outlet 104 can be disposed on an opposing side of the Venturi device 100 as the inlet 102. The outlet 104 can be connected to a conduit (e.g., tube) that can circulate the primary flow. In some variants, the outlet 104 can be disconnected from another component, as described herein. An inner periphery of the outlet 104 can be circular. In some variants, the inner periphery of the outlet 104 can be oval, polygonal, irregular, and/or others. The inner periphery of the outlet 104 can diverge. A cross-sectional flow area of the outlet 104 can diverge in the direction of flow of the primary flow. The inner periphery of the outlet 104 can increase in size in the direction of flow of the primary flow. The inner periphery of the outlet 104 can continuously increase in size in the direction of flow of the primary flow. The outlet 104 can include cross-sectional flow areas that increase in size in the direction of flow of the primary flow. The outlet 104 can include cross-sectional flow areas that continuously increase in size in the direction of flow of the primary flow. The inner periphery of the outlet 104 can diverge. The outlet 104 can decrease the velocity of the primary flow through the outlet 104, increasing a pressure of the primary flow.

The Venturi device 100 can include a body (e.g., tubular body) between the inlet 102 and the outlet 104. The primary flow path can flow through the body between the inlet 102 and the outlet 104. The body can include a converging portion 106. The converging portion 106 can increase the velocity of the primary fluid flowing through the converging portion 106. The converging portion 106 can decrease the pressure of the primary fluid flowing through the converging portion 106. An inner periphery of the converging portion 106 can be circular. In some variants, the inner periphery of the converging portion 106 can be oval, polygonal, irregular, and/or others. The converging portion 106 can include an inner periphery that converges. The converging portion 106 can include a cross-sectional flow area that converges. The converging portion 106 can include an inner periphery that decreases in size in the direction of flow of the primary flow. The converging portion 106 can include an inner periphery that continuously decreases in size in the direction of flow of the primary flow. The converging portion 106 can include cross-sectional flow areas that that decrease in size in the direction of flow of the primary flow. The converging portion 106 can include cross-sectional flow areas that continuously decreases in size in the direction of flow of the primary flow. The converging portion 106 can include a flow area having the shape of a cone. The cross-sectional flow area of the converging portion 106 can decrease at a consistent rate. A temperature of the primary flow flowing through the converging portion 106 can decrease as a result of the increased velocity and decreased pressure.

The body of the Venturi device 100 can include a throat 108, which can also be referred to as a constriction. The throat 108 can be disposed between the converging portion 106 and a diverging portion 110. The throat 108 can include an inner periphery that is smaller than that of the converging portion 106 and the diverging portion 110. For example, the throat 108 can include a diameter that is smaller than a diameter of the converging portion 106 and the diverging portion 110. The throat 108 can include a cross-sectional flow area that is smaller than that of the converging portion 106 and the diverging portion 110. In some configurations, the throat 108 can be the junction of the converging portion 106 and the diverging portion 110. In some configurations, the throat 108 includes a length. In some configurations, the inner periphery of the throat 108 is an inflection point between the converging portion 106 and the diverging portion 110. In some variants, the converging portion 106 converges to the throat 108 and immediately diverges to the diverging portion 110.

The body of the Venturi device 100 can include a diverging portion 110. The diverging portion 110 can be downstream of the inlet 102 and converging portion 106. The diverging portion 110 can be downstream of the throat 108. The diverging portion 110 can be disposed between the converging portion 106 and the outlet 104, second converging portion 114, and/or secondary input 120. The diverging portion 110 can decrease the velocity of the primary fluid flowing through the diverging portion 110. The diverging portion 110 can increase the pressure of the primary fluid flowing through the diverging portion 110. An inner periphery of the diverging portion 110 can be circular. In some variants, the inner periphery of the diverging portion 110 can be oval, polygonal, irregular, and/or others. The diverging portion 110 can include an inner periphery that diverges. The diverging portion 110 can include a cross-sectional flow area that diverges. The diverging portion 110 can include an inner periphery that increases in size in the direction of flow of the primary flow. The diverging portion 110 can include an inner periphery that continuously increases in size in the direction of flow of the primary flow. The diverging portion 110 can include cross-sectional flow areas that that increase in size in the direction of flow of the primary flow. The diverging portion 110 can include cross-sectional flow areas that continuously increases in size in the direction of flow of the primary flow. The diverging portion 110 can include a flow area having the shape of a cone. The cross-sectional flow area of the diverging portion 110 can decrease at a consistent rate. The diverging portion 110 can be longer than the converging portion 106. The size of the cross-sectional flow area of the converging portion 106 can change more rapidly than the size of the cross-sectional flow area of the diverging portion 110 per a unit of length. The angle of the periphery of the converging portion 106 relative to the central axis 112 and/or direction of flow of the primary flow can be larger than the angle of the periphery of the diverging portion 110 relative to the central axis 112 and/or direction of flow of the primary flow.

The flow of the primary flow through the converging portion 106, throat 108, and/or diverging portion 110 can produce a Venturi effect, which can create a suction at the inlet 102. The flow of the primary flow through the converging portion 106 and throat 108 can produce a Venturi effect, which can create a suction at the inlet 102. The flow of the primary flow through the converging portion 106 can produce a Venturi effect, which can create a suction at the inlet 102. The increase in the velocity and decrease in pressure of the primary flow through the converging portion 106 and/or throat 108 can decrease a temperature of the primary flow such that thermal energy (e.g., heat) from the ambient environment outside the body of the Venturi device 100 is transferred to the primary flow. In some variants, the body of the Venturi device 100 or at least the converging portion 106 and/or throat 108 can include a conductive material (such as a metal) to facilitate efficient transfer of thermal energy through the body.

The body of the Venturi device 100 can include a second converging portion 114. The second converging portion 114 can be downstream of the inlet 102, converging portion 106, throat 108, and diverging portion 110. The second converging portion 114 can be disposed between the diverging portion 110 and the secondary input 120 and the outlet 104. The second converging portion 114 can increase the velocity of the primary flow flowing through the second converging portion 114. The second converging portion 114 can decrease the pressure of the primary fluid flowing through the second converging portion 114. An inner periphery of the second converging portion 114 can be circular. In some variants, the inner periphery of the second converging portion 114 can be oval, polygonal, irregular, and/or others. The second converging portion 114 can include an inner periphery that converges. The second converging portion 114 can include a cross-sectional flow area that converges. The second converging portion 114 can include an inner periphery that decreases in size in the direction of flow of the primary flow. The second converging portion 114 can include an inner periphery that continuously decreases in size in the direction of flow of the primary flow. The second converging portion 114 can include cross-sectional flow areas that that decrease in size in the direction of flow of the primary flow. The second converging portion 114 can include cross-sectional flow areas that continuously decreases in size in the direction of flow of the primary flow. The second converging portion 114 can include a flow area having the shape of a cone. The cross-sectional flow area of the second converging portion 114, converging portion 106, and/or diverging portion 110 can change at a consistent rate per unit of length. The angle of the periphery of the converging portion 114 relative to the central axis 112 and/or direction of flow of the primary flow can be larger than the angle of the peripheries of the diverging portion 110, converging portion 106, and/or outlet 104 relative to the central axis 112 and/or direction of flow of the primary flow.

A conduit 116, which can also be referred to as a tube, conduit, chamber, lumen, or the like, can circulate a secondary flow of a fluid (e.g., water, gas, air, exhaust gases, etc.) to the Venturi device 100. As described herein, the conduit 116 can recirculate a portion of the primary flow as a secondary flow into the primary flow. The conduit 116 can be connected to an annular chamber 118 of the body of the Venturi device 100 to direct the secondary flow to the annular chamber 118. In some configurations, multiple conduits 116 can connected to the annular chamber 118 at multiple locations to direct the secondary flow into the annular chamber 118.

The body of the Venturi device 100 can include an annular chamber 118. The annular chamber 118 can be ring shaped. In some configurations, the annular chamber 118 can be torus shaped. The annular chamber 118 can encircle the primary flow of fluid. The annular chamber 118 can encircle the central axis 112 of the Venturi device 100. The annular chamber 118 can circumferentially surround the primary flow of fluid. The secondary flow of fluid can spread throughout the annular chamber 118. A surface of the annular chamber 118 can include a Coandă surface or profile that can facilitate the secondary flow of fluid spreading throughout the annular chamber 118. A surface of the annular chamber 118 can be convex to facilitate the secondary flow of fluid spreading throughout the annular chamber 118. The secondary flow can adhere (e.g., molecular adhesion) to the surface(s) of the annular chamber 118 to spread throughout the annular chamber 118.

The body of the Venturi device 100 can include a secondary input 120. The secondary input 120 can be disposed downstream of the inlet 102, converging portion 106, throat 108, diverging portion 110, and/or second converging portion 114. The secondary input 120 can be disposed between the converging portion 106, throat 108, diverging portion 110, and/or second converging portion 114 and the outlet 104. The secondary input 120 can include one or more flow paths from the annular chamber 118 into the primary flow and/or inner region and/or primary flow path of the Venturi device 100 through which the primary flow travels. The secondary input 120 can be an annular passageway, one or more apertures, plurality of apertures, one or more slots, annular gap, and/or ring gap. The secondary input 120 can encircle the primary flow through the body of the Venturi device 100. The secondary input 120 can circumferentially encircle the primary flow through the body. The secondary input 120 can include one or more openings circumferentially distributed about a flow path of the primary flow. The secondary input 120 can define an annular shaped opening in an inner periphery of the body of the Venturi device 100. The secondary input 120 can direct the secondary flow into the primary flow at an angle relative to the direction of flow of the primary flow and/or relative to the central axis 112 of the body of the Venturi device 100. The angle can, in some variants, be ninety degrees. The angle can, in some configurations, be between sixty and one hundred and twenty degrees. The secondary input 120 can direct the secondary flow, at least partially, against the direction of flow of the primary flow. The introduction of the secondary flow by way of the secondary input 120 into the primary flow can create a vortex, swirl(s), one or more vortices, and/or the like in the primary flow. The creation of the vortex can create a suction at the inlet 102 sucking the primary flow into the Venturi device 100 through the inlet 102. The suction of the primary flow into the Venturi device 100 can cause the velocity to increase and pressure to decrease of the primary flow through the converging portion 106 and throat 108, which can cause the temperature of the primary flow through the converging portion 106 and/or throat 108 to decrease such that thermal energy (e.g., heat) from the ambient environment outside the body of the Venturi device 100 is transferred to the primary flow through the body, charging the primary flow with the thermal energy. The temperature and pressure of the primary flow downstream of the throat 108 (e.g., in the diverging portion 110) can increase before exiting through the outlet 104. An opening of the secondary input 120 into the inner region of the body (e.g., the primary flow path) can be smaller than a cross-sectional flow area of an input from the conduit 116 into the annular chamber 118. The secondary input 120 can direct the secondary flow radially inward toward the primary flow of fluid and/or the central axis 112 of the body.

In some configurations, the body can include a check valve. The check valve can facilitate flow of the primary flow from the inlet 102 to the outlet 104 and impede and/or resist the primary flow from flowing out of the body by way of the inlet 102. In some configurations, the check valve can be a one-way check valve. In some configurations, the check valve can be a valvular conduit. In some configurations, the check valve can be a fixed-geometry passive check valve. In some configurations, the check valve can include a main channel and a series of loops oriented to facilitate flow of the secondary flow towards the Venturi device and resist flow away from the Venturi device. In some configurations, the check valve can be a Tesla valve. In some configurations, the check valve can be disposed in the converging portion 106. In some configurations, the check valve can be disposed between the converging portion 106 and the diverging portion 110. In some configurations, the check valve can be disposed in the diverging portion 110. In some configurations, the check valve can be disposed at the throat 108. In some configurations, the check valve can be disposed between the diverging portion 110 and the second converging portion 114. In some configurations, the check valve can be disposed between the second converging portion 114 and the outlet 104. In some configurations, the check valve can be disposed at the outlet 104. In some configurations, the check valve can be disposed at the inlet 102.

As described herein, the Venturi device 100 can include three openings at the locations 116, 104 and 102. In some variants, these three openings can be open to the environment. The annular chamber 118 can be connected via the annular gap 120 with the inner region (e.g., primary flow path) of the Venturi device 100. The inner region of the body can taper at position (E), thus having a smaller inner diameter than at positions (F) and (D). The taper (reduction of the inner diameter) from position (F) to position (E) as well as the extension (enlargement of the inner diameter) from position (E) to position (D) can be continuous, such as conical. When a secondary flow is introduced into the opening 116, the secondary flow flows into the annular chamber 118 and is distributed radially there in the annular chamber, which can include an entirety of the annular chamber. From the annular chamber 118, the secondary flow flows via the secondary input 120 into the inner region of the body of the Venturi device 100 and generates there a vortex, which generates a suction effect at the inlet 102. As a result, the primary flow is sucked in through the inlet 102 and ejected toward the outlet 104. At position (E) (e.g., throat or constriction 108), according to the Venturi effect, the flow velocity of the sucked air increases. By combining the effects of the suction and Venturi effect, there can be a reduction in the temperature before the vortex, so that heat from the environment can be absorbed by the primary flow, charging the primary flow with energy from the ambient environment.

In some configurations, a rotationally symmetrical design for the Venturi device 100 may not be used which does not produce a Venturi effect. In some configurations, a body may be used that creates a flow-induced formation of a vortex, with a suction on one side of the vortex and an ejection of a flowable medium surrounding the vortex on the other side of the vortex. The flowable medium sucked in during the sucking process can be cooled. The cooled flowable medium sucked in can absorb heat (e.g., thermal energy) from the environment, for example, and thus the internal energy of the flowable medium increases. The guidance of the free-flowing medium via heat exchangers may be used.

Figure 2:
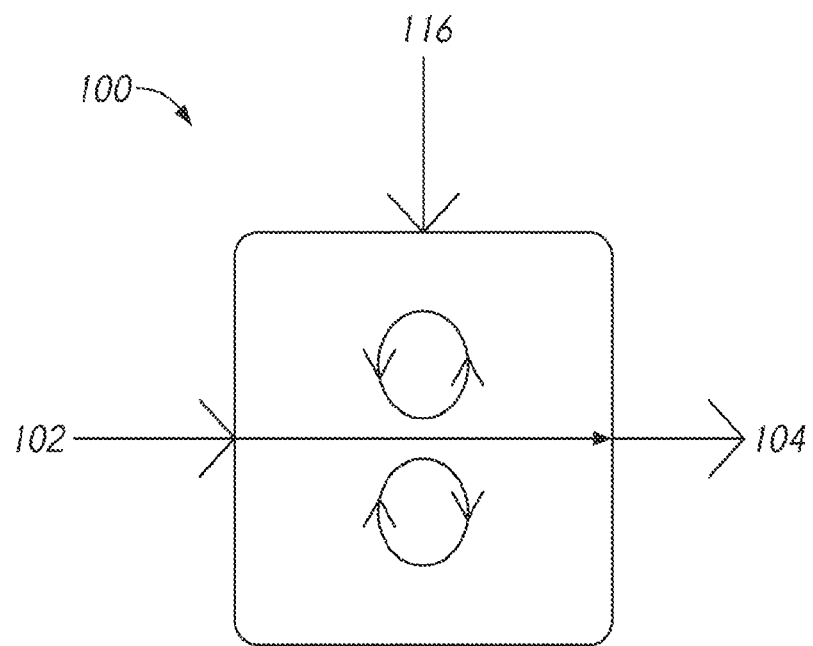
FIG. 2 illustrates a simplified schematic of the Venturi device illustrated in FIG. 1A.

For ease, FIG. 2 illustrates a simplified schematic of the Venturi device 100 of FIGS. 1A-1C. The arrows 116, 104 and 102 in FIG. 2 correspond to the openings at locations 116, 104, and 102 in FIGS. 1A-1C. Stated differently, 102 corresponds with the inlet 102, 116 corresponds with conduit 116, and 104 corresponds with outlet 104.

Figure 3:
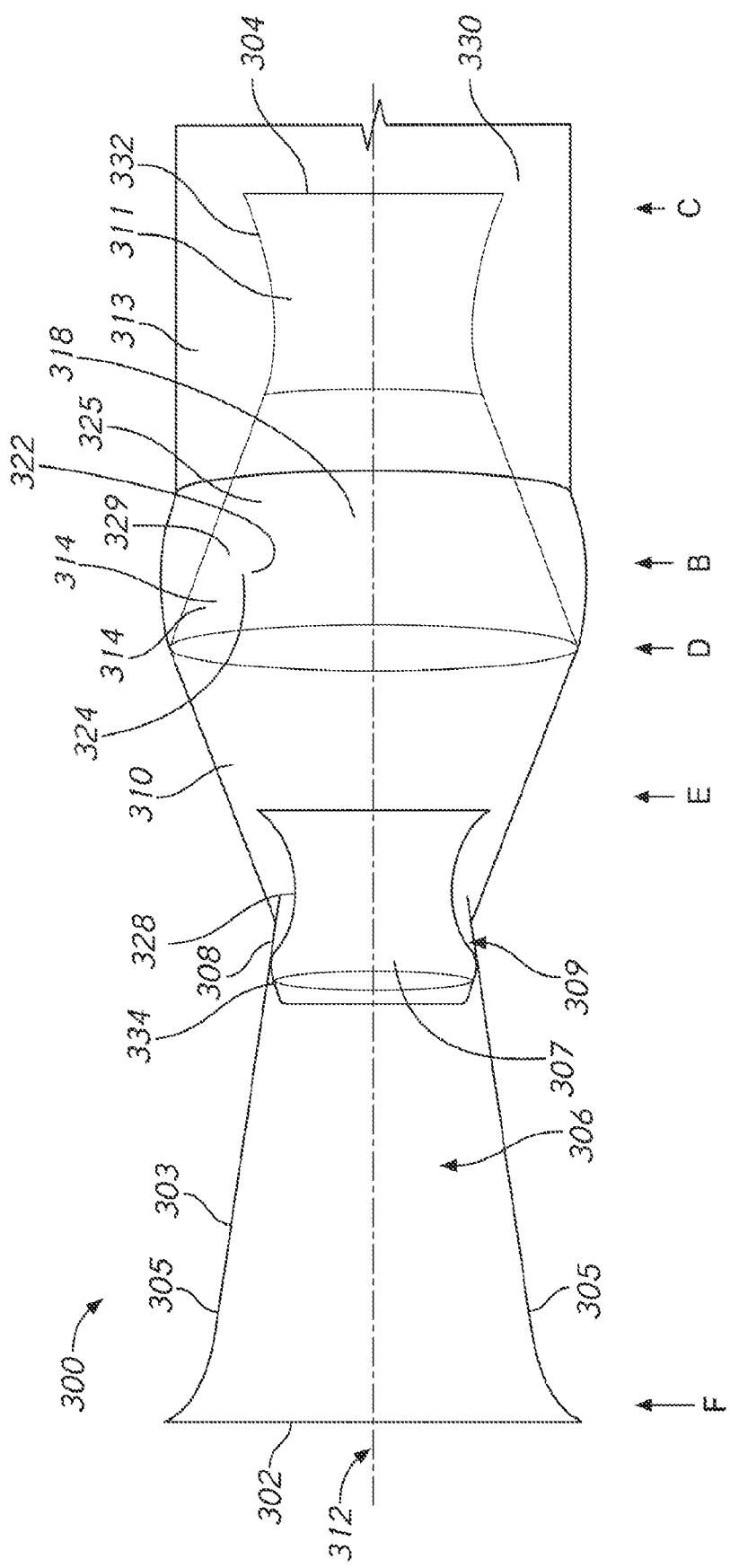
FIG. 3 illustrates a section view of a configuration of an example Venturi device.

FIG. 3 illustrates a section view of a configuration of a Venturi device 300, which can also be referred to as a vortex induction chamber or VIC. The Venturi device 300 can be similar or identical to the Venturi device 100 in some or many respects. With reference to FIG. 3, the Venturi device 300 can include an inlet 302 configured to receive a primary flow, an outlet 304 configured to eject the primary flow, a converging portion 306, a throat 308, a diverging portion 310, central axis 312, a second converging portion 314, a conduit 316, an annular chamber 318, and a secondary input 320. In some configurations, a cross-sectional flow area of the outlet 304 can be smaller than a cross-sectional flow area of the inlet 302. The secondary input 320 can be an annular passageway, one or more apertures, plurality of apertures, one or more slots, annular gap, and/or ring gap. The secondary input 320 can be disposed between the converging portion 306 and the outlet 304, said secondary input 320 configured to direct a secondary flow of the fluid into the primary flow to create a vortex, pulling the primary flow through the inlet 302 and into the body 303.

The Venturi device 300 can include a body 303 having a body wall 305 comprising the converging portion 306 and the diverging portion 310. The converging portion 306 can be configured to increase a velocity of the primary flow and decrease a pressure of the primary flow, and the diverging portion 310 can be configured to decrease the velocity of the primary flow and increase the pressure of the primary flow. The movement of the primary flow can flow through the converging portion 306 and the diverging portion 310 to produce a Venturi effect, said Venturi effect pulling the primary flow in through the inlet 302. In some configurations, the converging portion 306 can include a cross-sectional flow area that continuously decreases in size in the direction of flow of the primary flow. Additionally or alternatively, the diverging portion 310 can include a cross-sectional flow area that continuously increases in size in the direction of flow of the primary flow. In some configurations, a length of the diverging portion 310 is greater than a length of the converging portion 306. In some configurations, a cross-sectional flow area of the converging portion 306 is circular. In some configurations, the converging portion 306 can define a flow area having a conical shape. Additionally or alternatively, a cross-sectional flow area of the diverging portion can be circular. The diverging portion 310 can also define a flow area having a conical shape. In some configurations, a size of a cross-sectional flow area of the converging portion 306 can change less rapidly than a size of a cross-sectional flow area of the diverging portion 310 per a unit of length. Further, a length of the diverging portion 310 can be greater than a length of the converging portion 306.

The Venturi device 300 can include a throat 308, which can also be referred to as a constriction. The throat 308 can be disposed between the converging portion 306 and a diverging portion 310. The throat 308 can include an inner periphery that is smaller than that of the diameter of the converging portion 306 and the diameter of the diverging portion 310. For example, the throat 308 can include a diameter that is smaller than a diameter of the converging portion 306 and the diverging portion 310. The throat 308 can include a cross-sectional flow area that is smaller than that of the converging portion 306 and the diverging portion 310. In some configurations, the throat 308 can be the junction of the converging portion 306 and the diverging portion 310. In some configurations, the throat 308 includes a length. In some configurations, the inner periphery of the throat 308 is an inflection point between the converging portion 306 and the diverging portion 310. In some variants, the converging portion 306 converges to the throat 308 and immediately diverges to the diverging portion 310.

The Venturi device 300 can also include a first nozzle 307 disposed at least partially in the diverging portion 310. The first nozzle 307 can extend from the body wall 305, said first nozzle 307 forming a first annular space 309 between the first nozzle 307 and the body wall 305. In some configurations, the first nozzle 307 can be connected to the body wall 305 between the converging portion 306 and the diverging portion 310. The first nozzle 307 can be connected to the body wall 305 at the throat 308.

The first nozzle 307 can be configured to create a first low pressure fluid in the first annular space 309 relative to a high-pressure fluid flow of the primary flow flowing through the first nozzle 307 to pull the primary flow through the inlet 302 and into the body 303. The reduction in the high-pressure fluid flow of the primary flow through the first nozzle 307 can cause the first low pressure fluid to at least partially exit the first annular space 309 for the first low pressure fluid to flow toward the outlet 304.

The first nozzle 307 can provide a high-pressure and low-pressure stage to capture back pressure from engine pulse waves in the exhaust. The captured back pressure can be circled back to the high-pressure primary flow. The high-pressure fluid stream can push the low-pressure back pressure against the boundary layer along the inner side of the body wall 305 to be in the first annular space 309, said fluid behavior acting as a fluid dynamic check valve. The low-pressure fluid can then be utilized to fill in the primary flow once there is a pulse, and the high-pressure fluid flow is reduced through first nozzle 307, allowing the low-pressure fluid to exit from the first annular space 309 and fill in the fluid flow when the high-pressure fluid flow is reduced through the first nozzle 307 because of the pulse in primary flow. The first nozzle 307 can provide a higher tuned intake resonance to help amplify an intake charge (e.g., substantially continuous intake sucking/pulling of the primary flow through the inlet 302. The first nozzle 307 can extend from the body wall 305 toward the central axis 312 of the body 303.

The first nozzle 307 can be a bell-shaped nozzle 328 configured to be attached to the converging portion 306 and/or diverging portion 310. The bell-shaped nozzle 328 can be welded to the diverging section 310. Additionally or alternatively, the bell-shaped nozzle 328 can be welded approximately at the throat 308 along a flared portion 334 of the bell-shaped nozzle 328. In some configurations, the body 303 or converging portion 306 and the bell-shaped nozzle 328 can comprise one, single, and/or monolithic continuous piece of material. The diverging portion 310 can comprise a separate piece of material that is configured to attach to body 303 or converging portion 306 and the bell-shaped nozzle 328. The flared portion 334 of the bell-shaped nozzle 328 can include can be configured to contact an interior wall of the converging portion 306. Further, the bell-shaped nozzle 328 can function as a dynamic check valve by limiting a back pressure to disrupt and/or impede the primary flow through inlet 302. Additionally or alternatively, an inner diameter of the first nozzle 307 and/or the bell-shaped nozzle 328 can comprise a spoon like profile to assist in the transfer of the fluid from the convergence portion 306. Further, the spoon like profile of the convergence portion 306 and/or the bell-shaped nozzle 328 can reduce the occurrence of a turbulent flow in the primary fluid.

The Venturi device 300 can include a smallest cross-sectional flow area of the first nozzle 307 can be between ends of the first nozzle 307 such that at least one of the ends of the first nozzle 307 has a larger diameter relative to a diameter at the smallest cross-sectional flow area of the first nozzle 307. Additionally or alternatively, both of the ends of the first nozzle 307 can have larger diameters relative to the diameter at the smallest cross-sectional flow area of the first nozzle 307. The Venturi device 300 can further include a smallest cross-sectional flow area of the second nozzle 311 that can be between ends of the second nozzle 311 such that at least one of the ends of the second nozzle 311 has a larger diameter relative to a diameter at the smallest cross-sectional flow area of the second nozzle 311. Additionally or alternatively, both of the ends of the second nozzle 311 can have larger diameters relative to the diameter at the smallest cross-sectional flow area of the first nozzle 307. In some configurations, an axial extent of the first nozzle 307 is less than an axial extent of the diverging portion 310. In some configurations, an axial extent of the second nozzle 311 can be less than an axial extent of the reducer 330.

Additionally or alternatively, the Venturi device 300 can further include a second nozzle 311 disposed at least partially in the reducer 330. The second nozzle 311 can be connected to the body wall 305 at a portion of the body wall 305 between the diverging portion 310 and a reducer 330. The first nozzle 307 can have a cross-sectional flow area that can continually change in size. The second nozzle 311 can extend from the body wall 305 to form a second annular space 313 between the second nozzle 311 and the body wall 305. For example, the second annular space 313 can be formed between the reducer 330 second nozzle 311. The second nozzle 311 can be configured to create a second low pressure fluid in the second annular space 313 relative to the high-pressure fluid flow of the primary flow flowing through the second nozzle to move the primary flow through the outlet 304. The reduction in the high-pressure fluid flow of the primary flow through the second nozzle 311 can cause the second low pressure fluid to at least partially exit the second annular space 313 for the second low pressure fluid to flow toward the outlet 304. The second nozzle 311 can function as dynamic check valve to keep fluid flow going through the outlet 304 to, for example, a turbine, in the event of a pulse and temporary reduction in the primary flow through Venturi device 300. The second nozzle 311 can function as the first nozzle 307, but push the fluid flow out of the outlet 304.

The second annular space 313 can be larger than the first annular space 309. The second annular space 313 can be about two times larger than the first annular space 309. The second annular space 313 can be about 1.5, 2.5, 3, or more times larger than the first annular space 309. An end of the second nozzle 311 proximate the outlet 304 relative to the inlet 302 can be spaced axially inward from an end of the reducer 330, said end of the reducer 330 at least partially forming the outlet 304. In some configurations, a cross-sectional flow area of the second nozzle 311 can continually change in size. Additionally or alternatively, a cross-sectional flow area at an exit of the first nozzle 307 can be substantially the same as a cross-sectional flow area at an exit of the second nozzle 311. In some configurations, the converging portion 306 and diverging portion 310 can comprise one single, and/or monolithic continuous piece.

The second nozzle 311 can be a conical nozzle 332 configured to be attached to the body wall 305 and/or the conical interior surface 315. The conical nozzle 332 can be welded to conical nozzle 332. In some configurations, the conical interior surface 315 of the Venturi device 300 and the conical nozzle 332 can comprise one, single, and/or monolithic continuous piece of material. Further, the conical nozzle 332 can function as a dynamic check valve by limiting a back pressure to disrupt and/or impede the primary flow through inlet 302.

As discussed above, the Venturi device 300 can include a reducer 330 connected to the body wall 305 to house the conical nozzle 332 at outlet 304, said reducer 330 having a volume greater than the volume of sections 2 and 3 by a factor between 1.1 to 5, 1.25 to 4, 1.5 to 3, or 1.75 to 2.5. The reducer 330 can be connected to the body wall 305 at or proximate the conical interior surface 315. In some configurations, the body wall 305 and the reducer 330 can comprise one, single, and/or monolithic continuous piece of material. The reducer 330 and conical nozzle 332 can function as a fluid dynamic check valve before the flow is transferred to a turbine. The reducer 330 can be configured to be attached to any tubing, pipes, conduits, and the like to transfer the flow as discussed herein. The conical nozzle 332 can remain detached from any tubing, pipes, conduits, and the like to for example allow for low-pressure fluid flow in and out of the second annular space 313 as discussed herein.

The Venturi device can also include a conical interior surface 315 disposed between the diverging portion 310 and the second nozzle 311. The conical interior surface 315 can be configured to direct the primary flow toward the outlet 304 The conical interior surface 315 can have a cross-sectional flow area that decreases in size toward the outlet 304. In some configurations, the secondary input 320 can be configured to direct the secondary flow through the conical interior surface 315. Additionally or alternatively, the secondary input 320 can direct the secondary flow at a junction or connection between the conical interior surface 315 and the second nozzle 311. For example, the cross-sectional flow area of the conical interior surface 315 can converge to a size that is smaller than a cross-sectional flow area of the converging portion 306 and a cross-sectional flow area of the diverging portion 310, the secondary input 320 can direct the secondary flow the smaller cross-section flow area of the conical interior surface.

As can be seen by comparisons to FIGS. 1A-1C and FIG. 3, inlet 302 can include an inner periphery that is longer than the inlet 102 of Venturi device 100. For example, the inlet 302 can include a longer transition area than the inlet 102 to allow for a smoother transition. For example, the transition area can be extended by a factor of 5% to 55%, by a factor of 10% to 50%, by a factor of 15% to 45%, or by a factor between 20% to 40%, or by a factor of 25% to 35% than the inlet length of inlet 102. The inlet 302 can maintain a uniform reduction angle along the convergence portion 306. In some configurations, the convergence portion 306 can further include a reduction in the convergence angle to a more aggressive angle. The reduction in the convergence angle can occur at the weld point between sections 2 and 3 between the converging portion 306 and the diverging portion 310. The angle reduction can be between 1% to 25%, between 2.5% to 20%, between 5% to 15%, or 7.5% to 12.5%.

The Venturi device 300 can utilize an annular chamber 318 and secondary input 320 that can be similar and/or identical to that of annular chamber 118 and secondary input 120 of Venturi device 100. In some configurations, the secondary input 320 can include a Coandă surface. The secondary input 320 can be disposed downstream of the diverging portion 310. The annular chamber 318 can be configured to receive and direct the secondary flow to the secondary input 320. In some embodiments, the secondary input 320 can be disposed between the diverging portion 310 and the outlet 304. The secondary input 320 can be configured to direct the secondary flow of the fluid into the primary flow at an angle relative to a direction of the primary flow. The angle can be between 10 degrees to 170 degrees, between 20 degrees to 160 degrees, between 30 degrees to 150 degrees, between 40 degrees to 140 degrees, between 50 degrees to 130 degrees, or between 60 degrees to 120 degrees. In some configurations, the secondary input 320 can include one or more apertures 322. In some configurations, the secondary input 320 can include a plurality of apertures 322. The one or more apertures 322 can direct the secondary flow to the annular chamber 318. The annular chamber 318 can distribute the secondary flow throughout the annular chamber 318 as discussed herein via, for example, a Coandă surface.

The secondary input 320 can include an annular gap 324 which can similar or identical to the annular gap 120. The annular gap 324 can be in fluid communication with the annular chamber 318. The annular gap 324 can distribute the secondary flow through the annular gap via, for example, a Coandă surface, and direct the secondary flow into the primary flow. The secondary input 320 can also include a ring gap 325, which can be considered to be annular gap 324. The secondary input 320 can be configured to encircle the primary flow through the body 303. In some configurations, the secondary input 320 can be configured to circumferentially encircle the primary flow through the body 303. The secondary input 320 can also include one or more openings (e.g., one or more gaps 324) circumferentially distributed about a flow path of the primary flow, said secondary input 320 configured to direct the secondary flow radially inward toward the primary flow. In some configurations, the Venturi device can include a plurality of secondary inputs 320.

A surface of the annular chamber 318 can include a Coandă surface or profile that can facilitate the secondary flow of fluid spreading throughout the annular chamber 318. A surface of the annular chamber 318 can be convex to facilitate the secondary flow of fluid spreading throughout the annular chamber 318. The annular chamber 318 can also be configured to encircle the primary flow through the body 303. The secondary flow can adhere (e.g., molecular adhesion) to the surface(s) of the annular chamber 318 to spread throughout the annular chamber 318. When a secondary flow is introduced into the conduit 316, the secondary flow flows into the annular chamber 318 and is distributed radially there in the annular chamber 318, which can include an entirety of the annular chamber 318. Further, the conduit 316 can be configured to distribute the secondary flow throughout the secondary input 320. In some configurations, the Venturi device 300 can also include an annular passageway 329 fluidically connected to the annular chamber 318, the annular passageway configured to direct the secondary flow from the annular passageway 329 into the primary flow.

The secondary input 320 can define an annular shaped opening in an inner periphery of the body of the Venturi device 300. The secondary input 320 can direct the secondary flow into the primary flow at an angle relative to the direction of flow of the primary flow and/or relative to the central axis 312 of the body of the Venturi device 300. The Coandă profile of the Venturi device 300 can be extended by a factor of at least 1.5, at least 2, at least 3, at least 4, at least 5, at least 10, or at least 20 than that Venturi device 100. Additionally or alternatively, the angle of the Coandă profile of the Venturi device 300 can be adjusted by 5 degrees to 85 degrees, by 7.5 degree to 75 degrees, by 10 degrees to 60 degrees, by 12.5 degree to 45 degrees, and by 15 degrees to 30 degrees in comparison to the Venturi device 100.

The extending and change of angle of the Coandă profile of the Venturi device 300 can allow the secondary flow to have a smoother transition into the primary flow. In some embodiments, the secondary input 320 can direct the secondary flow to eject from the secondary input 320 at angle such that at least a part of the secondary flow is ejected in a direction along the flow of the primary fluid. The secondary input 320 can direct the secondary flow to eject from the secondary input 320 at angle such that at least a part of the secondary flow is ejected from the secondary input 320 toward the outlet 304. The angle of the Coandă profile can be in line with the flow rather than perpendicular or into the flow for non-compressible fluids. The Coandă profile of the Venturi device 300 can comprise a spoon like profile that can enable molecular adhesion of the high speed, high pressure secondary stream of fluid to the low pressure, high volume primary stream in a hydrodynamic state more efficiently. Additionally or alternatively, the ring gap 320 can be resurfaced with an angle transition between 10 degrees to 80 degrees, between 15 degrees to 75 degrees, between 20 degrees to 65 degrees, between 25 degrees to 65 degrees, between 30 degrees to 60 degrees, between 35 degrees to 55 degrees, or between 40 degrees to 50 degrees to optimize flow rate.

Figure 4D:
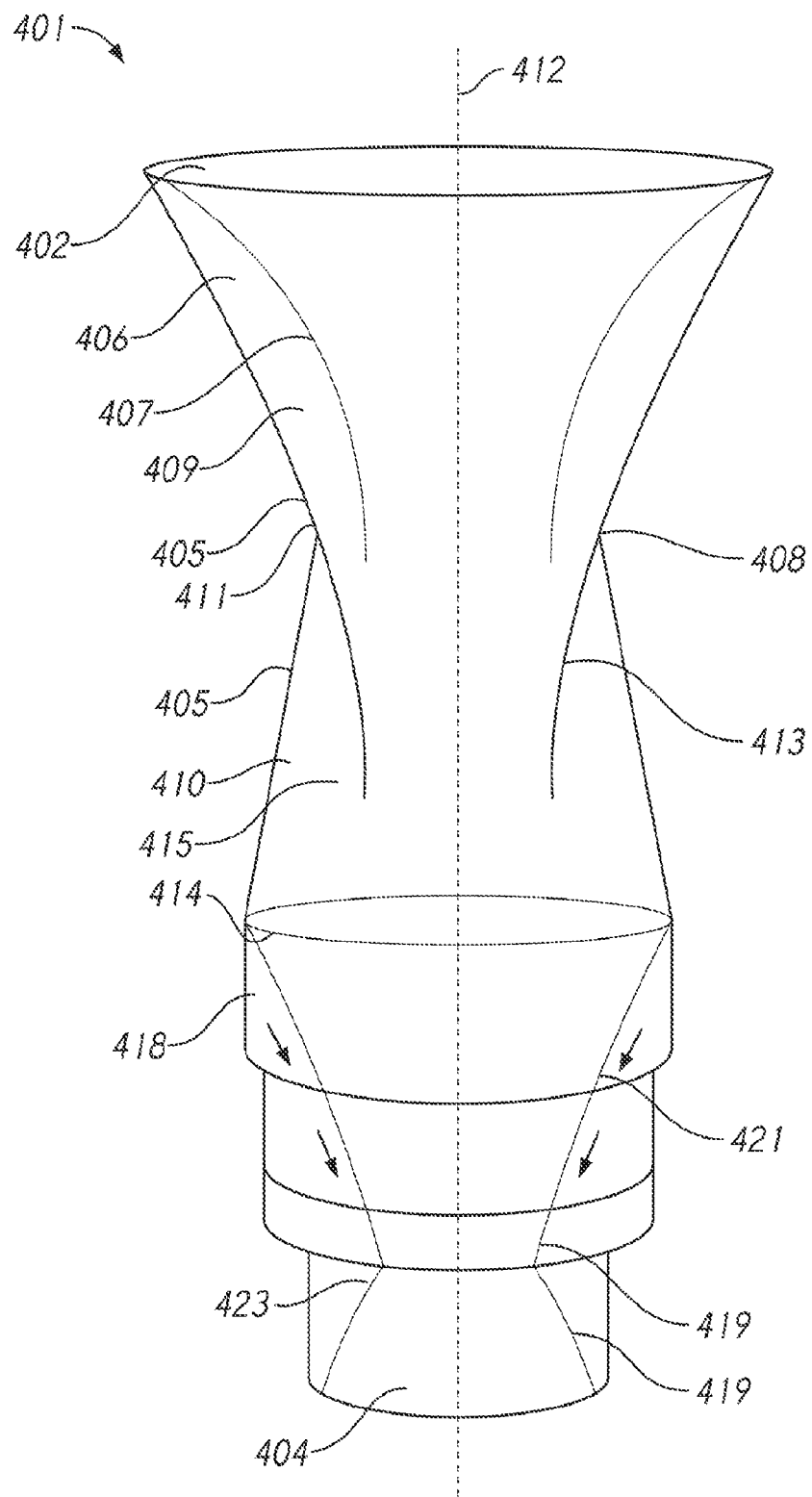

A configuration of another Venturi device 400 is shown schematically in FIGS. 4A-4D. FIG. 4A illustrates a sectional view of the Venturi device 400. The Venturi device 400 can have a similar layout to that of the Venturi devices 100 and 300 with changes noted below. Distinctive positions of the axis are marked by arrows and the letters B, C, D, E and F. As described above, gases can be introduced from the conduit 416 via the annular chamber 418 and the secondary input 420, which can include a ring gap 430, into the interior of the Venturi device 400. In some configurations, the ring gap 430 can be fixed once the chosen fluid is identified. In field adjustment may not be necessary to adjust a ring gap 430. In some configurations, a tapered machine union can be applied to the ring gap 430 to seal the Venturi device 400. In the area of D of the charging element (e.g., Venturi device 400) a vortex may be formed, as described in reference to FIG. 1A. This vortex creates a vacuum at the inlet 302 (location F). As a result, ambient air can be sucked into the Venturi device 400 via the inlet 402 and the throat 408 (e.g., constriction).

Since this air is compressed on the other side of the vortex (in direction C), the area of the pipe between B and E may be called a compression chamber. In sizing the Venturi device 400, the volume of the annular chamber 418 can be equal to than circumference times the area of the ring gap 430. The annular chamber 418 can be configured to receive and direct the secondary flow to the secondary input 420. In some configurations, the Venturi device 400 can include a single point annular chamber 418 for compressible fluids. In some configurations, the annular chamber 418 can include multiple uniform chambers inputs for non-compressible fluids. In some configurations, the annular chamber 418 can encircle the primary flow in a body 411 of the Venturi device 400. The annular chamber 418 can include a Coandă surface (s) configured to distribute incoming secondary flow throughout the annular chamber 418 by the secondary fluid flowing along the Coandă surface(s).

The secondary input 420 can be an annular passageway, one or more apertures, plurality of apertures, one or more slots, annular gap, and/or ring gap fluidically connected to the annular chamber 418. The annular passageway 431 can be configured to direct the secondary flow from the annular passageway 431 into the primary flow. Ambient air and exhaust gases are fused at the position corresponding to B and are pressed into the combustion chamber by passing through the outlet 304 at location C. The diameter of the outlet 404 can be similar and/or equal to the to distance between the inlet 402 and the throat 408 to produce a ratio for sizing the Venturi device 400. Also, a cross-sectional flow area of the outlet 304 can be smaller than a cross-sectional flow area of the inlet 402.

As mentioned above, the body of the Venturi device 400 can also include a throat 408, which can also be referred to as a constriction. The throat 408 can be disposed between a converging portion 406 and a diverging portion 410. The cross-sectional flow area of the converging portion 406 can be circular. In some configurations, the converging portion 406 can define a flow area having a conical shape. Further, the cross-sectional flow area of the diverging portion 410 can be circular. In some configurations, the diverging portion 410 can define a flow area having a conical shape. The converging portion 406 can be configured to increase a velocity of the primary flow and decrease a pressure of the primary flow. The diverging portion 410 can be configured to decrease the velocity of the primary flow and increase the pressure of the primary flow. A size of a cross-sectional flow area of the converging portion 406 can change more rapidly than a size of a cross-sectional flow area of the diverging portion 310 per a unit of length.

The Venturi device 400 can include a body wall 405 forming the convergence portion 306 and the diverging portion 410. An outer shell of the body wall 405 can utilize a fixed reduction angle ration between 1.25:1 to 5:1, between 1.5:1 to 4:1, between 1.75:1 to 3:1, or 2:1 to 2.5:1. The throat 408 can include a diameter that is smaller than a diameter of the converging portion 406 and a diameter of the diverging portion 410. The converging portion 406 can include a cross-sectional flow area that continuously decreases in size in the direction of flow of the primary flow. The diverging portion 410 can have a cross-sectional flow area that continuously increases in size in the direction of flow of the primary flow. A length of the diverging portion 410 can be greater than a length of the converging portion 406. The outer wall of the diverging portion 410 of the Venturi device 400 can be smaller than the outer wall of the converging portion 406. The outer wall of the diverging portion 410 of the Venturi device 400 can be 1% to 50%, 5% to 45%, 10% to 40%, 15% to 35%, 20% to 30%, or 22.5% to 27.5% smaller than the outer wall of the converging portion 306. The outer wall of the diverging portion 410 can be attached to the outer layer of the converging portion 406. The diverging portion 410 entrance can be inset into the body of the Venturi device 400 between inlet 402 and outlet 404 at a similar and/or equal distance as the length of the outlet 404 between locations B and C. Additionally or alternatively, the internal nozzle reduction angle between the throat 408 and the second converging portion 414 can be variable such that the flow rate of the fluid can be increased and create a vacuum at the first fluid dynamic check valve.

A first funnel 407 can be disposed at least partially in the converging portion 406. The first funnel 407 can be configured to attach to the converging portion 406. In some configurations, the first funnel 407 can be welded to the converging portion 406. An end of the first funnel 407 can also be configured to attach to the inlet 402 as well as along the converging portion 406. In some configuration, a portion of the body wall 405 and the first funnel 407 can comprise a single piece that is attached to sections 3 and 4. The first funnel 407 can form a first annular space 409 between the first funnel 407 and the body wall 405.

The first funnel 407 can provide a high-pressure and low-pressure stage to capture back pressure from engine pulse waves in the exhaust. The captured back pressure can be circled back to the high-pressure primary flow. The high-pressure fluid stream can push the low-pressure back pressure against the boundary layer along the inner side of the body wall 405 to be in the first annular space 409, said fluid behavior acting as a fluid dynamic check valve. The low-pressure fluid can then be utilized to fill in the primary flow once there is a pulse, and the high-pressure fluid flow is reduced through first funnel 407, allowing the low-pressure fluid to exit from the first annular space 409 and fill in the fluid flow when the high-pressure fluid flow is reduced through the first funnel 407 because of the pulse in primary flow. The first funnel 407 can provide a higher tuned intake resonance to help amplify an intake charge (e.g., substantially continuous intake sucking/pulling of the primary flow through the inlet 402. The first funnel 407 can extend from the body wall 405 toward the central axis 412 of the body 411.

In some configurations, the Venturi device 400 can include a pseudosphere-shaped entrance comprising the first funnel 407 which can improve impulse resonance, fluid velocity, and/or the internal geometry by functioning a first fluid dynamic check valve. The first funnel 407 can be configured to create a first low pressure fluid in the first annular space 409 relative to a high-pressure fluid flow of the primary flow flowing through the first funnel 407 to pull the primary flow through the inlet 402 and into the body 411. In some configurations, the first funnel 407 can be connected to the body wall 405 at the inlet 402. The reduction in the high-pressure fluid flow of the primary flow through the first funnel 407 can cause the first low pressure fluid to at least partially exit the first annular space 309 for the first low pressure fluid to flow toward the outlet 404. A cross-sectional flow area of the first funnel 407 can continually decrease in size toward the central axis 412 in the direction of flow of the primary fluid.

A second funnel 413 can be disposed at least partially in the diverging portion 410. The second funnel 413 can function as an internal extended transition that creates a second low pressure gap. In some configurations, a first portion of the body wall 405a and an inner wall 417 of FIG. 4D can comprise one, single, and/or monolithic continuous piece of material that is attached to a second portion of body wall 405b. The second portion of the body wall 405b can be welded to the first portion of the body wall 405a and the inner wall 417. The space between the body wall 405 and the inner wall 417 can create the second funnel 413. In some configurations, the inner wall 417 and second funnel 413 can comprise a one, single, and/or monolithic continuous piece of material that is configured to be attached to the first portion of the body wall 405a and the inner wall 417. The second funnel 413 can extend from the body wall 405 toward the central axis 412 of the body 411, said second funnel 413 forming a second annular space 415 between the second funnel 413 and the body wall 405. The second funnel 413 can also act as a dynamic check valve similar to the first funnel 407.

The first funnel 407 and the second funnel 413 amplify the suction created by the intake charge creating a high-speed jet of fluid as well as recycling any backpressure created by the intake pulse waves from, for example, the combustion process in an internal combustion engine or other pulses in the primary flow. The second funnel 413 can be connected to the body wall 405 at a junction between the converging portion 406 and the diverging portion 410. The second funnel 413 can be configured to create a second low pressure fluid in the second annular space 415 relative to the high-pressure fluid flow of the primary flow flowing through the second funnel 413 to pull the primary flow through the inlet 402 and into the body 411. The reduction in the high-pressure fluid flow of the primary flow through the second funnel 413 can cause the second low pressure fluid to at least partially exit the second annular space 415 for the second low pressure fluid to flow toward the outlet 404. A cross-sectional flow area of the second funnel 413 can continually decreases in size toward the central axis 412 in the direction of flow of the primary fluid. Additionally or alternatively, a cross-sectional flow area at an exit of the first funnel 407 can be substantially the same as a cross-sectional flow area at an exit of the second funnel 413. The second annular space 415 can act as a second dynamic check valve. The second annular space 415 can be larger than the first annular space 409. An axial extent of the first funnel 407 can be substantially equal to an axial extent of the converging portion 406 along the central axis 412. An axial extent of the second funnel 413 is less than an axial extent of the diverging portion 410 along the central axis 412.

A secondary input 420 can be disposed between the converging portion 406 and the outlet 404. The secondary input 420 can be disposed downstream of the diverging portion 410. The secondary input 420 can be configured to direct a secondary flow of the fluid into the primary flow to create a vortex, pulling the primary flow through the inlet 402 and into the body 411. The secondary input 420 can further include a Coandă surface. In some configurations, the secondary input 420 can be configured to direct the secondary flow of the fluid into the primary flow at an angle relative to a direction of flow of the primary flow. The angle can be between 10 degrees to 170 degrees, between 20 degrees to 160 degrees, between 30 degrees to 150 degrees, between 40 degrees to 140 degrees, between 50 degrees to 130 degrees, or between 60 degrees to 120 degrees. In some configurations, the secondary input 420 can include one or more apertures 432. In some configurations, the secondary input 420 can include a plurality of apertures 432. The one or more apertures 432 can direct the secondary flow to the annular chamber 418. The annular chamber 418 can distribute the secondary flow throughout the annular chamber 418 as discussed herein via, for example, a Coandă surface.

The secondary input 420 can include an annular gap 429 which can similar or identical to the annular gap 120. The annular gap 429 can be in fluid communication with the annular chamber 418. The annular gap 429 can distribute the secondary flow through the annular gap via, for example, a Coandă surface, and direct the secondary flow into the primary flow. The secondary input 420 can also include a ring gap 430, which can be the annular gap 429. The secondary input 420 can be configured to encircle the primary flow through the body 411. In some configurations, the secondary input 420 can be configured to circumferentially encircle the primary flow through the body 411. The secondary input 420 can also include one or more openings (e.g., one or more gaps 429) circumferentially distributed about a flow path of the primary flow, said secondary input 420 configured to direct the secondary flow radially inward toward the primary flow. In some configurations, the Venturi device 400 can include a plurality of secondary inputs 420.

A conical interior surface 419 can be disposed downstream of the secondary input 320 relative to the primary flow of the fluid. The conical interior surface 419 can be configured to direct the primary flow toward the outlet 404. The conical interior surface 419 can also include a cross-sectional flow area that increases in size toward the outlet 404.

The cross-sectional flow area of the conical interior surface 419 can increase up to the outlet 404. The conical interior surface 419 can be a first conical interior surface 419 the Venturi device 400 can include a second conical interior surface 421 disposed between the diverging portion 410 and the first conical interior surface 419. The second conical interior surface 421 can be part of the second converging portion 414. The second conical interior surface 421 can be configured to direct the primary flow toward the outlet 404. The second conical interior surface 421 can include a cross-sectional flow area that decreases in size toward the outlet 404. The secondary input 420 can be configured to direct the secondary flow through the second conical interior surface 421. The secondary input 420 can be configured to direct the secondary flow between the first conical interior surface 419 and the second conical interior surface 421.

The cross-sectional flow area of the second conical interior surface 421 can converge to a size that is smaller than a cross-sectional flow area of the converging portion 306 and a cross-sectional flow area of the diverging portion 410. The first conical interior surface 419 and the second conical interior surface 421 can converge to form a throat 423 having a smallest diameter and smallest cross-sectional flow area relative to the first conical interior surface 419 and second conical interior surface 421.

Further, the inlet of ambient air (FIG. 4C in FIG. 4A) could be formed like velocity stack allowing smooth and even entry of air at high velocities. Here, also resonance effects can be observed which promote the induction of the generation of the vortex. In addition, the inside wall of the Venturi device 400 can include a radius entry and/or "plenum." A velocity stack, trumpet, or air horn is a trumpet-shaped design having differing lengths which can be used at the inlet 402. These designs can allow smooth and even entry of air at high velocities with the flow stream adhering to the walls—known as laminar flow. Additionally or alternatively, modifications can be made to the dynamic tuning range of the intake tract by functioning as a resonating pipe which can adjust the frequency of pressure pulses based on its length within the tract. Modern engines can have tuned intake tract volumes and associated resonance frequencies designed to provide higher than atmospheric intake air pressure while the intake valves are open. These intake tract volumes can increase the density of the trapped air in the combustion chamber providing for higher compression.

The systems, particulate burner, particulate burner systems, and Venturi devices 300 can be made with varying dimensions. Some non-limiting example dimensions for the particulate burner according to FIG. 4A are below:

Length between (D) and (C)=between 6.00 inches and 7.00 inches

Ring gap 120=between 0.001 inches and 0.003 inches

Inner diameter (further referred as "I.D.") at B=between 1.57 and 1.68 inches

Reduction angle between (D) and (B)=between 35° and 55°

Reduction angle between (C) and (B)=between 55° and 65°

I.D. at (C)=between 1.63 inches and 2.05 inches

I.D. at (D)=between 3.25 inches and 4.01 inches

Length between (D) and (E)=between 4.50 and 6.00 inches

Reduction angle between (D) and (E)=30° and 53°

I.D. at (E)=between 1.25 inches and 2.35 inches

Reduction angle between (F) and (E)=between 33° and 41°

Length between (F) and (E)=between 4.00 inches and 6.00 inches

Conduit 316 is steel tubing with I.D. of between 0.75 inches to 1.00 inches

Converging portion 406 is modified pressure activated heat riser butterfly valve (F), the inlet 402, can be made of elastic polymer or programmable metallic polymer to adjust opening in correspondence to incoming intake pressure. Area between (E) and (F) can be made of an elastic polymer or a programmable metallic polymer to adjust the opening according to the input pressure applied (e.g., different dynamic pressure at different driving speeds if the particulate burner should be installed in a vehicle).

At the ring gap 430, a Coandă effect profile of 35° to 80° can be applied.

The ring gap 430 can have a 70-degree angle cut into the edge of the ring.

The Venturi device 400 can be constructed out of dissimilar metals. By doing so, the dissimilar metals can create friction at internal points of compression. Further, the dissimilar metals can reduce friction to create higher efficiency boundary layers for fluid acceleration of compressed fluid to the intake charge.

The systems, devices, and components thereof can be made of a variety of materials such metals (such as steel, aluminum, and/or others), metal alloys, polymers (such as plastic), ceramics, shape memory materials, and/or other suitable materials. The systems, devices, and components thereof can be galvanized, painted, zinc coated, powder coated, vinyl coated, plastic dripped, textured, and/or finished with other materials or methods.

Hydro-Turbine System

Figure 5:
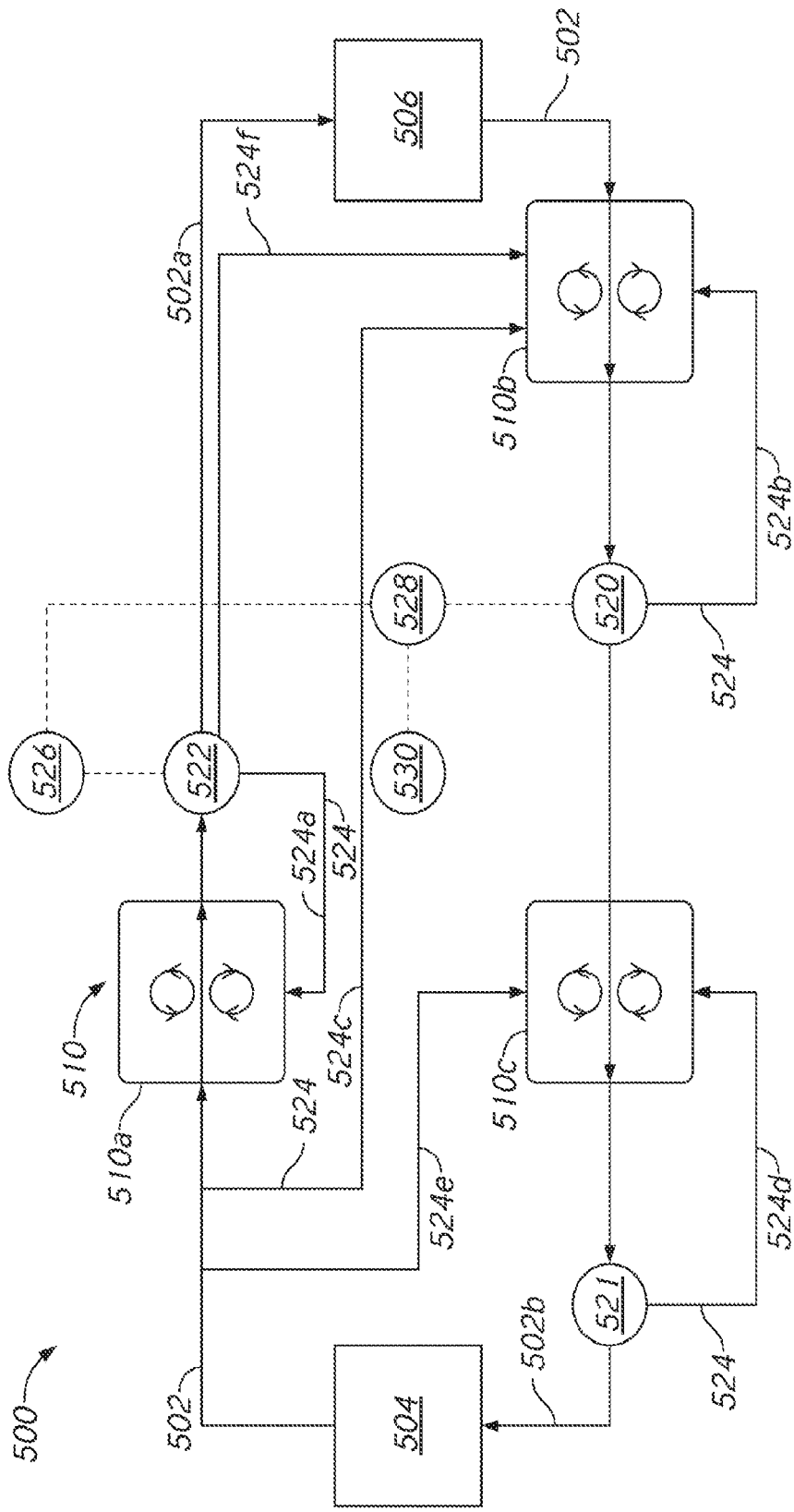
FIGS. 5-8 illustrate a hydro-turbine system to convert kinetic energy into electrical energy.
Figure 6:
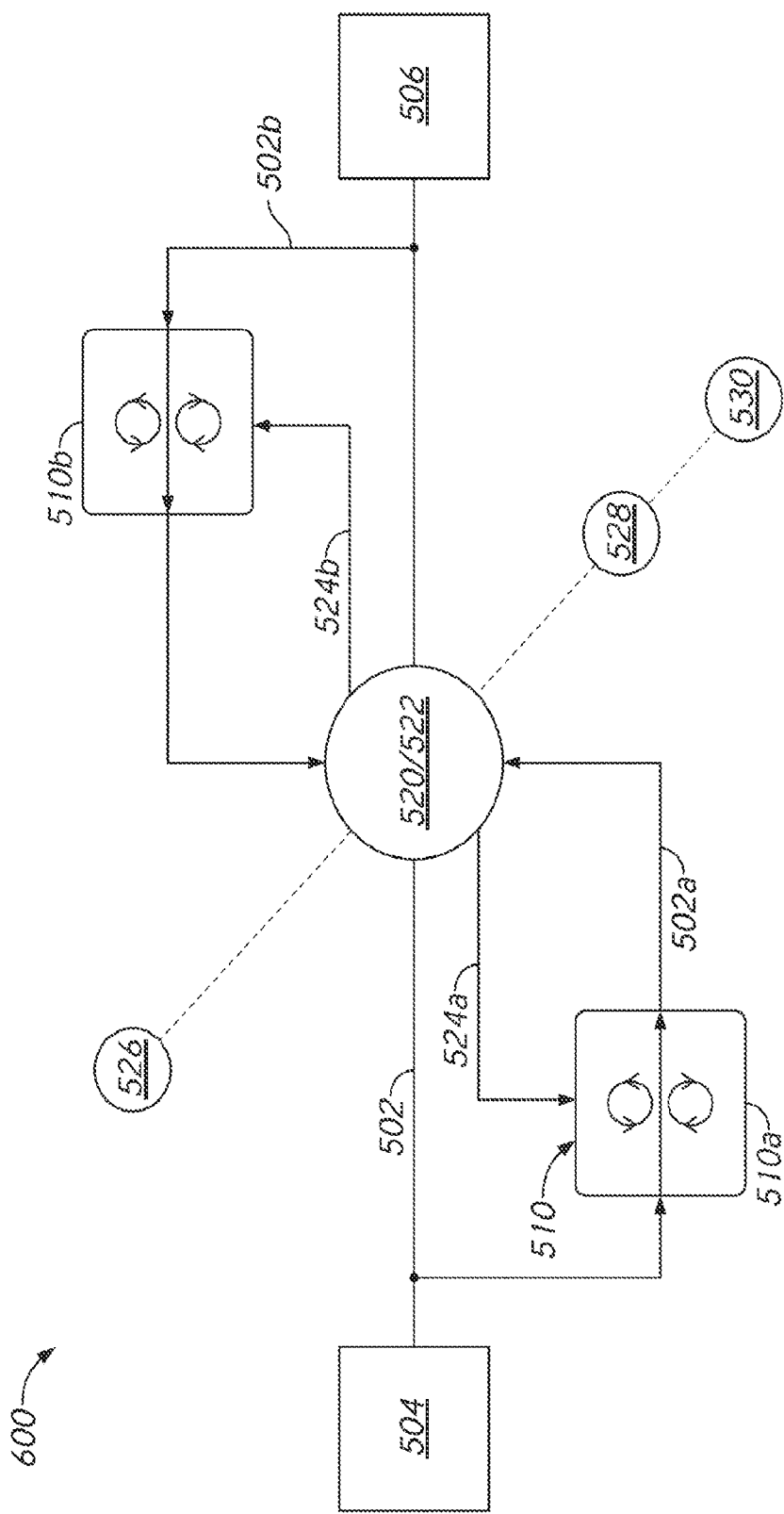
Figure 7:
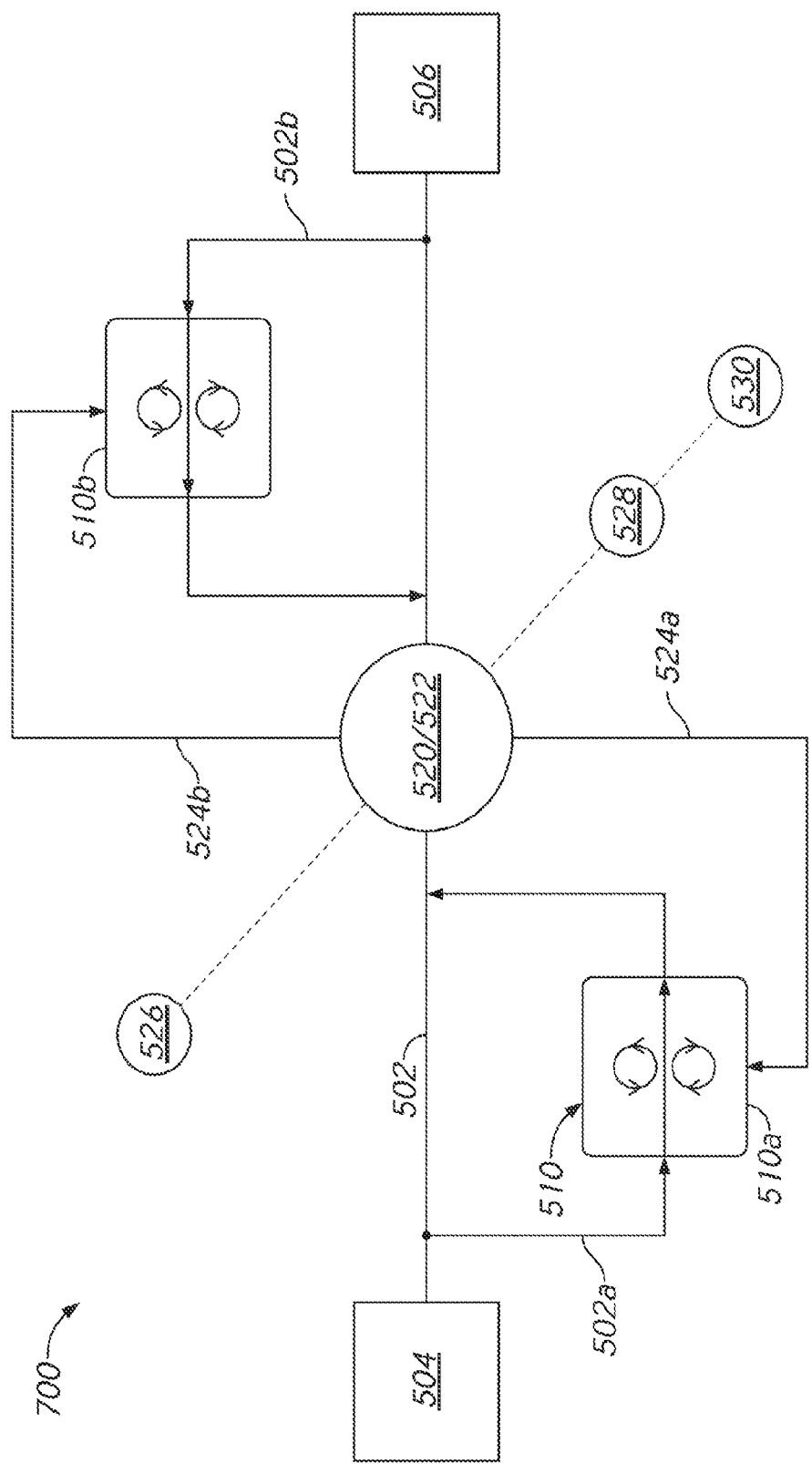
Figure 8:
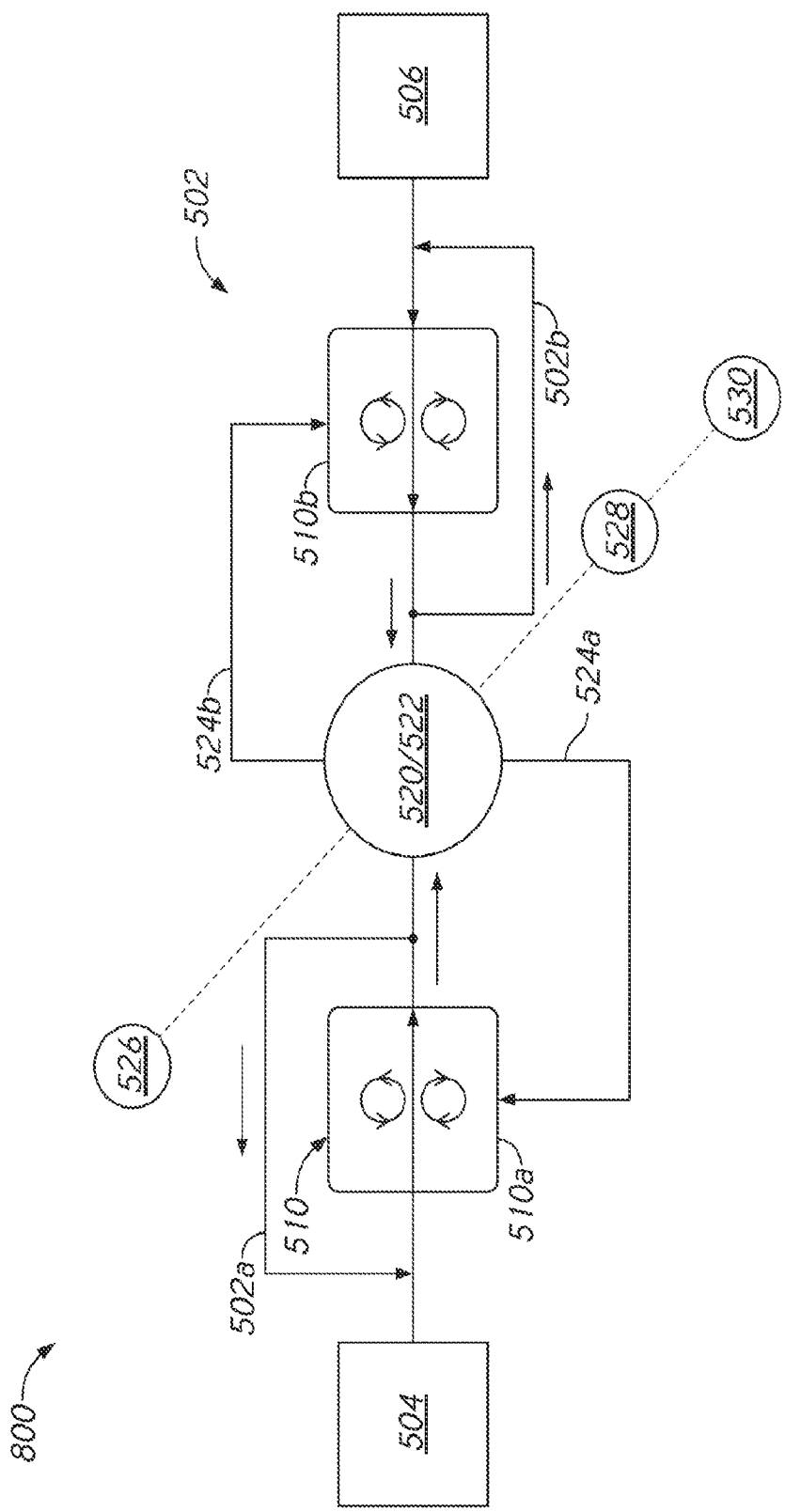

FIG. 5 illustrates a hydropower system 500 for converting potential energy of a fluid into electrical energy. FIG. 6 illustrates a configuration of a hydropower system 600 for converting potential energy of a fluid into electrical energy. FIG. 7 illustrates a configuration of a hydropower system 700 for converting potential energy of a fluid into electrical energy. FIG. 8 illustrates a configuration of a hydropower system 800 for converting potential energy of a fluid into electrical energy. The systems 500, 600, 700, and 800 can be compatible with hydro and aerodynamic turbine designs with limited or no moving parts as the fluid can be accelerated by the use of Venturi devices along with turbines and/or pumps.

In some embodiments, the systems of FIGS. 5-8 and/or parts can be comprised of 316 stainless steel. The fluid can be passed through a variable size and adjustable Venturi device 510 which can be similar or identical to either the Venturi device 100 described FIG. 1A and/or the Venturi device 300 described in FIG. 3. In some embodiments, the fluid is compressed by the Venturi device 510. The increase in exit velocity and density can be increased by a factor 2, 3, 4, 5, 6, or higher than the original velocity and/or density. The exiting fluid can then be passed into a turbine which generates electricity by spinning the input shaft of a generator and initiating an output of electrical current. In some embodiments, the turbine is an induction turbine.

In FIGS. 5-8, a fluid loop, conduit, or tunnel 502 can direct or move a primary flow of fluid between an upper reservoir 504 and a lower reservoir 506. The upper reservoir 504 can be at a higher elevation than the lower reservoir 506.

The fluid from the upper reservoir 504 can flow from the upper reservoir 404 to the lower fluid source 506 via gravity. The fluid loop, conduit, or tunnel 502 can include tubing, conduits, pipes, etc. to circulate the primary flow fluid. The system 500 can include one or more Venturi devices 510 (e.g., two), one or more pumps 520, a turbine 522, a generator 526, and the like. The one or more Venturi devices 510 (e.g., two), one or more pumps 520, and/or turbine 522 can be disposed on the fluid loop, conduit, or tunnel 502. The system 500 can include a fluid loop 502 as illustrated in FIG. 5 such that electricity can be generated via turbine 522 as discussed herein while simultaneously pumping fluid from the lower reservoir 506 to the upper reservoir 504 via pump 520 as discussed herein.

The turbine 522 can be configured to be driven by the primary flow from the upper reservoir 504 to the lower reservoir 506. The generator 526 can be configured to be driven by the turbine 522 to generate electricity. The pump 520 can be configured to drive the primary flow from the lower reservoir 506 to the upper reservoir 504. The pump 520 can also include a motor 528 that is configured to be powered by at least one of a generator 526 and/or an external power supply 530. The pump 520 can drive the primary flow from the lower reservoir 506 to the upper reservoir 504 while turbine 522 is driven by the primary flow from the upper reservoir 504 to the lower reservoir 506 to recirculate the fluid from the lower reservoir 506 to the upper reservoir 504. The pump 520 drives the primary flow from the lower reservoir 506 to the upper reservoir 504 while flow of the fluid is stopped through the turbine 522.

In FIG. 5, the first Venturi device 510a and the turbine 522 can be disposed on a first fluid path 502a in which the fluid is flowing from the upper reservoir 404 down to the lower reservoir 506. Flow through a second fluid path 502b can be stopped or restricted when the fluid is flowing from the upper reservoir 504 down to the lower reservoir 506. The first Venturi device 510a can be downstream of the upper reservoir 504 and upstream of the turbine 522 and between the upper reservoir 504 and the turbine 522 on the fluid loop, conduit, or tunnel 502.

The second Venturi device 510b and the pump 520 can be disposed on a second fluid path 502b in which the fluid is transferred from the lower reservoir 506 to the upper reservoir 504. Flow through the first fluid path 502a can be stopped or restricted when the fluid is transferred from the lower reservoir 506 to the upper reservoir 504. The second Venturi device 510b can be downstream of the lower fluid source 510b and upstream of the pump 520 and between the lower reservoir 506 and the pump 520 on the fluid loop, conduit, or tunnel 502.

One or more Venturi devices 510 can be disposed on the second fluid path 502b. The turbine 522 can be disposed between the first Venturi device 510a and the lower reservoir 506 on the fluid loop, conduit, or tunnel 502. The first Venturi device 510a can be disposed between the upper reservoir 504 and the turbine 522 on the first fluid path 502a of the fluid loop, conduit, or tunnel 502. The first Venturi device 510a can be downstream of the upper reservoir 504 and upstream of the turbine 522, between the upper reservoir 504 and the turbine 522 on the fluid loop, conduit, or tunnel 502. The second Venturi device 510b can be disposed between the pump 520 and the lower reservoir 506 on the second fluid path 502b of the fluid loop, conduit, or tunnel 502.

In some embodiments, an other pump 521 can be disposed on the fluid loop, conduit, or tunnel 502, said other pump 521 can be configured to drive the primary flow from the lower reservoir 506 to the upper reservoir 504. In some embodiments, a third Venturi device 510c can be disposed on the fluid loop, conduit, or tunnel 502. The third Venturi device 510c can be downstream of the lower reservoir 506 and upstream of the other pump 521 and between the lower reservoir 506 and the other pump 521 on the fluid loop, conduit, or tunnel 502.

The primary flow can flow start at the upper reservoir 504 and then flow through the first Venturi device 510a and the turbine 522 on the first fluid path 502a of the fluid loop, conduit, or tunnel 502 before reaching the lower reservoir 506. The primary flow can then be recirculated back to the upper reservoir 504 by pumping the fluid through the second Venturi device 510b and the pump 520.

System 600 and 700 can be similar or identical to the system 500. As shown in FIGS. 6 and 7, the pump 420 and the turbine 522 can be disposed on the flow loop 502. The first Venturi device 510a can be disposed on a first fluid path 502a that can be in fluid communication with the upper reservoir 504 and/or in fluid communication with the fluid loop, conduit, or tunnel 502. The fluid can flow from the upper reservoir 504, through the first Venturi device 510a, through the turbine 522, and then discharged from the turbine 522 to the lower reservoir 506. The second Venturi device 510b can be disposed on a second fluid path 502b that can be in fluid communication with the lower reservoir 506 and/or in fluid communication with the fluid loop, conduit, or tunnel 502. The fluid can flow from the lower reservoir 506, through the second Venturi device 510b, through the pump 520, and then discharged from the pump 520 to the upper reservoir 504.

As shown in FIG. 8, the system 800, which can be similar or identical to the system 500, 600, 700, can include the first Venturi device 510a, second Venturi device 510b, the pump 520, and turbine 522 disposed on the fluid loop, conduit, or tunnel 502. A first fluid path 502a (also discussed herein as a "first bypass line") and the second fluid path 502b (also discussed herein as a "second bypass line") can perform as a bypass line to direct the fluid around the Venturi devices 510a, 510b depending on the direction of the fluid flow.

The first bypass conduit 502a can be connected to the fluid conduit upstream and downstream of the first Venturi device 510a. The first bypass conduit 502a can direct the primary flow around first Venturi device 510a such that the primary flow does not pass through the first Venturi device 510a with the primary flow flowing from the lower reservoir 506 to the upper reservoir 504 via the fluid loop 502. Additionally or alternatively, the second bypass conduit 502b can connect to the fluid conduit upstream and downstream of the second Venturi device 510b. The second bypass conduit 502b can direct the primary flow around second Venturi device 510b such that the primary flow does not pass through the second Venturi device 510b with the primary flow flowing from the upper reservoir 504 to the lower reservoir 506 via the fluid loop 502.

As the fluid flows from the upper reservoir 504 to the lower reservoir 506, the fluid can pass through the first Venturi device 510a, through the turbine 522, and around the second Venturi device 510b by flowing through the second fluid path 502b, and then the fluid is discharged into lower reservoir 506. The fluid can be pumped from the lower reservoir 506 to the upper reservoir 504, by first passing the fluid through the second Venturi device 510b, through the pump 520, through the first fluid path 502a around the first Venturi device 510a before being discharged into the upper reservoir 504. In FIG. 8, the direction of the flow can determine which fluid path the flow takes. In some configurations, the first and second fluid paths 502a, 502b are designed so that the fluid passes through the path in one direction. In some embodiments, the first and second fluid paths 502a, 502b can allow the fluid to recirculate back to the inlet of the first and second Venturi devices 510a, 510b.

As described herein, and shown in FIGS. 5-8, a recirculation conduit, a flow line, a bleed line, and/or secondary flow conduit 524 (also mentioned herein as a "fluid conduit") which can be function as conduit 116 described in reference to FIGS. 1A-1C and/or the conduit 316 described in reference to FIG. 3, can route a portion of the primary flow (e.g., secondary flow) from the fluid loop, conduit, or tunnel 502, such as from the pump 520, turbine 522, first fluid path 502a, or second fluid path 502b, and back to the first Venturi device 510a and/or second Venturi device 510b to create vortices therein, as described above in reference to FIGS. 1A-1C and/or FIG. 3, to generate a suction to facilitate the passing of the fluid. The bleed line 524 can assist in creating a smooth transition of energy throughout the system.

The secondary flow of the first Venturi device 510a flows from the turbine 522 to the secondary input of the first Venturi device 510a. A first conduit 524a can be fluidically connected to the turbine 522 and the secondary input of the first Venturi device 510a, the first conduit 524a configured to direct the secondary flow from the primary flow to the secondary input of the first Venturi device 510a.

The secondary flow of the second Venturi device 510b flows from the pump 520 to the secondary input of the second Venturi device 522. A second conduit 524b can be fluidically connected to the pump 520 and the secondary input of the second Venturi device 510b, the second conduit 524b configured to direct the secondary flow from the primary flow to the secondary input of the second Venturi device 510b. A third conduit 524c can be fluidically connected to the fluid loop, conduit, or tunnel 502 between the upper reservoir 504 and the turbine 522. The third conduit 524c can be configured to direct the secondary flow of the second Venturi device 510b from the primary flow from the upper reservoir 504 to the secondary input of the second Venturi device 510b. The Venturi device 510b can utilize the third conduit 524c and the back pressure through the line to provide an energy input for transporting the primary flow from the lower reservoir 506 to the upper reservoir 504.

A secondary flow of the third Venturi device 510c can flow from the other pump 521 to a secondary input of the third Venturi device 510c. A fourth conduit 524d can be fluidically connected to the other pump 521 and the secondary input of the third Venturi device 510c. The fourth conduit 524d can be configured to direct the secondary flow from the primary flow to the secondary input of the third Venturi device 510c. A fifth conduit 524e can be fluidically connected to the fluid loop, conduit, or tunnel 502 between the upper reservoir 504 and the turbine 522. The fifth conduit 524e can be configured to direct the secondary flow of the third Venturi device 510c from the primary flow from the upper reservoir 504 to the secondary input of the third Venturi device 510c. The secondary input of any of the Venturi devices 510 can be adjustable to regulate an input of the secondary flow into the primary flow. A sixth conduit 524f can be fluidically connected to the turbine 522 and the secondary input of the second Venturi device 510b. The sixth conduit 524f can be configured to direct the secondary flow from the primary flow to the secondary input of the second Venturi device 510b. The sixth conduit 524f can also assist in moving the primary fluid back to the upper reservoir 504 from the lower reservoir 506. Sixth conduit 524f can improve the efficiency of the system 500 by eliminating conversion losses from the kinetic energy to electrical energy within the turbine 522. The secondary input of any of the Venturi devices 510 can be adjustable to regulate an input of the secondary flow into the primary flow.

As shown in FIG. 5, back pressure can be taken from the first fluid path 502*a*, such as from a penstock tunnel before the first Venturi device 510*a* and be redirected to the second Venturi device 510*b* to assist the transfer of water along the second fluid path 502*b*. The generator 526 can generate electrical energy from the mechanical energy of the turbine 522 as the primary flow drives the turbine 522.

Additionally or alternatively, as the load increases on the generator 526 due to the output demand, a bypass line(s) 524 can be pressurized. The bypass line(s) 524 can be connected to an inlet similar and/or identical to the inlet 116 of the Venturi device(s) 100 and/or the conduit 316 of the Venturi device 300. The pressurized fluid from the bypass line 524 can activate the Venturi device 510 and, in conjunction with the Coandă effect, accelerating and increasing the velocity and/or the density of the flow through the corresponding Venturi devices and fluid loop 502. As resistance in the turbine increases, the inlet pressure can increase. In some embodiments, the inlet can withstand an inlet pressure up to 350 psi, up to 325 psi, up to 300 psi, up to 275, or up to 250 psi. Additionally or alternatively, heat energy from the turbine can be injected into the system 500 further increasing the pressure at the inlet. By introducing the pressure from the bypass line 524 into the flow loop 502, a smooth transition of energy can occur that can increase efficiency.

It can be assumed that neither frictional losses, dissipation losses nor the conversion losses between the individual forms of energy occur. In one configuration, as shown in FIG. 5, the primary flow passes through the points (22), (13), (12), (1), (2), (3), (4), (5), (19), (20), (6), (7), (8), (9), (10), (11), (21), (14), (15), (17), (23), (24), (25), (26), (27), (28), (29), (30), (31), (32), (33), and (34) of the fluid loop, conduit, or tunnel 502, which can be connected by way of tubing, pipes, conduits, and the like, and thus circulates in a circuit (e.g., fluid loop) which links the pump 520, Venturi device 510 (e.g., first Venturi device 510*a*), turbine 522, and Venturi device 510 (e.g., second Venturi device 510*b*). The circulating flow can be referred to as the primary flow. In a configuration, as shown in FIG. 6, the primary flow passes through the points (13), (12), (1), (2), (3), (4), (5), (19), (20), (6), (7), (8), (9), (10), (11), (16), (14), (15), (17), and (18) of the fluid loop, conduit, or tunnel 502, which can be connected by way of tubing, pipes, conduits, and the like, and thus circulates in a circuit (e.g., fluid loop) which links the pump 520, Venturi device 510 (e.g., first Venturi device 510*a*), turbine 522, and Venturi device 510 (e.g., second Venturi device 510*b*). In the configuration shown in FIG. 7, the primary flow passes through the points (13), (12), (1), (2), (3), (4), (5), (19), (20), (6), (7), (8), (9), (10), (11), (16), (14), (15), (17), and (18) of the fluid loop, conduit, or tunnel 502, which can be connected by way of tubing, pipes, conduits, and the like, and thus circulates in a circuit (e.g., fluid loop) which links the pump 520, Venturi device 510 (e.g., first Venturi device 510*a*), turbine 522, and Venturi device 510 (e.g., second Venturi device 510*b*). In the configuration shown in FIG. 8, the primary flow passes through the points (16), (12), (1), (2), (3), (4), (5), (18), (20), (19), (6), (7), (8), (9), (13), (11), (16), (14), (10), (15), and (17), and of the fluid loop, conduit, or tunnel 502, which can be connected by way of tubing, pipes, conduits, and the like, and thus circulates in a circuit (e.g., fluid loop) which links the pump 520, Venturi device 510 (e.g., first Venturi device 510*a*), turbine 522, and Venturi device 510 (e.g., second Venturi device 510*b*).

The primary flow can cause two effects. First, the turbine 522 can be driven by the primary flow, which drives the generator 526, which in turn results generates electrical energy in the form of electricity. Second, a secondary flow can be directed via points (14), (15), (18), (32) (where shown) into the Venturi device 510*a* and the Venturi device 510*b* where it rejoins the primary flow, as detailed herein with reference to the secondary flow being directed into the primary flow. As a result, the vortices described above are formed in the Venturi devices 510, which generate a suction on the back of the Venturi devices 510 (points (1), (7), and (24)). As described above, in the Venturi device 510, a vortex is formed which generates a suction on one side (positions (1), (7), and (24)), and an increased pressure on the other side (positions (2), (8), and (25)).

The pressure in position (14), (15), (18), (32), and (34) can continue to increase and is thus also returned to the Venturi devices 510 via the secondary flow. The return of the fluid through the secondary flow can lead to an increase in the vortex in the Venturi devices 510, which in turn increases the suction effect. It is therefore a self-reinforcing cycle driven by the energy present in the environment. At the same time, the fluid, which can be water, that is circulated through the pump 520, Venturi device 510*a*, turbine 522, and Venturi device 510*b* is energetically charged (increase in internal energy) which can be caused by the increased suction effect. The circulation of the fluid in the closed circuit of the pump 520, Venturi device 510*a*, turbine 522, and Venturi devices 510*b* as well as the secondary air flows can be assisted by the natural back pressure generated by the penstock tunnel. The system 500 can be referred to as a "VIP" ("Vortex Induction Pump") and/or a "VIC" ("Vortex Induction Chamber").

The principle of the VIP shown in FIGS. 5-8 is not restricted in the number of Venturi devices 510 used. In principle, the use of one Venturi device 510 is sufficient, but 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more than 100 Venturi devices 510 can be combined in one VIC. One or more Venturi devices 510 can thus be combined in a VIC.

The principle of the VIP shown in FIGS. 5-8 is not limited in the number of pumps used. Characteristic of a pump is the generation of a flow in a free-flowing medium. The principle of the VIP shown in FIGS. 5-8 is not limited in the number of turbines used. Characteristic of a turbine is the withdrawal of internal energy from a free-flowing medium. These turbines can be freely connected to any number of electrical generators.

The flow of fluid (e.g., water) in a VIP can be guided in any way (e.g., in the form of a cascade). However, it is also possible for fluid to be fed into the VIP at one point and out of the VIP at another point and discharged into the environment. In some embodiments, the proportion of the operating energy required for the operation of the VIP increases in relation to the energy that the flowable medium has when discharging was removed. The number of turbines and generators is also not limited.

In some embodiments, when the systems 500, 600, 700, and 800 are used for hydroelectric storage, the Venturi device 510 can work together with the turbine 522 to help transport water to elevated reservoirs after the water is utilized in electricity generation. The high-pressure bypass line 524 can be split such that pressurized water can be transferred to said elevated reservoirs by using the pressure lost through friction and radiation at the turbine 522. The systems 500, 600, 700, and 800 can be used for hydroelectric storage when electricity demand on the electricity grid is low, such as at night. Less in demand, cheaper electricity can be used to store fluid in the upper reservoir 504 for electricity generation during the day via the systems 500, 600, 700, and 800 as discussed herein when electricity demand is high.

Phase Shifting Thermal Energy Conversion System

Figure 9:
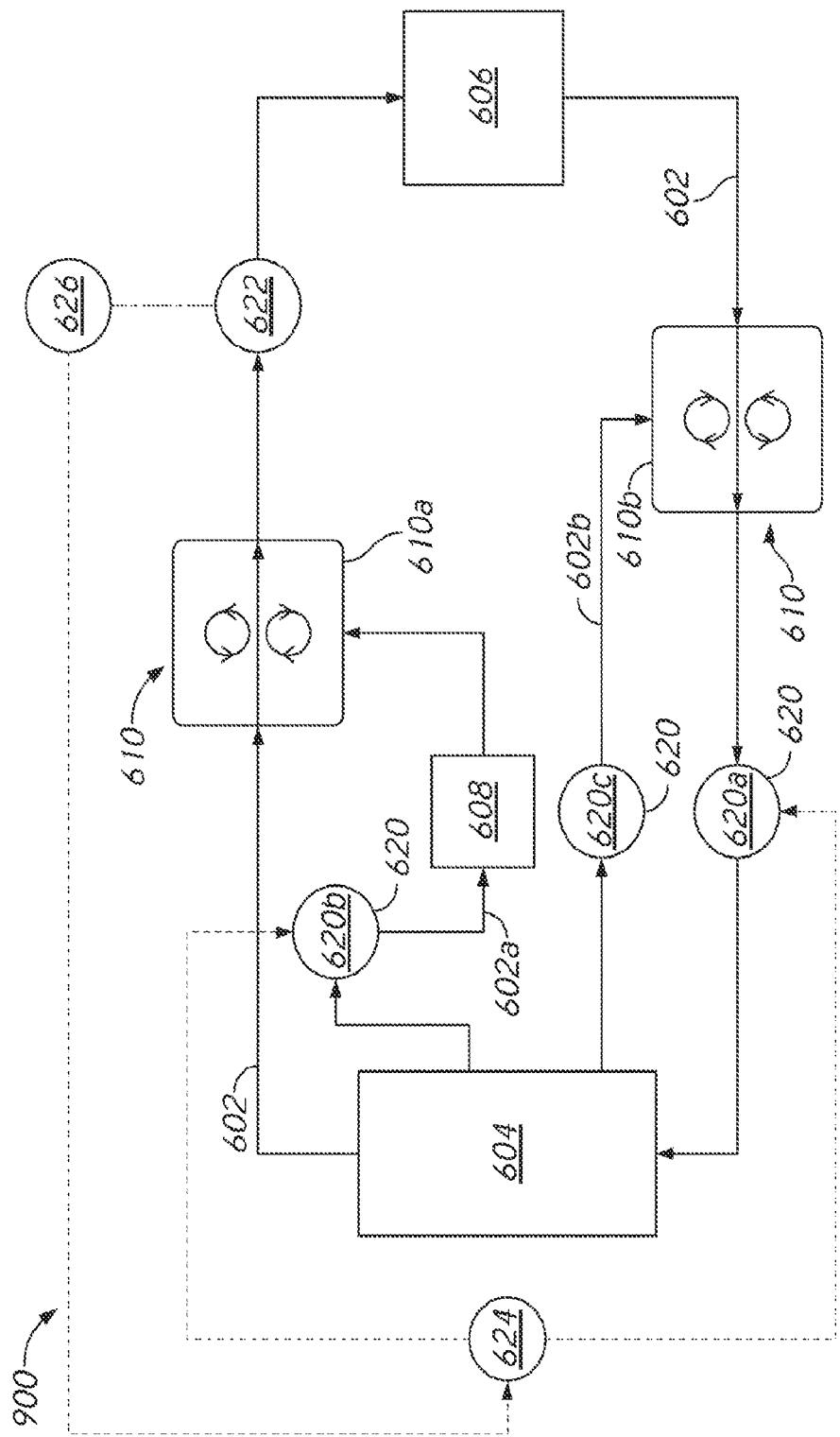
FIGS. 9-10 illustrate a phase shifting thermal energy conversion system to convert thermal energy into electrical energy.
Figure 10:
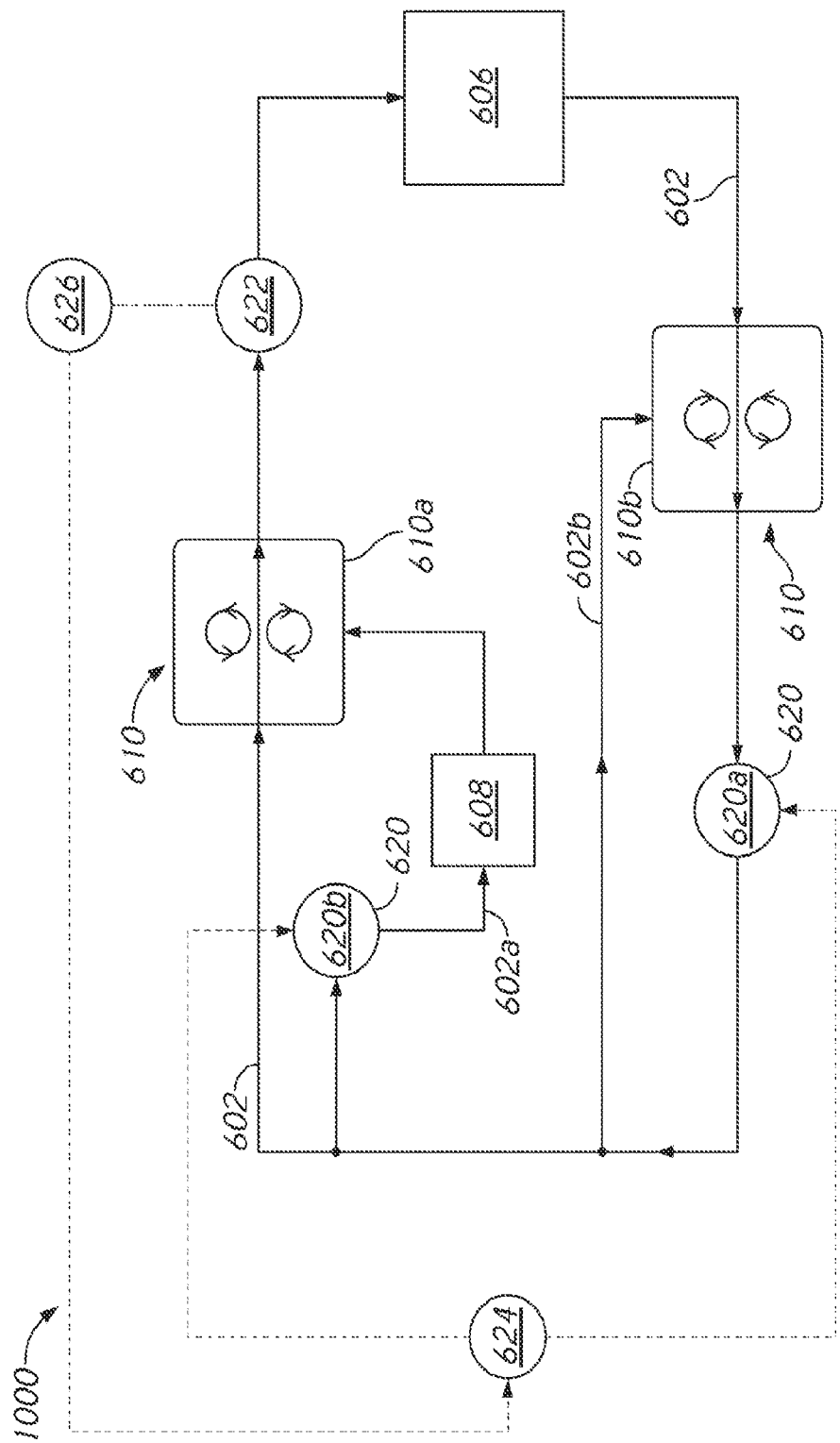

FIG. 9 illustrates a phase shifting system 900 having a phase shifting energy conversion system within a fluid stream in motion. FIG. 10 illustrates a configuration of a phase shifting system 1000 having a phase shifting energy conversion system within a fluid stream in motion. A phase shifting fluid composition used within the systems 900 and 1000 can be designed to maximize boundary layer efficiency, prevent breakdown of fluid through the high heat cyclic operation, to maximize viscosity to reduce potential cavitation, and to store and redirect ionized and thermal energy in the fluid stream to sustain operation past standard physic models of unmodified fluid streams.

The systems 900 and 1000 can use a thermal energy storage using cutting edge physics and thermal, chemical, kinetic reaction. The systems 900 and 1000 can use nanoparticle structures that deploy the graphene and copper particle sizes with unique H2O, blended glycol formulas to enable high viscosity and low environmental impact. For example, a copper-propylene glycol nanofluid can be as an efficient thermic fluid for application in discharge cycle of thermal energy storage. Nanofluids disclosed herein heat transfer fluids for a wide range of energy management applications. Probe ultrasonication-mediated preparation of copper-propylene glycol nanofluid is accomplished through dispersion of biosurfactant-functionalized copper nanoparticles in propylene glycol. Copper-propylene glycol nanofluids are colloidally stable; retain their thermal conductivity enhancement despite repeated heating-cooling cycles and storage for more than 15 days, for example. These nanofluids exhibit temperature-independent thermal conductivity enhancement, with about ~11% enhancement for 1 vol % nanofluid, attributable to Brownian motion and interfacial layering. The viscosity of nanofluids is lower than that of base fluid (propylene glycol) due to interactions between biosurfactant and propylene glycol. In some examples, 1 vol % copper-propylene glycol nanofluid as coolant can lead to, for example, 13.2% or great improvement in the rate of energy recovery from a constant-temperature hot bath when the heat transfer resistance in the hot fluid side is low. Such nanofluids can be used in energy management in solar thermal systems. In addition, disclosed is a unique reaction with graphene that presents a further efficiency of 20%, for example, with minimal or marginal effect to fluid viscosity by pairing these two particles in a unique sizing on the nano scale. This added storage duration and power density can reduce the size of thermal liquid cooling systems, thermal energy conversion systems, high performance automotive cooling systems, and many other environments with boundary layer fluid interaction. The nanofluid composition can deploy a silicone structure to the phase shifting composition to enable higher rate discharge of the ionization created by the fluid stream in motion to be applied with systems disclosed herein and other applications.

As shown in 9 and 10, the systems 900 and 1000 can include a fluid loop 602 that circulates the primary flow of fluid. The fluid loop 602 can include tubing, conduits, pipes, etc. to circulate the primary flow fluid. The system 900 can include a fluid reservoir 604, a condenser such as a cooling coil 606, a heater 608, one or more Venturi devices 610 (e.g., two), one or more pumps 620, a turbine 622, and a generator 626. In some configurations, the fluid reservoir 604 unit can be the low-pressure point of the system 900. The fluid reservoir 604 can be the bulk thermal mass interacting with the environment to maintain a baseline thermal energy that is relative and pre-heated through natural convection prior to charging a manifold as discussed herein via for example ambient or solar energy.

The fluid reservoir 604, the cooling coil 606, the one or more Venturi devices 610 (e.g., two), the one or more pumps 620, and/or turbine 622 can be disposed on the fluid loop 602. A first pump 620a can be disposed on the fluid loop 602 between an inlet of the reservoir tank 604 and an outlet of the second Venturi device 610b on the fluid loop 602. The first pump 620a can be configured to drive the primary flow of the fluid loop 602. A first Venturi device 610a can be disposed on the fluid loop downstream of the first pump 620a and upstream of the turbine 622 on the fluid loop.

A second Venturi device 610b can be disposed on the fluid loop 602 downstream of the turbine 622 and upstream of the first pump 620a on the fluid loop. The reservoir tank 604 can be disposed on the fluid loop 602, said reservoir tank 604 containing the fluid. The reservoir tank 604 can be downstream of the second Venturi device 610b and upstream of the first Venturi device 610a. A second pump 620b and the heater 608 can be disposed on a secondary fluid path 602a (also mentioned herein as a "first conduit") disposed between the fluid reservoir 604 and an inlet of first Venturi device 610a which can be similar or identical to the inlet 116 of the Venturi device 100 and/or the inlet 316 of the Venturi device 300.

The first conduit 602a can be configured to direct the secondary flow from the primary flow to the secondary input of the first Venturi device 610a. The secondary fluid path 602a can be fluidically connected to the fluid loop 602. A third pump 620c can be disposed on a secondary fluid path 602b (also discussed herein as a "second conduit") disposed between the upper reservoir 604 and a second Venturi device 610b. The secondary fluid path 602b can be fluidically connected to the fluid loop 602. The secondary flow of the second Venturi 610b can flow from the fluid reservoir 604 to the secondary input of the second Venturi device 610b which can be similar and/or identical to the inlet 116 of the Venturi device 100 or conduit 316 of the Venturi device 300. The third pump 620c can be configured to drive the secondary flow from the primary flow to the secondary input of the second Venturi device 610b. The secondary input of the Venturi devices 610 can be adjustable to regulate an input of the secondary flow into the primary flow As shown in FIG. 10, the system 1000 can function similarly to system 900 discussed herein without the fluid source 604 and the third pump 620c. In some embodiments, the fluid source 604 and/or the third pump 620c can be disconnected from the system 1000 after the primary flow and/or secondary flow reach a determined flow rate.

The first and second pumps 620a, 620b can be powered by one or more motors 624 that can be configured to be powered by at least one of the generators 626 and an external power supply. The turbine 622 can be disposed between the first Venturi device 610a and the condenser 606 on the fluid loop 602. The fluid reservoir 604 can be disposed between the first Venturi device 610a and the first pump 620a on the fluid loop 602. The cooling coil 606 can be disposed on the fluid loop 602 downstream of the turbine 622 and upstream of the first pump 620a on the fluid loop 602. The cooling coil 606 can be configured to condense the primary flow exiting the turbine 622. The cooling coil 606 can comprise any refrigerant cycle, such as CO2. In some embodiments, the system 900, 1000 uses a condenser with or alternatively from the cooling coil 606.

The primary flow can start at the pump 620b and then flow through the fluid reservoir 604, the first Venturi device 610a, the turbine 622, the cooling coils 606, and the second Venturi device 610b on the fluid loop 602 before reaching the pump 620b again to recirculate. As described herein, the secondary fluid paths 602a, 602b, which can be the same as conduit 116 described in reference to FIGS. 1A-1C and/or the conduit 316 described in FIG. 3, can route a portion of the primary flow (e.g., secondary flow) from the fluid loop 602 and back to the first Venturi device 610a and second Venturi device 610b to create vortices therein, as described above in reference to FIGS. 1A-1C and 3, to generate a suction to facilitate the harvesting of thermal energy from the ambient environment outside the first Venturi device 610a and second Venturi device 610b. In some configurations, the secondary fluid paths 602a, 602b can direct the secondary flow, pulled from the primary flow, from the fluid loop 602 at the one or more pumps 620 to the first Venturi device 610a and second Venturi device 610b.

As described herein, the Venturi devices 610 can include a converging portion and a diverging portion, similar to the converging portion 106 and diverging portion 110 of the Venturi device 100 and/or to the converging portion 306 and diverging portion 310 of the Venturi device 300, wherein a movement of the primary flow through the converging portion and the diverging portion produces a Venturi effect that decreases a temperature of the primary flow upstream of the diverging portion such that thermal energy from an ambient environment outside the body is transferred to the primary flow. A secondary input corresponding to the secondary input 120 of the Venturi device of FIGS. 1A-1C and/or the secondary input 320 of the Venturi device of FIG. 3 can be disposed between the converging portion and the outlet. The secondary input can be configured to direct a secondary flow of the fluid into the primary flow at an angle relative to a direction of flow of the primary flow to create a vortex for producing a suction at the inlet to suck the primary flow through the inlet and into the body. The flowing of the primary flow through the body can decrease the temperature of the primary flow upstream of the diverging portion such that thermal energy from the ambient environment outside the body is transferred to the primary flow, causing the temperature and the pressure of the primary flow to increase through the diverging portion before ejection through the outlet.

As described herein, the first Venturi device 610a can be configured to heat the primary flow passing through the first Venturi device 610a such that the primary flow phase shifts from the liquid state to the gas state. The phase shifting process can take place at first Venturi 610a as well as in the secondary flow of the Venturi 610a. The first Venturi 610a can heat the fluid by dropping the temperature of the fluid as discussed herein, which cools the Venturi 610a and then transfers heat from the ambient environment to heat the fluid. The transfer of heat from the ambient environment increases the fluid temperature for the primary flow to phase shift from a liquid state to a gas state in the first Venturi device 610a.

The heater 608 discussed herein and connected to secondary fluid path 502a of the first Venturi device 610a can include one or more solar tubes and/or a heater cartridge configured to heat the fluid flowing through the secondary fluid path 602a. The one or more solar tubes can be configured to heat the secondary flow of the first Venturi device 610a via solar radiation. The first conduit 602a can include a solar tube manifold connected to the one or more solar tubes and transfer heat from the one or more solar tubes to the secondary flow in the first conduit 602a. In some embodiments, the heater cartridge is powered by a solar panel assembly configured to generate electricity to heat the heater cartridge. The heater cartridge can be powered by an external power source and/or generator 626. The heater cartridge can be used with or alternatively from the one or more solar tubes. The heater 608 can heat the secondary flow in the secondary fluid path 602a for the secondary flow to phase shift from a liquid state to a gas before entering the secondary input of the first Venturi device 610a.

The generator 626 can generate electrical energy from the mechanical energy of the turbine 622 as the primary flow drives the turbine 622. The turbine 622 can be of a mixed flow style turbine having modified volute casing to manage the density and variable pressure environment and provide a sufficient bypass actuated waste gate system.

It can be assumed that neither frictional losses, dissipation losses nor the conversion losses between the individual forms of energy occur. The primary flow passes through the points (11), (21), (13), (12), (1), (2), (3), (4), (5), (19), (20), (6), (7), (8), (9), (10), (11), (16), (17), (18), (15), (22), (23), (24), (25), (26), and (14) of a fluid loop 602, which can be connected by way of tubing, pipes, conduits, and the like, and thus circulates in a circuit (e.g., fluid loop) which links the one or more pumps 620, the first Venturi device 610a, turbine 622, the second Venturi device 510b, and the generator 626.

This circulating flow can be referred to as the primary flow. The primary flow can cause two effects. First, the turbine 622 can be driven, which drives the generator 626, which in turn results in that electrical energy can be taken off in the form of electricity. Second, at points (22) and (16), a secondary flow is directed via points (14) and (15) into the first Venturi device 610a and second Venturi device 610b where it rejoins the primary flow, as detailed herein with reference to the secondary flow being directed into the primary flow. As a result, the vortices described above are formed in the Venturi devices 610, which generate a suction on the back of the Venturi device 610 (points (1) and (7)).

As described above, in the Venturi device 610, a vortex is formed which generates a suction on one side (positions (1) and (7)), and an increased pressure on the other side (positions (2) and (8)). On the suction side, the intake of the primary flow, in combination with the Venturi effect, causes the primary flow to undergo cooling so that thermal energy is absorbed from the environment in the form of heat. This absorbed energy on the pressure side causes the pressure to continue to increase and thus also be returned to the Venturi device 610 via the secondary air flow. This in turn increases the swirl of the vortex, which in turn increases the suction effect and the associated cooling or the transport of heat into the circulating fluid. It is therefore a self-amplifying loop driven by the heat energy present in the environment.

On the pressure side, this absorbed energy means that the pressure in position (16) and (22) continues to increase and is thus also returned to the Venturi devices 610 via the secondary flow. This in turn leads to an increase in the vortex in the Venturi devices 610, which in turn increases the suction effect and the associated cooling or transport of heat into the circulating fluid. It is therefore a self-reinforcing cycle driven by the heat energy present in the environment. At the same time, the fluid, which can be the nanofluid, that is circulated through the pump 620, first Venturi device 610*a*, turbine 622, and second Venturi device 610*b* is energetically charged (increase in internal energy). This energy can be converted into electrical energy via the turbine 622 and generator 626 in such a way that energy losses, for example due to friction, can be compensated for by always being able to drive the one or more pumps 620 at full power. The circulation of the fluid in the closed circuit of the one or more pumps 620, first Venturi device 610*a*, turbine 622, and second Venturi device 610*b* as well as the secondary air flows can be maintained. The system 900 can be referred to as a "VIP" ("Vortex Induction Pump") and/or a "VIC" ("Vortex Induction Chamber").

As described herein, the characteristics of the system 900 can include:

- thermal energy (e.g., from the thermal storage unit) is transferred to a flowing fluid medium by means of passing the fluid through the thermal storage unit,
- internal energy can be withdrawn from the flowing fluid medium (which can be referred to as "discharging the fluid medium"), and
- part of the energy withdrawn from the flowable medium can compensate for energy losses caused by friction, dissipation (this also can include the effects of electrical resistance in the event that electrical currents flow) and/or conversion losses, the VIP can provide energy such that the cycle of charging and discharging of the flowing flowable medium is maintained (operating energy).
- the first venturi device, and the turbine are a more efficient pump and boiler system If the energy produced by the generator 626 has reached a level sufficient to fully drive the motor, the system 900, 1000 can generate power without an external electrical power source, but instead, the energy of the primary flow can be sufficient to power the system 900 via absorption of thermal energy from the ambient environment. The system 900, 1000 can be externally powered to, for example, drive the first pump 620*a* until the system 900, 1000 is transferring sufficient thermal energy from the environment for the system 900, 1000 to operate and generate electricity as discussed herein, including powering the one or more pumps of the system 900, 1000.

In some configurations, excess energy from the system 900 can be stored in batteries in the form of electrical energy or fed into an electrical power grid.

The systems 900 and 1000 may also facilitate energy to be taken from an ambient environment at low temperature levels. The Carnot efficiency of a VIP at Twarm=293 K and Tcold=283 K (difference=10 K) and an ordinary heat engine at Twarm=1273 K and Tcold=1229 K (difference=44 K) according to formula 1 would be the same. With a lower temperature difference, a VIP can thus achieve the same efficiencies, and the demands on the materials can be lower due to the lower temperature.

The principle of the VIP shown in FIG. 9 is not restricted in the number of the Venturi devices 510 used. In principle, the use of one Venturi devices 510 is sufficient, but 2,3,4,5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more than 100 Venturi devices 510 can be combined in one VIP. One or more Venturi devices 510 can thus be combined in a VIP.

The principle of the VIP shown in FIGS. 9-10 is not limited in the number of pumps used. Characteristic of a pump is the generation of a flow in a free-flowing medium. The same applies to the number of engines.

The principle of the VIP shown in FIGS. 9-10 is not limited in the number of turbines used. Characteristic of a turbine is the withdrawal of internal energy from a free-flowing medium. These turbines can be freely connected to any number of electrical generators.

The flow of fluid (e.g., nanofluid) in a VIP can be guided in any way (e.g., in the form of a cascade). However, it is also possible for fluid to be fed into the VIP at one point and out of the VIP at another point and discharged into the closed environment. In this case, the proportion of the operating energy required for the operation of the VIP increases in relation to the energy that the flowable medium has when discharging was removed. The number of turbines and generators is also not limited. As described herein, the discharging of the flowable medium (e.g., nanofluid) in one or more Venturi devices 610 or vortex fusion chargers can be accomplished with and the conversion of this energy into another form of energy, for example electrical energy.

Thermal energy can thus be converted into mechanical energy and ultimately into electrical energy by means of the suction-acting mechanisms in the Venturi device 510. The advantage of the presented VIP is that low-value thermal energy (ambient temperature) can be converted into higher-value energy (electricity). The VIP accomplish the foregoing based on the suction effect.

The VIP and Venturi device 610 can be used with any flowable media, which can include at least those recited herein.

Forced Induction Charging and Heating

FIG. 11-14 illustrates a forced induction charging system 1100 that can utilize aerodynamic forced induction to capture the incoming fluid flow of a vehicle 1130 in motion to convert wind resistance to electrical energy. Utilizing high resonance and dynamic phenomenon, such as the Coandă effect, the Venturi effect, and pressure differential vortices, the system 1100 can utilize aerodynamic drag with high efficiency to create 1, 2, 3, 4, or more kw per second at freeway speed.

The system 1100 can include an expandable and/or shape-shifting intake funnel, channel, siphon, cowl 1101, an inlet, entrance, entry 1102 of the intake funnel 1101, an outlet 1103 of the intake funnel 1101, and a body, frame, chassis 1104 between the inlet 1102 and outlet 103 of the intake funnel 1101. The inlet 1102 of the intake funnel 1101 can have a cross-sectional flow area larger than a cross-sectional flow area of the outlet 1103. The body 1104 can be made of a shape changing portion 1109 that can expand or contract to change a cross-sectional flow area of the body 1104. The inlet 1102 can face forward toward the front of the vehicle 1130 to direct the ambient airflow into the inlet 1102 with the moving vehicle in motion in a forward direction. The intake funnel 1101 can direct an ambient airflow caused by the moving vehicle 1130 to travel from the inlet 1102 through the body 1104 and out through the outlet 1103.

The intake funnel 1101 can be positioned at the front of the vehicle 1130 at the front air dam assembly to optimize the input of the fluid stream to a high, desired, or predetermined velocity prior to interaction with the Venturi device 1110 and to take advantage of wind shear. The intake funnel 1101 can be positioned towards the bottom and/or the top of the front of the vehicle 1130. The intake funnel 1101 can be exposed to the ambient air and/or positioned behind a cover such as the grille and/or front air dam of the vehicle 1130. As the vehicle 1130 travels in a forward direction, an airstream over and/or under the vehicle can be introduced into the intake funnel 1101. As the vehicle 1130 accelerates, the flow rate of the airstream intake funnel can also accelerate.

Figure 15:
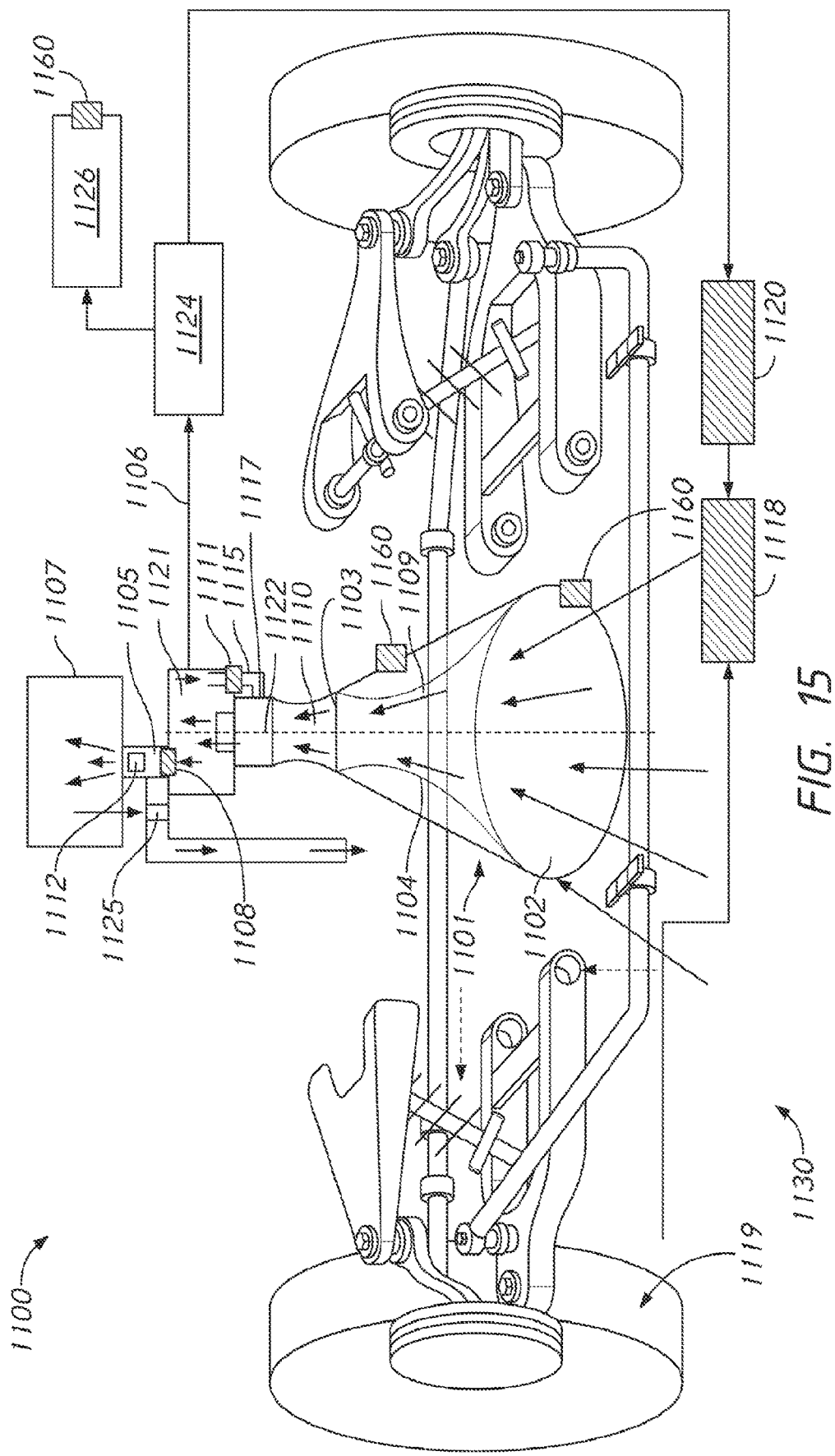
FIG. 15 illustrates a configuration of a forced induction system for a vehicle to induce ambient airflow to generate electrical energy from the ambient airflow.

As illustrated in FIG. 15, the system 1100 can also include a fan 1118 that faces the inlet 1102 and direct air into the inlet 1102. The fan 1118 can also, in some configuration, be connected to a wheel 1119 of the vehicle 1130. The fan 1118 can be driven by rotation of the wheel 1119. As the wheel 1119 revolves, the fan can be turned to generate a primary flow.

Additionally or alternatively, the fan 1118 can be connected to a motor 1120 of the vehicle 1130 such that the motor 1120 drives the fan 1118. A reduction gear drive connected to the motor 1120 can then be connected to the fan 1118. The system 1100 can then maintain and/or improve the efficiency of the system using the Venturi devices 1110 and primary and secondary flows in conjunction with the motor 1120 to lower the overall energy intake of the system 1100. By using a fan 1118, the intake funnel 1101 can face in any direction to entrain air into the system 1100.

The forced induction system 1100 can also include one or more Venturi devices 1110, which can be similar or identical to Venturi device 100 shown in FIGS. 1A-1C and/or Venturi device 400 shown in FIGS. 4A-4D, connected to the intake funnel 1101, a turbine 1121 in a volute casing connected to the Venturi devices 1110, and a generator 1124 driven by the turbine 1121 to generate electricity.

The Venturi device 1110 can be either directly connected to the intake funnel 1101 or by tubing, conduits, pipes, etc. such that the Venturi device 1110 receives a primary flow made up of the ambient air exiting the outlet 1103 of the intake funnel 1101 when can then be ejected by the Venturi device 1110. As described herein, the Venturi device 1110 can further include a body similar to the body 411 of the Venturi device 400, a converging portion and a diverging portion similar to the converging portion 406 and the diverging portion 410 of Venturi device 400 such that the movement of the primary flow through the converging portion and the diverging portion produces a Venturi effect, pulling the primary flow in through the inlet of the Venturi device. Lastly, the Venturi device 1110 can include a secondary input similar or identical to the secondary input 420 of the Venturi device 400 which can be positioned the converging portion and the outlet to direct a secondary flow of fluid into the primary flow to create a vortex for producing a suction at the inlet of the Venturi device to pull the primary flow through the inlet of the Venturi device and into the body of the Venturi device to increase the primary flow through the outlet of the Venturi device.

The turbine 1121 can include an inlet 1122 and an outlet 1123 with the inlet 1122 connected to the outlet of the Venturi device 1110 to receive the primary flow ejected from said outlet. The primary flow can drive the turbine 1121. To charge a battery 1126, the system 1100 can maximize dynamic energy translation from potential input by coupling the turbine 1121 and generator 1124 with a drive system 1106 to translate kinetic energy into electricity. The drive system 1106 be a cycloidal (e.g., circular) gear box containing planetary and sun gears acting as a gear reduction drive. A shaft from the turbine 1121 can be connected to the cycloidal gear box with a flange connecting the cycloidal gear box and generator 1124. The gear box and manage the efficiency of the turbine 1121 and the generator 1124.

In some configurations, the generator 1124 comprises a matched self-excited induction generator which does not require an input for activation. A self-excited induction generator utilizes some of the power output from a rotor that rotates in a magnetic field within the generator to power field coils. The metallic material (e.g., iron) of the rotor retains a degree of residual magnetism when the generator is shut off. Since the generator is started with no load connected, the residual magnetism introduces a weak current into the rotor coils, which in turn creates an initial field current and increases the strength of the field. The induced current in the rotor continues in a feedback process until the generator builds up full voltage.

Additionally or alternatively, to charge the battery 1126, a permanent magnet stator charging system can be used to provide high efficiency charging and a low total footprint. A stator is a stationary component of a rotary system found inside a generator. Energy flows through the stator to and/or from the rotating component causing the stator to generate a magnetic field that drives a rotating armature. The stator convers the rotating magnetic field to electrical current. A permanent magnet stator utilizes an object made from a magnetized material and that creates its own persistent magnetic field.

The Venturi device 1110 and turbine 1121 can be fitted with a bypass conduit, pipe, channel, duct 1115 positioned at the high-pressure point of the turbine 1121 to recirculate the secondary flow and recycle of wasted thermal energy by moving the thermal energy through the bypass conduit 1115 to the low-pressure point of the Venturi device 1110. The bypass conduit 1115 can be connected to a secondary input 1117 to direct the secondary flow to the Venturi device 1110. The secondary input 1117 can be adjustable to regulate an input of the secondary flow into the primary flow to control a volume of flow of the secondary flow into the secondary input.

In connecting the Venturi device 1110 and turbine 1121 with the bypass conduit 1115, the Venturi device 1110 can generate a higher input velocity and mass air density which greatly improves the boundary layer fluid dynamics and fluid potential energy at the turbine 1121 as the fluid passes from the Venturi device 1110 to the turbine 1121. In some configurations, the input velocity and mass air density can increase by a factor of 2 to 8, by a factor of 3 to 7, or by a factor of 4 to 6.

The system 1100 can also include a first valve 1108, a second valve 1111, and/or a third valve 1125 to control the path of the primary flow through the system. The valves 1108, 1111, 1125 can be of any type of valve such as a butterfly valve and/or stopcock valve to manage the flow rate of the primary and secondary flows. In some configuration, valves 1108, 1111, 1125 can be actuator driven to open and/or close. In some configuration, the valves 1108, 1111, 1125 can be actuated by a bimetallic spring that causes said valves 1108, 1111, 1125 to open and/or close.

In some configuration, the first valve 1108 can be positioned at the turbine outlet 1123 and be connected to the passenger cabin duct 1105 to control how much of the primary flow is passed through the passenger cabin duct 1105 and into a passenger cabin, compartment 1107. The valve 1108 can control the temperature of the primary flow (e.g., warm or cold) into the passenger cabin 1107 by opening and closing based on a response provided by a passenger. The valve 1108 can close completely when a response is detected that no flow is to enter the passenger cabin 1107. The passenger cabin duct 1105 can also be split into two or more conduits that feed into the passenger cabin 1107 in which the valve 1108 or more than one valve 1108 can further balance the flow into either one or more conduits.

In some configuration, the second valve 1111 can be positioned in between the turbine outlet 1123 and the bypass conduit 1115 to control how much of the primary flow is recycled back to the Venturi device 1110 as the secondary flow. Before the bypass conduit 1115 can be utilized, the turbine 1121 should to reach an operating speed between 40,000 rpm to 80,000 rpm, between 45,000 rpm to 75,000 rpm, between 50,000 rpm to 70,000 rpm, or between 55,000 rpm to 65,0000 in order to prevent stalling of the turbine 1121. Valves 1108, 1111, 1125 can remain open during the startup of the turbine 1121 to prevent an accumulation of back pressure on the turbine 1121. As the turbine 1121 passes through its start up speed and reaches its operational speed, valves 1108, 1111, 1125 can be adjusted to regulate the primary flow. Therefore, once the turbine 1121 reaches its operational speed, the primary flow can be adjusted to flow through the bypass conduit 1115 to provide the secondary flow to the Venturi device 1110 by adjusting valve 1111 to the desired flow rate.

Additionally or alternative, valve 1125 can be positioned between the turbine outlet 1123 and a bypass duct, pipe, channel, conduit 1116 that directs the primary flow (e.g., excess primary flow that is not ducted into the passenger cabin 1107 and/or Venturi device 1110) to the inside and/or the outside of the vehicle 1130 such that the valve 1125 controls the rate at which the primary flow is ducted to the inside and/or the outside of the vehicle 1130. The bypass duct 1116 can direct the primary flow to an underside of the vehicle 1130 to bypass and/or minimize flow to the passenger cabin 1107 and/or Venturi device 1110. The bypass duct 1116 can also direct the flow to cool the motor 1120 as described in the Section titled "Motor Cooling System" below. When more flow is needed into the passenger cabin 1107 and/or Venturi device 1110, the valve 1125 can be adjusted to limit or close off the flow to the bypass duct 1116 such that a greater volume of the primary flow flows into the passenger cabin 1107 and/or Venturi device 1110.

Valves 1108, 1111, 1125 can be controlled simultaneously or independently to ensure that there is a minimal backpressure on the turbine 1121. Additionally or alternative, the valves 1108, 1111, 1125 can be controlled simultaneously or independently to supply an input inlet pressure to the Venturi device 1110 to overcome stalling of the turbine 1121 under heavy load situations, and thus recycling as much dynamic energy as possible back into the system 1100.

In some configurations, valves 1108, 1111, 1125 can be the same valve which operates and be positioned to perform all the functions of valves 1108, 1111, 1125. A common conduit from the turbine outlet 1123 can be directed toward a single valve operating as valves 1108, 1111, 1125, which then adjusts the primary flow into multiple conduits corresponding to the conduits connected to valves 1108, 1111, 1125. The primary flow can then be distributed evenly into the multiple conduits and/or controlled to distribute desired or predetermined volume of flow by the openness and/or closeness of the single valve. The single valve can be the same type or a different type than valves 1108, 1111, 1125.

Figure 17:
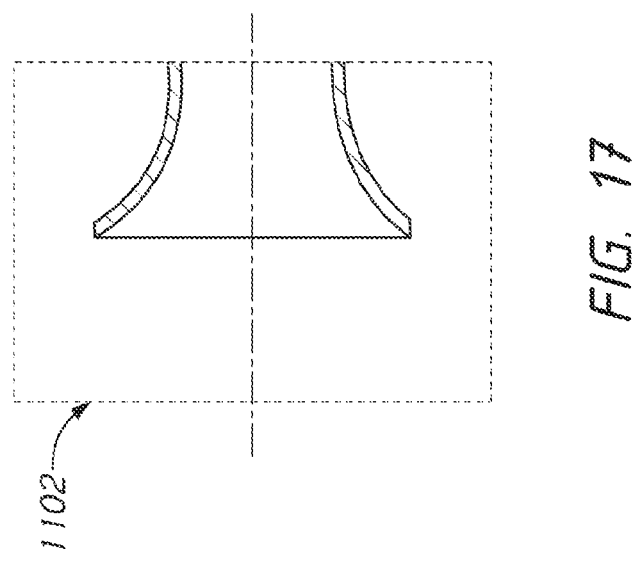
FIG. 17 illustrates an inlet of non-Euclidean geometry which can be incorporated in the Venturi device of FIGS. 11-16.

The use of non-Euclidean geometry for the shaping of the inlet 1102 further improves resonance and flow as the fluid enters the intake funnel 1101. The inlet 1102 acts as a gateway point into the system for environmental interaction, which can further increase the dynamic output of system 1100. For example, and as illustrated in FIG. 17, the inlet 1102 of the intake funnel 1101 can be of a non-Euclidean geometry (having a hyperbolic or elliptical shape) such that said inlet 1102 can be a velocity stack, trumpet, or air horn having a trumpet-shaped design with differing lengths with elliptical (boundary line curving towards an opposing boundary line) or hyperbolic lines (boundary line curving away from an opposing boundary line). Using non-Euclidean geometry allows for a smooth and even entry of air at high velocities into the intake funnel 1101 with the flow stream adhering to an inner surface of the intake funnel 1101 as laminar flow. Non-Euclidean geometry can also modify the dynamic tuning range of the intake funnel 1101 by functioning as a resonating pipe which can adjust the frequency of pressure pulses based on the length within the intake funnel 1101. By having a hyperbolic shape forming inlet 1102, the intake funnel 1101 can provide an efficient fluid flow to a turbine, such as turbine 1121. Additionally or alternatively, no intersecting points in the cross sections of the cowl surface wall of the intake cowl 1101 can provide an efficient fluid flow to turbine.

The outlet 1123 of the turbine 1121 can also be connected to a passenger cabin duct 1105 of the vehicle 1130. The passenger cabin duct 1105 can direct the flow of primary fluid into a passenger cabin 1107 (also referenced herein as "a cabin interior") of the vehicle 1130. One or more passengers can then provide inputs into the system 1100 from inside and/or outside the passenger cabin 1107.

In some configurations, a heat source 1112 (e.g., a glow plug) can be positioned at or near the passenger cabin duct 1105 to minimize conversion losses of the system 1100. The heat source 1112 can heat the primary flow directed to the passenger cabin 1107. Residual thermal energy and the exhaust flow from the turbine 1121 can be ducted into the vehicle passenger cabin 1107 to enhance the cabin heating system, offsetting energy consumption of the vehicle heating and blower system. This will also offset some of the aerodynamic drag losses that may be present the system. In some configurations, the heat source 1112 can be a glow plug. The heat source 1112 can be utilized to increase the cabin heating by using ultra-high efficiency flash heating and the afterglow effect. The flash heating can be in effect for one to twenty seconds, for two to fifteen seconds, for three to ten seconds, or for four to six seconds. The afterglow warming effecting can last for one to twenty minutes, for two to fifteen minutes, for four to twelve minutes, or for five to seven minutes. The flash heating of the heat source 1112 with or without the afterglow warming effect can maintain and/or increase the thermal energy from the flow entering the cabin interior 1107, reducing the need for other high-energy consumption devices and transferring the saved energy to other systems of the vehicle 1130.

In some configurations, the heat source 1112 can be a resistance heater the primary flow flowing through the passenger cabin duct 1105. A resistance heater converts electrical energy into heat supplied to the space by passing an electrical current through a conductive material (e.g., the resistor) and releases heat. The greater the resistance in the resistance heater, the more heat is created. The resistance heater can include one or more resistance wires coiled tightly or laid out in strips. The greater the length of the resistance wire, the more heat the wire will generate. The resistance heater can be sized to adequately warm the primary flow before flowing into the passenger cabin 1107.

The heat source 1112 can be powered by the generator 1124 once the generator 1124 is charged. The system 1100 can disable a low efficiency stock heating and blower system which can save kilowatts of electricity. The saved electricity can then be directed directly to the drive system 1106 improving the range by at least 30%, by at least 40%, or by at least 50%, even in cold weather environments. The system 1100 can be fitted to electric vehicles to assist in extending the operating range. In some configurations, the heat source 1112 can by powered by the motor 1120 of the vehicle 1130.

Figure 11:
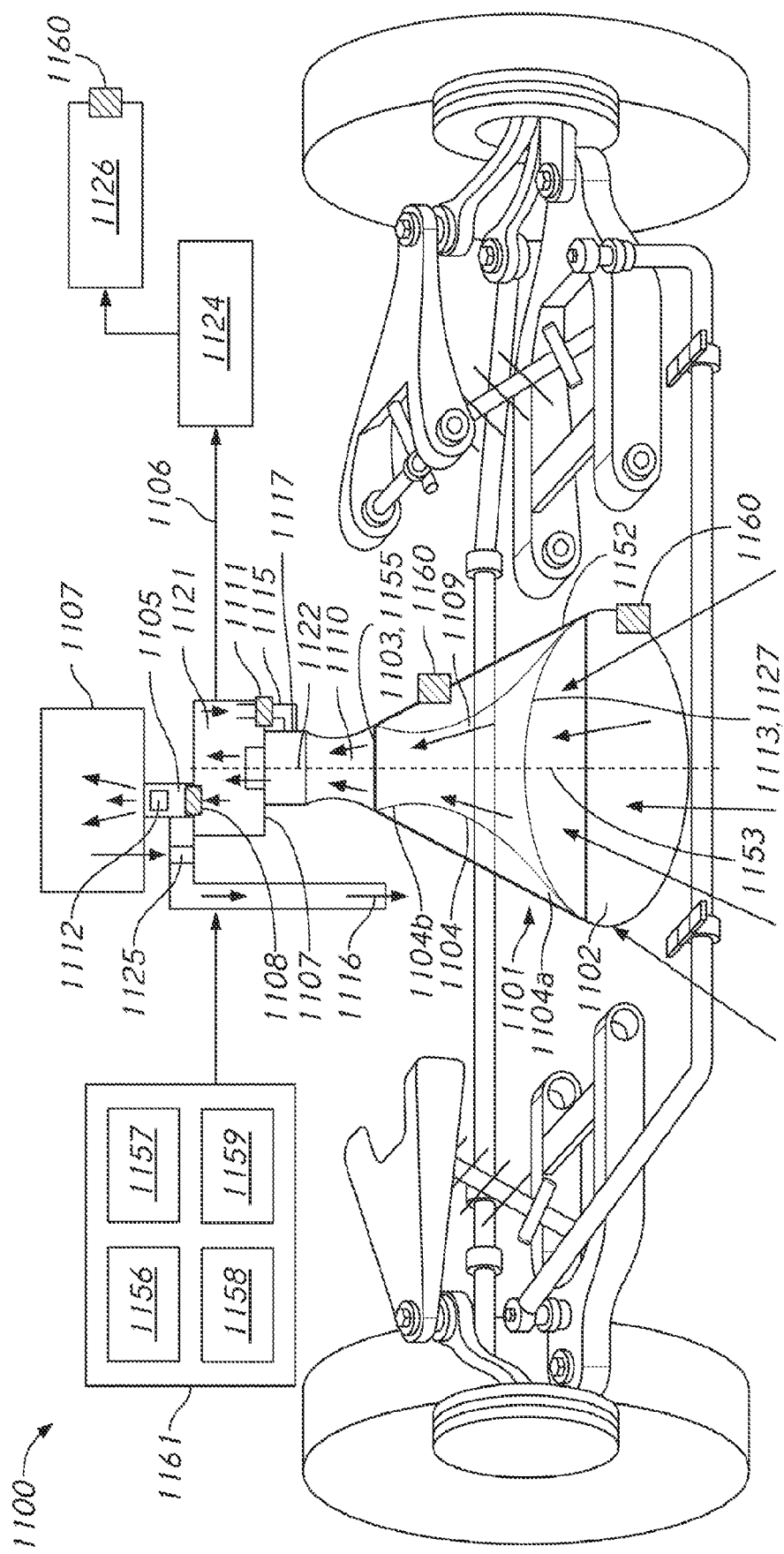
FIG. 11 illustrates a forced induction system for a vehicle to induce ambient airflow to generate electrical energy from the ambient airflow.

As shown in FIG. 11 and mentioned above, the intake funnel 1101 of the forced induction charging system 1100 can have a shape changing portion 1109 that expands or compresses to change a cross-sectional flow area of the body 1104 to collect the ambient air. The intake funnel 1101 can be constructed from shape memory materials 1113 (e.g., Nitinol or Nafion) and/or a pliable material, flexible material, malleable material 1127 causing the intake funnel 1101 to change shape and/or size of the opening to one or more predetermined shapes.

The shape change portion 1109 can include a pliable material 1127 that can change the cross-sectional flow area of the body 1104 of the intake funnel 1101. The pliable material can also expand and/or contract based on a force induced on the pliable material by the ambient airflow through the body 1104. The pliable material 1127 can change their shape based on the temperature of the ambient air flow passing through the body 1104, pressures of the ambient air flow passing through the body 1104, rate of flow of the ambient air flow passing through the body 1104, electrical current applied to the shape changing portion 1109, and/or heat applied to the shape changing portion 1109. For example, when the vehicle 1130 is traveling between 70 miles per hour (mph) to 80 mph, a volume of air flowing between 9165 cubic feet per minute (CFM) to 9270 CFM, between 9190 CFM to 9245 CFM, between 9200 CFM to 9230 CFM, or between 9210 CFM to 9220 CFM can cause the pliable material to expand as the ambient air flows through the body 1104.

In some configurations, the pliable material 1127 can be of a carbon-based polymer which reacts to certain pressures applied to the material and without the use of heat and/or an electrical charge. As discussed above, the pliable material 1127 can be pressure reactive and transform into different shapes when a pressure stimulation is applied. As the pressure along the pliable material 1127 increases as the vehicle 1130 is moving and/or accelerating, the shape changing portion 1109 can expand and/or contract based on the reactive properties of the pliable material 1127. For example, as the pliable material 1127 experiences increases in stress induced by the pressure, the pliable material 1127 can expand and/or contract at a faster or slower rate until the pliable material 1127 reaches its final transformed state. The rate of decrease of pressure can cause an opposite effect in the pliable material 1127 until the pliable material reaches the non-stimulated configuration.

In some configurations, the pliable material 1127 can react to an electrical current applied to shape changing portion 1109. Applying an electrical current can stimulate the pliable material 1127 to expand and/or contract. As the electrical current ran through the pliable material is increased, the pliable material 1127 can expand. As the electrical current is decreased, the pliable material 1127 can return to its resting state.

In some configurations, the pliable material 1127 can react to a change in temperature applied to the shape changing portion 1109. Applying a temperature change to shape changing portion 1109 can stimulate the pliable material 1127 to expand and/or contract. As the rate of the temperature change is increased, the pliable material 1127 can expand or change shape at a faster rate. As the temperature decreases whether by decreasing the heat stimulus and/or by allowing the ambient air to cool the shape changing portion 1109, the pliable material 1127 can return to its non-stimulated state. In some configurations, the system 1100 can include a heating element 1114 that applies heat to the shape changing portion 1109. The heating element 1114 can be disposed along the surface of the shape changing portion 1109 or within a wall of the shape changing portion 1109. The heating element can be located on an exterior surface of the body 1104. In some configurations, the heating element 1114 can be an elastic resistance heater wire positioned along the shape changing portion 1109.

Additionally or alternatively, as the pressure along the pliable material 1127 increases as the vehicle 1130 is moving and/or accelerating, the shape changing portion 1109 can expand in conjunction with an increase in the temperature of the body 1104, which can be caused by the ambient air flow. In contrast, as the pressure lowers and the temperature lowers, the shape changing portion 1109 can begin to contract to its original shape and/or size. By being susceptible to two inputs, the pliable material 1127 can deform at a faster rate and/or more likely to deform once a stimulant is applied.

In some configurations, the pliable material 1127 can react to an electrical current applied to shape changing portion 1109. Applying an electrical current can stimulate the pliable material 1127 to expand and/or contract. As the electrical current ran through the pliable material is increased, the pliable material 1127 can expand. As the electrical current is decreased, the pliable material 1127 can return to its resting state.

In some configurations, the pliable material 1127 can be of a piezoelectric material. The piezoelectric material can be cut into sections or applied as one unitary and/or monolithic piece. As a pressure is applied to the piezoelectric material, an electric charge can be generated in response to the mechanical stress generated by the pressure. The electric charge can cause the pliable material 1127 to further expand and/or contract in response to the pressure input. As the pressure is reduced and/or cut-off, the piezoelectric material can stop generating an electrical charge and the pliable material 1127 can reset to the non-stimulated form.

Shape memory materials can memorize one or more shapes in addition to their original shape. Shape memory materials have the advantage of high elastic deformation, low cost, and low density. The shape memory materials, for example, can be heated between 10° C. to 150° C., between 20° C. to 140° C., or between 30° C. to 130° C. to activate the memory learning characteristics once the shape memory materials have been processed and taught the contraction and expansion operations during the training protocol. The shape memory material 1113 can return to its original shape under certain conditions such as under thermal, electrical, or other stimulations. For example, Nitinol exhibited the ability to memorize multiple shapes when under temperature stimulation.

Shape memory materials can include broad glass transition temperatures such as in a range from 200° C. to 700° C., from 300° C. to 600° C., or from 400° C. to 500° C. for programing the shape memory material with one or more predetermined shapes. One or more shapes can be memorized within the temperature ranges by heating the shape memory materials to temperatures within the broad glass transition temperatures and then quenching the materials. The shape memory material can then recover to its original shape after being heated or cooled to the corresponding temperature. The broad glass transition spectrum can be divided into a series of individual glass switching for each programmed shape. Different shapes can be heated or cooled to programming temperatures. Additionally or alternatively, multiple shapes can be programmed at each temperature range.

In some configurations, the shape memory material 1113 can be a metallic material (e.g., Nickel titanium also known as Nitinol). Metallic materials can be metal allows have the shape memory effect along with superelasticity. Material such as Nitinol can undergo deformation at one temperature, stay in the deformed shape when the external force is removed, and then recover to its non-stimulated shape. The superelasticity properties allows for the metal material to undergo large deformations and return to its undeformed shape once the stimulant is removed. Nitinol, for example, can deform 10 to 30 times as much as other comparable metals and return to its original shape. The cooling/heating cycle shows thermal hysteresis which depends on the properties of the metallic material.

The shape memory materials 1113 can change their shape based on an increase and/or decrease of temperature of the ambient air flow passing through the body 1104, an increase and/or decrease of temperature applied to the body 1104, pressures of the ambient air flow passing through the body 1104, rate of flow of the ambient air flow passing through the body 1104, electrical current applied to the shape changing portion 1109, and/or heat applied to the shape changing portion 1109.

As mentioned herein, the shape memory material 1113 can react to a change in temperature applied to the shape changing portion 1109. Applying a temperature change to shape changing portion 1109 can stimulate the shape memory material 1113 to expand and/or contract as mentioned above. The shape memory material 1113 can change be transformed when the temperature of the shape changing portion 1109 reaches a temperature range, in some configurations, of 30° C. to 130° C. For example, a first deformation or predetermined shape can be programed to occur between 30° C. to 50° C. (e.g., a second cross-sectional flow area larger or greater than a first cross-section flow area when temperature is less than 30° C.); a second more pronounced and/or larger deformation or predetermined shape can occur between 50° C. to 80° C. (e.g., a third cross-sectional flow area larger or greater than a second cross-section flow area), a third more pronounced and/or larger deformation or predetermined shape can occur between 80° C. to 130° C. (e.g., a fourth cross-sectional flow area larger or greater than a third cross-section flow area), and so on until the upper bounds of the temperature deformation range is reached.

Depending on the properties of the shape memory material, the temperature ranges can be shifted up and/or down. As the rate of the temperature change is increased, the shape memory material 1113 can expand or change shape at a faster rate. As the temperature decreases whether by decreasing the heat stimulus and/or by allowing the ambient air to cool the shape changing portion 1109, the shape memory material 1113 can return to its resting state. In some configurations, the system 1100 can include a heating element 1114 that applies heat to the shape changing portion 1109. The heating element 1114 can be disposed along the surface of the shape changing portion 1109 or within a wall of the shape changing portion 1109. The heating element can be located on an exterior surface of the body 1104. In some configurations, the heating element 1114 can be an elastic resistance heater wire positioned along the shape changing portion 1109.

Additionally or alternatively, in some configurations, the shape memory material 1113 can react to an electrical current applied to shape changing portion 1109. Applying an electrical current can stimulate the shape memory material 1113 to expand and/or contract. As the electrical current ran through the pliable material is increased, the shape memory material 1113 can expand. As the electrical current is decreased, the shape memory material 1113 can return to its resting state.

Figure 16:
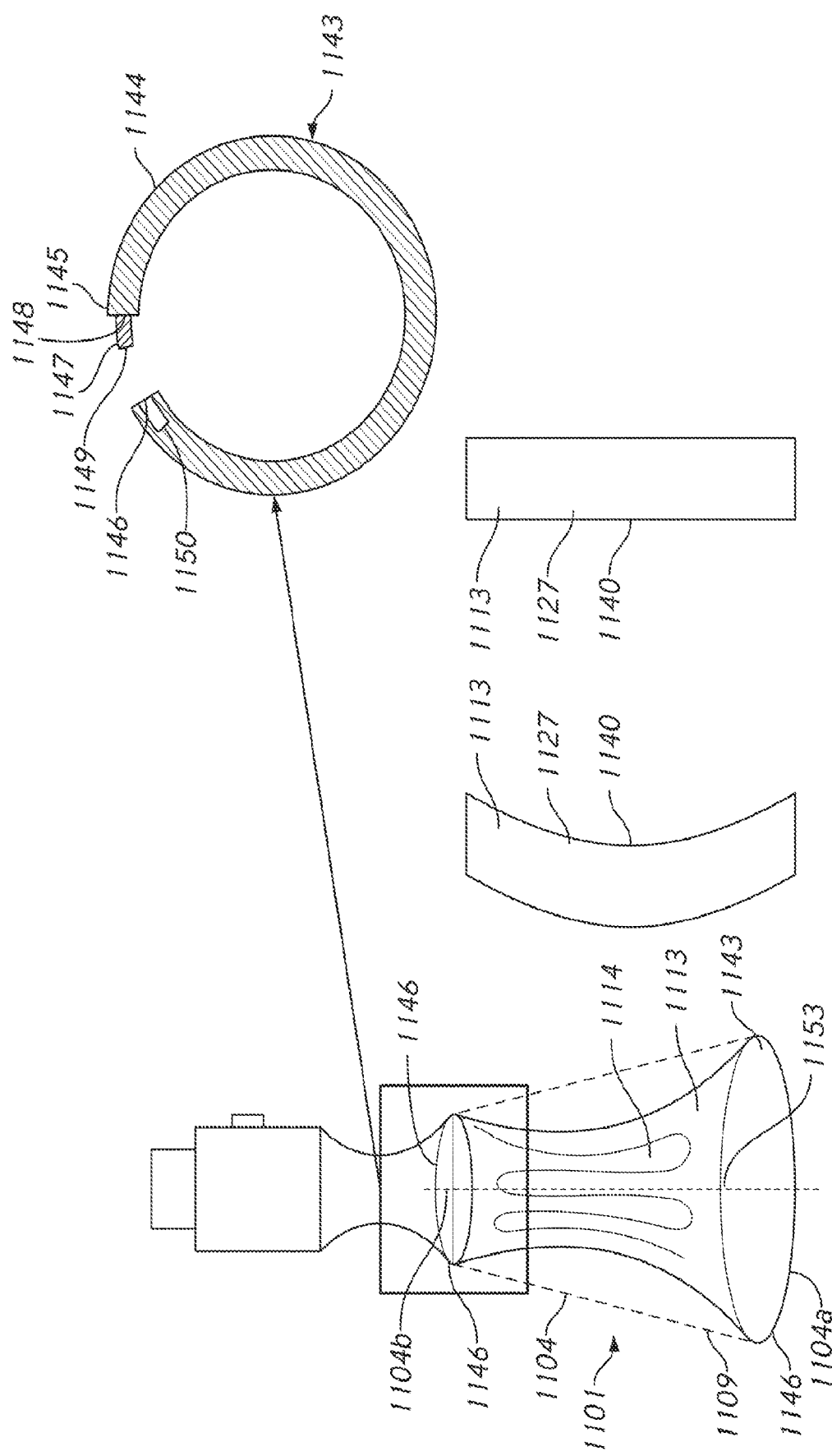
FIG. 16 illustrates material configurations which can be incorporated in the Venturi device of FIGS. 11-15.

In some configurations, the materials 1113, 1127 of the intake funnel 1101 can be fabricated into sections 1140, such as strips, bars, rods, and like, based on the width and length of the intake funnel 1101 to form the body 1104 of the intake funnel 1101. The strips 1140 can have a length between 0.5 inches to 36 inches, between 1 inch to 24 inches, between 3 inches and 18 inches, between 5 inches to 11 inches, between 6 inches to 10 inches, or between 7 inches to 9 inches. The strips 1140 can have a width between 0.5 inches to 12 inches, between 1 inch to 6 inches, or between 1.5 inches to 2.5 inches. The sections 1140 can expand and/or contract to change the cross-sectional flow area of the body 1104. Before forming the body 1104, the sections 1140 can be processed into the needed shapes and contours. As illustrated in FIG. 16, after the heat programming, the processed sections 1140 made of materials 1113, 1127 can be deformed as compared to the original sections. The sections 1140 can then be arranged based on the desired configuration of the intake funnel 1101 with an interlocking seam 1142 connecting the sections 1140 together to form the body 1104.

In some configurations, the sections 1140 can form a continuous body with an inner surface along the body 1104 in which the ambient air can flow along. The continuous body can have no gaps in between the sections such that the sections can maintain the volume of fluid flowing into the intake funnel 1101.

In some configurations, the materials 1113, 1127 can be a unitary and/or monolithic piece that can take the place of the one or more sections 1140. Rather than be cut into sections 1140, the materials 1113, 1127 can be processed into sheets and/or a single piece that is wrapped around the shape changing portion 1109. An interlocking seam 1142 can then connect the any edges of the monolithic piece and/or sheets to one another. The materials 1113, 1127 can surround the shape changing portion 1109 such that materials 1113, 1127 maintain the volume of the primary fluid flowing into the intake funnel 1101. The materials 1113, 1127 can be processed to expand and/or change size when a stimulant is applied.

FIGS. 12-14 illustrate different configurations of the longitudinal extent, length, span 1154 of each of the sections 1140 oriented along a central axis 1153. Each of the different configurations can depend on the type of application and/or the size of the intake funnel 1101.

In some configurations, as shown in FIG. 12, a longitudinal extent 1154 of each of the sections 1140 can be oriented along a central axis 1153. The sections 1140 can then be connected to one another using the interlocking seam 1142 along the longitudinal extent 1154. The sections 1140 can then create a cylindrical shell with a continuous inner wall to direct the primary flow. The sections 1140 can then expand and/or contract together to change the shape and/or size of the shape shifting portion 1109. The interlocking seam 1142 can be made by connecting the sections 1140 using welding techniques and/or interlocking fasteners along the longitudinal extents 1154.

FIG. 13 illustrates a configuration of the intake funnel 1101 in which the longitudinal extent 1154 of each of the strips 1140 can be curved to form a curved strip 1140 which is then oriented perpendicular to a central axis 1153. One or more curved strips 1140 can be combined from end to end to form a section of a cylindrical shell with the central axis 1153 located at the center. The sections of the cylindrical shell can then be connected to one another using the interlocking seam 1142 to form the body 1104. As mentioned above, the interlocking seam 1142 can be made using welding techniques and/or interlocking fasteners.

In some configurations, the body 1104 of FIGS. 12 and 13 can then include an elastic polymer 1152 (e.g., polymer and/or rubber sheeting with high elasticity) encasing the shape changing portion 1109 that can also expand and/or contract with the shape changing material 1113. The elastic polymer 1152 can direct the fluid entering the intake funnel 1101 at the inlet 1102 to the outlet 1103.

The body 1104 made up of the continuously connected strips 1140 can then be connected to the Venturi device 1110 such as by welding the body 1104 to the Venturi device 1110. An expandable ring 1143 or a fixed ring 1155 can be positioned between the outlet 1103 of the intake funnel and the inlet of the Venturi device 1110 to provide supports and/or a connection point. The elastic polymer 1152 can then extend over the body 1104, the rings 1143, 1155, and/or the inlet of the Venturi device 1110 to maintain the primary flow within the system 1100, in particular for configurations where the strips 1140 are separated to form a skeleton, frame, framework 1151 as discussed herein and do not form a continuous wall structure. The intake funnel 1101 and Venturi device 1110 can thus create a continuous path for the incoming fluid to flow through.

As mentioned above, in some configurations, the strips 1140 illustrated in FIGS. 12 and 13 can be replaced by a unitary and/or a monolithic structure made of materials 1113, 1127. The unitary structure can surround the shape changing portion 1109 such that there are no gaps and there is one continuous inner surface.

In some configuration, as shown in FIG. 14, the sections 1140 of the body 1104 can be spaced apart from one another with gaps or openings in between to form a skeleton or frame 1151. The skeleton 1151 can provide more flexibility for smaller applications (e.g., electric motorbike) of the intake funnel 1101 as the skeleton 1151 does not use interlocking seams to create the body 1104. The longitudinal extent 1154 of each of the sections 1140 can be oriented along a central axis 1153. The body 1104 can then include an elastic polymer 1152 (e.g., polymer and/or rubber sheeting with high elasticity) encasing the shape changing portion 1109 that can also expand and/or contract with the shape changing material 1113. The elastic polymer 1152 can contain the ambient air flow within the body 1104 of the intake funnel 1101. An adhesive (e.g., quick drying cement) can be used to attach the elastic polymer 1152 to the strips 1140. The skeleton 1151 with elastic polymer 1152 can then be clamped to the Venturi device 1110 or to a conduit leading to the Venturi device 1110 to allow for interchangeability of the body 1104 having the skeleton 1151 and elastic polymer 1152.

As shown in FIG. 16, the expandable rings 1143 can be of various sizes to correspond to the inlet of the Venturi device 1110. The rings 1143 can be positioned and connected to either the first end 1104a and/or the second end 1104b of the intake funnel 1101 to maintain and/or change the shape and size of the inlet 1102 and/or outlet 1103 of the ends 1104a, 1104b. The rings 1143 can also be connected along to the shape changing portion 1109 to assist in changing the cross-sectional flow area that corresponds to the expansion and/or contraction of the shape changing portion 1109. In some configurations, one of or both of the sections 1140 or rings 1143 can contract and expand to change the shape and size of the intake funnel 1101.

The rings 1143 can be a solid piece having a thick portion 1144 with a first end 1145 separated from a second end 1146 by a gap. The ring 1143 can then include a thin portion 1147 extending from the first end 1145 that also includes a first end 1148 and a second end 1149. An opening 1150 can be positioned and recessed at the second end 1146 and extend into the thick portion 1144. The second end 1149 can then be positioned within the opening 1150 such that the second end 1149 can slide in and out relative to the opening 1150 as the rings 1143 expands or contracts.

In some configurations, the outlet 1103 can include a fixed ring 1155 to maintain a cross-sectional flow area corresponding to a cross-sectional flow area of the inlet 1102 of the Venturi device 1110. The fixed ring 1155 can be of similar size and/or shape of the expandable rings 1143. In some configurations, the fixed rings 1155 can also be of a different size and/or shape than the expandable rings 1143.

Referencing back to FIG. 11, the system 1100 can also include a first controller 1156. The first controller 1156 can cause and/or control an electrical current to be applied to the shape changing portion 1109 based on a sensed pressure, temperature, and/or rate of flow of the ambient airflow through the body 1104 of the intake funnel 1101. Additionally or alternative, the first controller 1156 can cause heat to be applied to the shape changing portion 1109 based on at least one of pressure, temperature, or rate of flow of the ambient airflow through the body 1104. The first controller 1156 can be positioned near the system 1100 or inside of the passenger cabin 1107. The first controller can be powered by the motor 1120 of the vehicle 1130 and/or a battery 1126.

The system 1100 can also include a second controller 1157 which can direct electrical energy to be generated by the generator 1124 to the battery 1126 of the vehicle 1130 to flow to the battery 1126 based on a charge state of the battery 1126. The second controller 1157 can monitor the percentage level of the battery 1126 and communicate to the generator 1124 to create electricity. Additionally or alternatively, the second controller 1157 can direct the motor 1120 to transfer power over to the battery 1126. The second controller 1157 can determine a percentage of range extension accumulated during generation of electrical energy by the generator 1124. The second controller 1157 can be positioned near the system 1100 or inside of the passenger cabin 1107. The second controller 1157 be powered by the motor 1120 of the vehicle 1130 and/or a battery 1126.

In some configurations, the system 1100 can also include a third controller 1158 that can cause the valve 1108 to open and/or close. The third controller 1158 can direct the valve 1108 to alter a flow volume of the primary flow through the bypass duct 1116 based on a desired volume of the secondary flow to the bypass conduit 1115. The third controller 1158 can change a volume of the primary flow through the bypass duct 1116 based on mitigating backpressure on the turbine outlet 1123. The third controller 1158 can also mitigate backpressure on the turbine 1121 during startup of the turbine 1121 by detecting a pressure level at the turbine outlet 1123. The third controller 1158 can be positioned near the system 1100 or inside of the passenger cabin 1107. The third controller 1158 be powered by the motor 1120 of the vehicle 1130 and/or a battery 1126.

In some configurations, they system 1100 can further include a fourth controller 1159 that can cause the second valve 1111 to open and/or close. The fourth controller 1159 can direct the second valve 1111 to change a volume of the primary flow through the passenger cabin duct 1105 based on a volume flow setting to the passenger cabin 1107 of the vehicle 1130. The fourth controller 1159 can monitor the flow rate and/or pressure of the primary flow through the passenger cabin duct 1105. The fourth controller 1159 can be positioned near the system 1100 or inside of the passenger cabin 1107. The fourth controller 1159 be powered by the motor 1120 of the vehicle 1130 and/or a battery 1126.

Any one of the controllers 1156, 1157, 1158, 1159 can be separate from one another and/or function separately from one another. Each of the controllers 1156, 1157, 1158, 1159 can have an independent input that is different from any of the other controllers.

Additionally or alternatively, any one of the controllers 1156, 1157, 1158, 1159 can be the same controller 1161 such that one or more controllers can have one and/or several functions. The controllers 1156, 1157, 1158, 1159 can be one controller 1161 that performs all the functions of each individual controller.

Sensors 1160 can be positioned along the intake funnel 1101, particularly the inlet 1102 and outlet 1103, to provide data for at least one of pressure, temperature, and/or rate of flow to any of the controllers 1156, 1157, 1158, 1159. Additionally or alternative, sensors 1160 can be provide a charge state of the battery 1126 to the second controller 1157 to indicate when electrical energy generated by the generator 1124 should flow to the battery 1126.

Motor Cooling System

Figure 18:
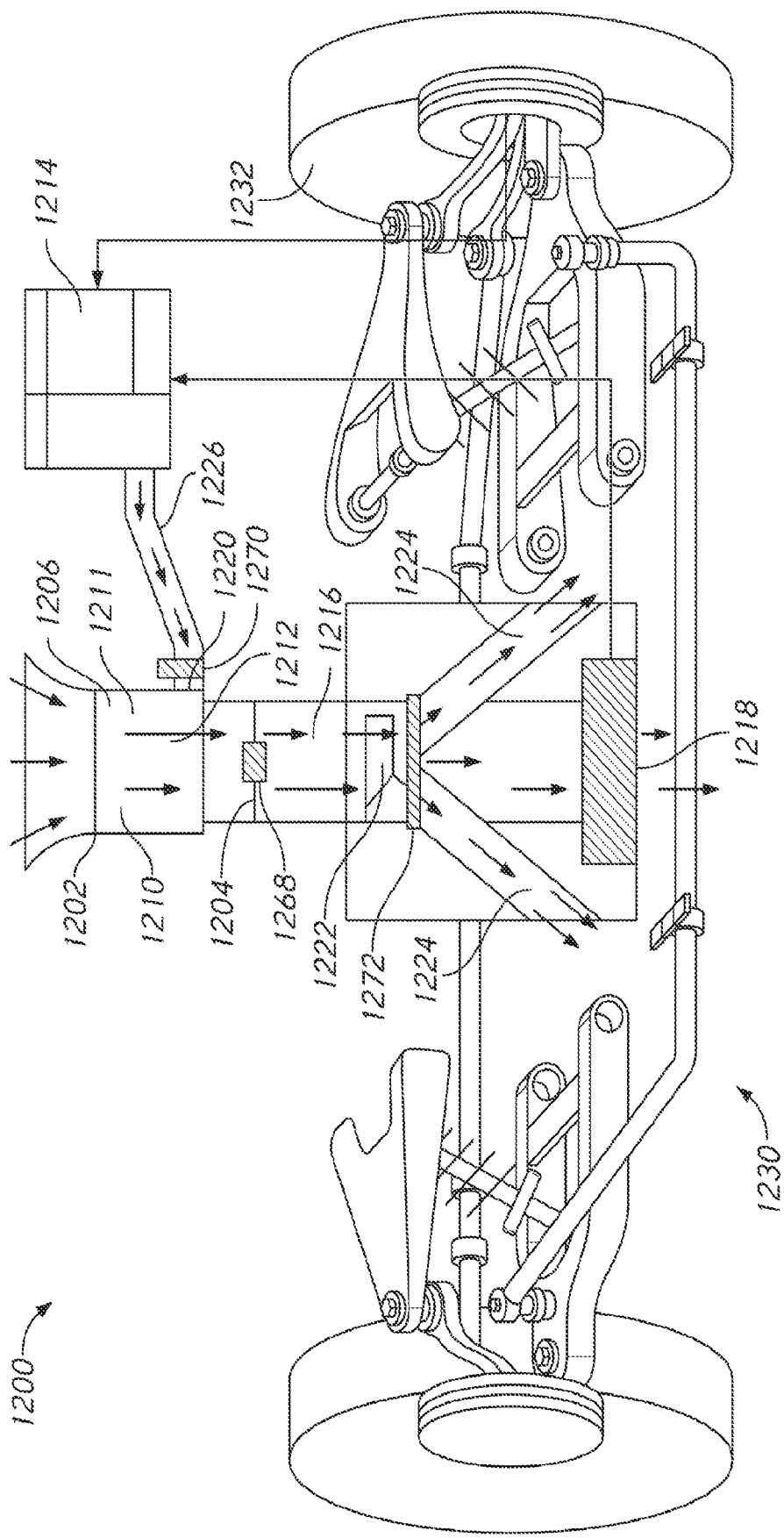
FIG. 18 illustrates a cooling system for cooling a motor of a vehicle with ambient airflow.

FIG. 18 illustrates a cooling system 1200 for cooling a motor of a vehicle with ambient airflow. The cooling system 1200 can also include one or more Venturi devices 1210, which can be similar or identical to Venturi device 100 shown in FIGS. 1A-1C and/or Venturi device 400 shown in FIGS. 4A-4D. As described herein, the Venturi device 1210 can have an inlet 1202, similar to the inlet 402 of Venturi device 400, open to ambient air. The inlet 1202 can receive a primary flow of fluid made up of ambient air passed into the inlet 1202 as a vehicle 1230 is moving in a forward direction. The Venturi device can also include an outlet 1204 which can be similar to the outlet 404 of Venturi device 400 and that ejects the primary flow. The Venturi device 1210 can further include a body 1211 similar to the body 411 of the Venturi device 400, a converging portion 1206 and a diverging portion 1212 similar to the converging portion 406 and the diverging portion 410 of Venturi device 400 such that the movement of the primary flow through the converging portion 1206 and the diverging portion 1212 produces a Venturi effect, pulling the primary flow in through the inlet 1202 of the Venturi device 1210. Lastly, the Venturi device 1210 can include a secondary input 1220 similar or identical to the secondary input 420 of the Venturi device 400 which can be positioned between the converging portion 1206 and the outlet 1204 to direct a secondary flow of fluid into the primary flow to create a vortex for producing a suction at the inlet 1202 of the Venturi device 1210 to pull the primary flow through the inlet 1202 and into the body 1211 of the Venturi device 1210 to increase the primary flow through the outlet 1204 of the Venturi device 1210.

The cooling system 1200 can further include an air compressor 1214 that can compress ambient air and direct the compressed air into the secondary input 1220 of the Venturi device 1210 to provide the secondary flow. A cooling duct 1216 can be connected to the outlet 1204 receive the primary flow ejected from the outlet 1204. In some configurations, the cooling duct 1216 can direct the primary flow to a motor 1218 of a vehicle 1230 to cool the motor 1218. The cooling duct 1216 can include fins, vanes 1222 to direct the primary flow to one or more predetermined portions of the motor 1218 which are the hottest part of the motor 1218 and/or a source of heat. In some configuration, the cooling duct 1216 further includes conduits 1224 to move the primary flow from the outlet 1204 of the Venturi device 1210 toward the one or more predetermined portions of the motor 1218. The conduits 1224 can also split the primary flow into two or more fluid flows.

The cooling system 1200 can also include a secondary flow duct 1226 connecting the air compressor 1214 and the secondary input 1220 of the Venturi device 1210. The air compressor 1214 can provide compressed air to the Venturi device 1210 to generate the secondary flow. The secondary flow duct 1226 can be connected to a secondary input 1117 to direct the secondary flow to the Venturi device 1110. The secondary input 1220 can be adjustable to regulate an input of the secondary flow into the primary flow to control a volume of flow of the secondary flow into the secondary input 1220.

In some configurations, the air compressor 1214 can be connected to a wheel 1232 of the vehicle such that the air compressor 1214 is driven by the rotation of the wheel 1232.

Figure 19:
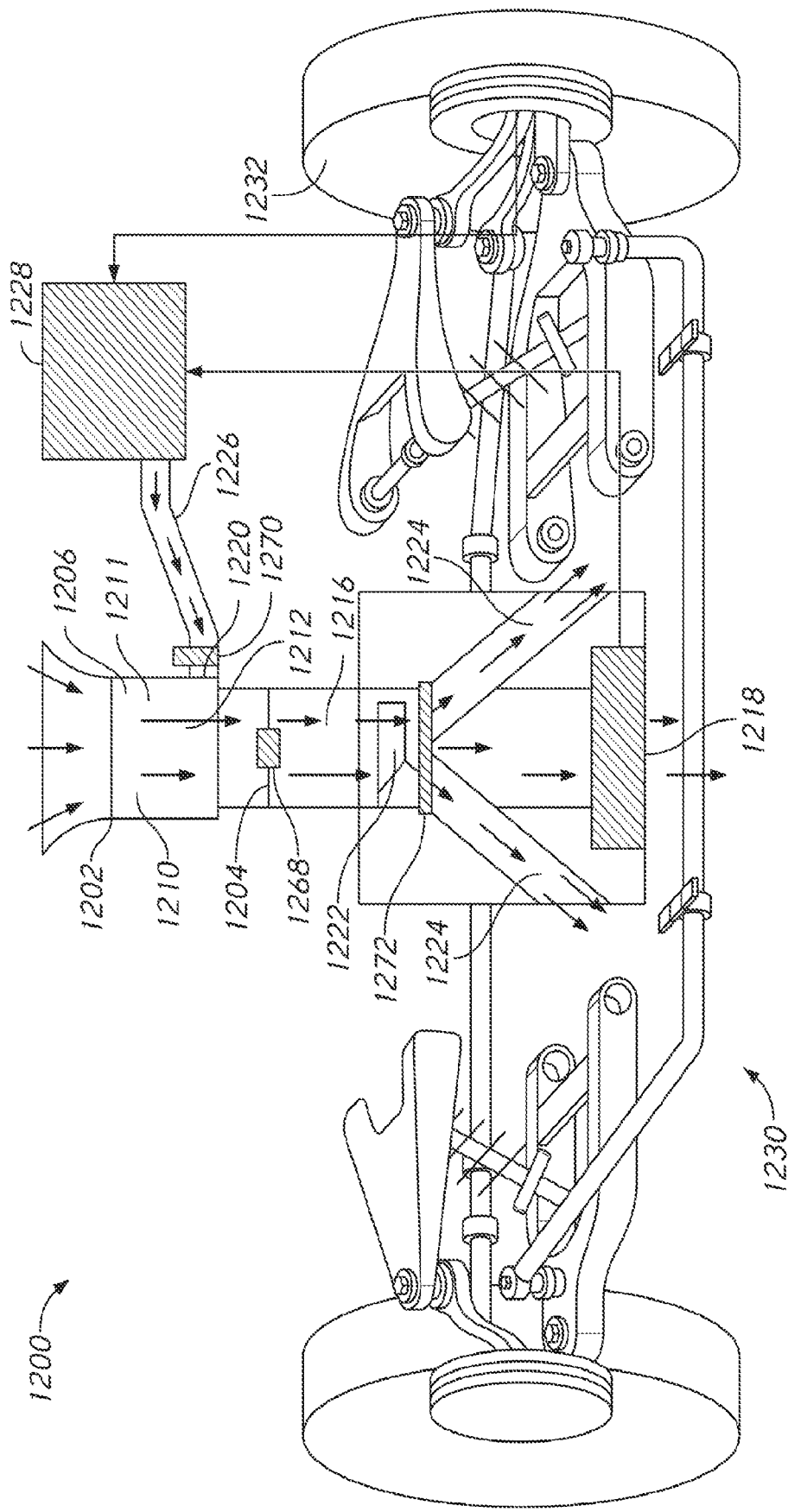
FIG. 19 illustrates a configuration of a cooling system for cooling a motor of a vehicle with ambient airflow.

In some configurations, the air compressor 1214 can be connected to the motor 1218 of the vehicle. In this configuration, the air compressor 1214 can be driven by operation of the motor 1218. A drive shaft could be connected between the motor 1218 and the air compressor 1214 which propels the air compressor 1214. The secondary flow coming from the air compressor 1214 can then be adjusted to provide a sufficient secondary flow into the secondary input In some configurations, as illustrated in FIG. 19, a fan 1228 can replace the air compressor 1214 and provide a secondary flow to the Venturi device 1210. The fan 1228 can direct a flow into the inlet 1202 to provide the primary flow. The inlet 1202 can be positioned in other orientations other than facing in a forward-facing manner. In utilizing the fan 1228, the inlet 1202 can face in any direction such that the inlet 1202 is not constrained in a forward-facing direction. Thus, the fan 1228 allows the inlet 1202 to be placed in any suitable direction.

In some configurations, the fan 1228 can be connected to the wheel 1232 of the vehicle 1230 such that the fan 1228 is driven by the rotation of the wheel 1232. As the wheel 1232 revolves, the fan 1228 can be turned to generate a primary flow that is directed towards inlet 1202.

In some configurations, the fan 1228 can also be connected to a motor 1218 of the vehicle 1130 such that the motor 1218 can provide electricity to power the fan 1228. A drive shaft (e.g., reduction drive) can be connected between the motor 1218 and the fan 1228.

Figure 20:
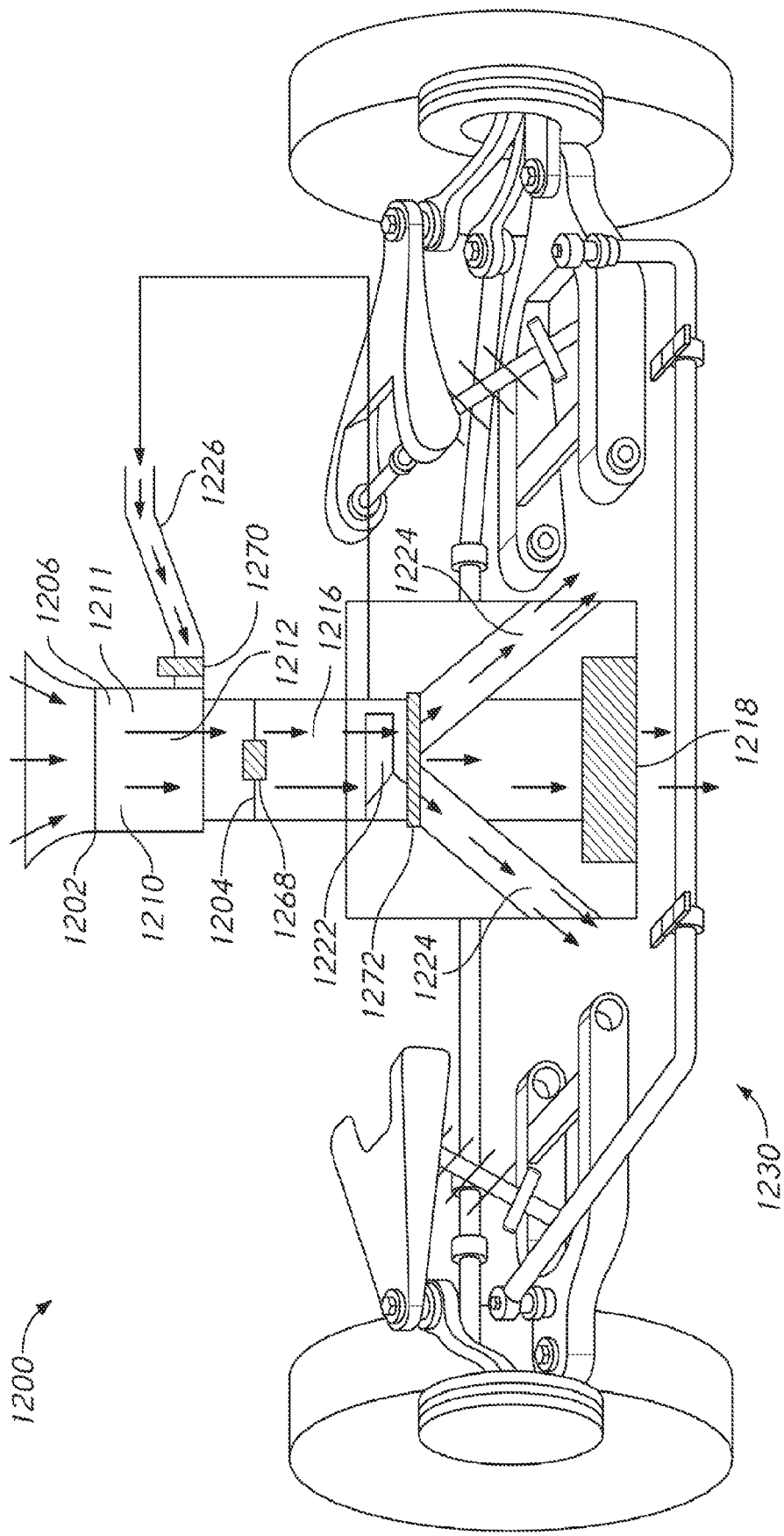
FIG. 20 illustrates a configuration of a cooling system for cooling a motor of a vehicle with ambient airflow.
Figure 21:
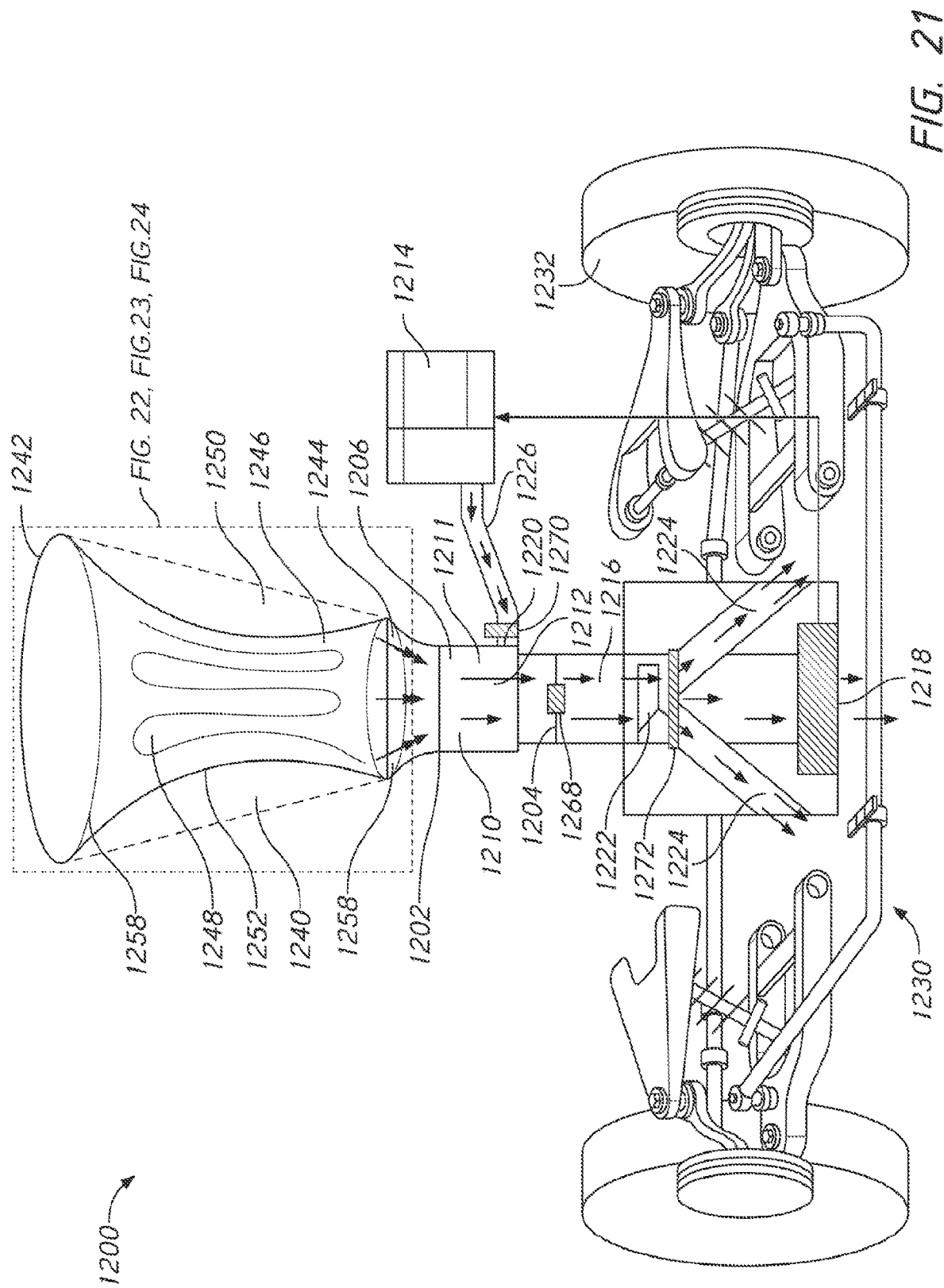
FIG. 21 illustrates a configuration of a cooling system for cooling a motor of a vehicle with ambient airflow.

As illustrated in FIG. 20, the Venturi device 1210 and cooling duct 1216 can be fitted with the secondary flow duct 1226 to recirculate the secondary flow from the primary flow passing through the cooling duct 1216. The secondary flow duct 1226 can be connected to a secondary input 1220 to direct the secondary flow to the Venturi device 1210. The secondary input 1220 can be adjustable to regulate an input of the secondary flow into the primary flow to control a volume of flow of the secondary flow into the secondary input.

The system 1200 can also include a first valve 1268, a second valve 1270, and/or a third valve 1272 to control the path of the primary flow through the system. The valves

1268, 1270, 1272 can be of any type of valve such as a butterfly valve and/or stopcock valve to manage the flow rate of the primary and secondary flows. In some configuration, valves 1268, 1270, 1272 can be actuator driven to open and/or close. In some configuration, the valves 1268, 1270, 1272 can be actuated by a bimetallic spring that causes said valves 1268, 1270, 1272 to open and/or close.

In some configurations, valves 1268, 1270, 1272 can be the same valve which operates and be positioned to perform all the functions of valves 1268, 1270, 1272. A common conduit from the Venturi device 1210 can be directed toward a single valve operating as valves 1268, 1270, 1272, which then adjusts the primary flow into multiple conduits corresponding to the conduits connected to valves 1268, 1270, 1272. The primary flow can then be distributed evenly into the multiple conduits and/or controlled by the openness and/or closeness of the single valve. The single valve can be the same type or a different type than valves 1268, 1270, 1272.

In some configuration, the first valve 1268 can be positioned at the Venturi device outlet 1204 and be connected to the cooling duct 1216 to control how much of the primary flow is passed through the cooling duct 1216 and onto the motor 1218. The valve 1268 can close completely when a response is detected that no flow is needed to cool the motor 1218. passenger cabin duct 1105 can also be split into two or more conduits that feed into the passenger cabin 1107 in which the valve 1268 or more than one valve 1268 can further balance the flow into either one or more conduits.

In some configuration, the second valve 1270 can be positioned in between the secondary input 1220 and the secondary flow duct 1226 to control how much of the secondary flow is flowed into the Venturi device 1110 as the secondary flow. The secondary valve 1270 can regulate the volume flow into the secondary input 1220.

Additionally or alternative, valve 1272 can be positioned at the split between conduits 1224 to move the primary flow from the outlet 1204 of the Venturi device 1210 toward the one or more predetermined portions of the motor 1218.

Valves 1268, 1270, 1272 can be controlled simultaneously or independently to ensure that there is a minimal backpressure on the turbine 1121. Additionally or alternative, the valves 1268, 1270, 1272 can be controlled simultaneously or independently to supply an input inlet pressure to the Venturi device 1110 to overcome stalling of the turbine 1121 under heavy load situations, and thus recycling as much dynamic energy as possible back into the system 1100.

FIGS. 21-24 illustrates a configuration of the cooling system 1200 which can further include an expandable and/or shapeshifting intake funnel, channel, siphon, cowl 1240 that can be similar and/or identical to the intake funnel of FIGS. 11-14. The intake funnel 1240 can have an inlet, entrance, entry 1242, an outlet 1244, a body 1246 between the inlet 1242 and outlet 1244, a heating element 1248, shape changing portion 1250, shape memory materials 1252, sections 1254, interlocking seam 1256, expandable rings 1258, skeleton, frame, framework 1260, elastic polymer 1262, central axis 1264, and/or longitudinal extent 1266 which can be similar and/or identical to the intake funnel 110, inlet 1102, an outlet 1103, a body 1104, heating element 1114, shape changing portion 1109, shape memory materials 1113, sections 1140, interlocking seam 1142, expandable rings 1143, skeleton 1151, elastic polymer 1152, central axis 1153, and/or longitudinal extent 1154 in FIGS. 11-14. The intake funnel 1240 can increase the flow volume that can pass into the system 1200. Additionally or alternatively, the intake funnel 1240 can expand and/or contrast based on similar stimulants at intake funnel 1101 such as temperature, pressure, electrical charge, and the like.

Figure 22:
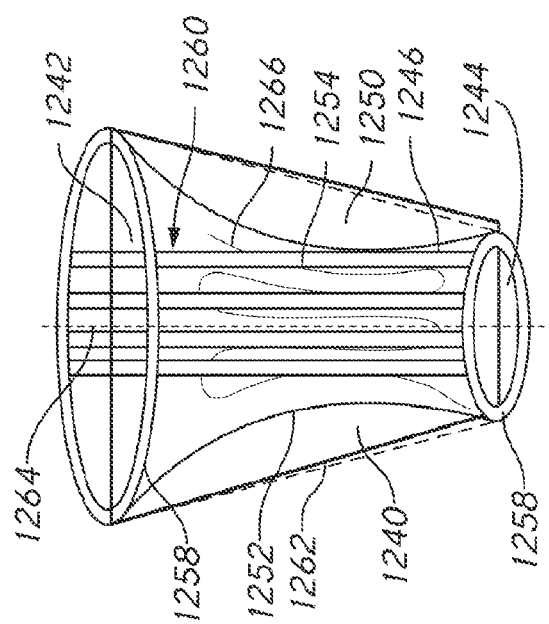
FIGS. 22-24 illustrate different configurations of an intake funnel of the cooling system for cooling a motor of a vehicle with ambient airflow of FIG. 21.
Figure 23:
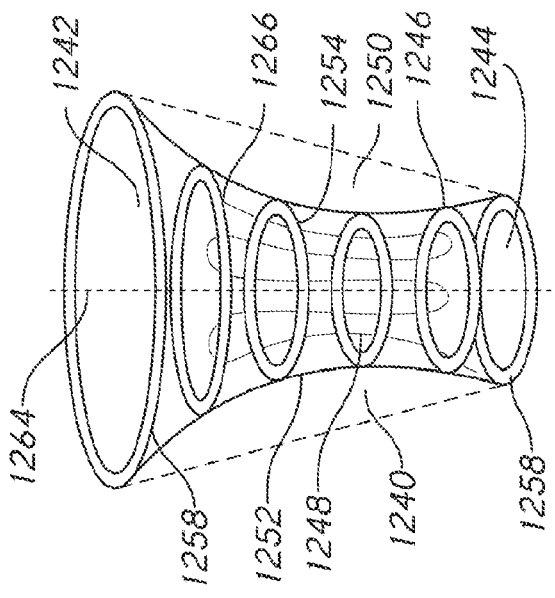
Figure 24:
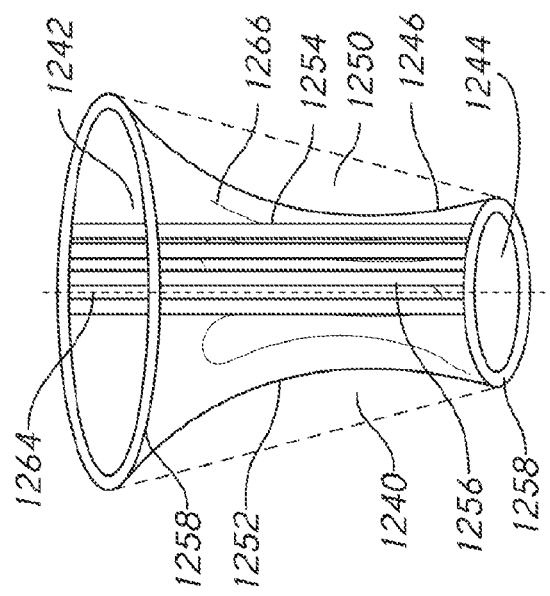

FIGS. 22-24 illustrate different configurations of the longitudinal extent, length, span 1266 of each of the sections 1254 oriented along a central axis 1264. Each of the different configurations can depend on the type of application and/or the size of the intake funnel 1240.

In some configurations, as shown in FIG. 22, a longitudinal extent 1266 of each of the sections 1254 can be oriented along a central axis 1264. The sections 1254 can then be connected to one another using the interlocking seam 1256 along the longitudinal extent 1266. The sections 1254 can then create a cylindrical shell with a continuous inner wall to direct the primary flow. The sections 1254 can then expand and/or contract together to change the shape and/or size of the shape shifting portion 1250. The interlocking seam 1256 can be made by connecting the sections 1254 using welding techniques and/or interlocking fasteners along the longitudinal extents 1266.

FIG. 23 illustrates a configuration of the intake funnel 1240 in which the longitudinal extent 1266 of each of the strips 1254 can be curved to form a curved strip 1254 which is then oriented perpendicular to a central axis 1264. One or more curved strips 1254 can be combined from end to end to form a section of a cylindrical shell with the central axis 1264 located at the center. The sections of the cylindrical shell can then be connected to one another using the interlocking seam 1256 to form the body 1246. As mentioned above, the interlocking seam 1142 can be made using welding techniques and/or interlocking fasteners.

In some configurations, the body 1246 of FIGS. 22 and 23 can then include an elastic polymer 1262 (e.g., polymer and/or rubber sheeting with high elasticity) encasing the shape changing portion 1250 that can also expand and/or contract. The elastic polymer 1262 can direct the fluid entering the intake funnel 1240 at the inlet 1242 to the outlet 1244.

In some configuration, as shown in FIG. 24, the sections 1254 of the body 1246 can be spaced apart from one another with gaps in between to form a skeleton 1260. The skeleton 1260 can provide more flexibility for smaller applications (e.g., electric motorbike) of the intake funnel 1240 as the skeleton 1260 does not use interlocking seams to create the body 1246. The longitudinal extent 1266 of each of the sections 1254 can be oriented along a central axis 1264. The body 1246 can then include an elastic polymer 1262 (e.g., polymer and/or rubber sheeting with high elasticity) encasing the shape changing portion 1250 that can also expand and/or contract. The elastic polymer 1262 can contain the ambient air flow within the body 1246 of the intake funnel 1240. An adhesive (e.g., quick drying cement) can be used to attach the elastic polymer 1262 to the strips 1254. The skeleton 1260 with elastic polymer 1262 can then be clamped to the Venturi device 1210 or to a conduit leading to the Venturi device 1210 to allow for interchangeability of the body 1246 having the skeleton 1260 and elastic polymer 1262.

In some configurations, the ambient air drawn through the Venturi device 1210 can be used to warm up and start the motor 1218. As the ambient air passes through the Venturi device 1210, the temperature can be increased from 1° C. to 10° C., from 2° C. to 8° C., from 3° C. to 7° C., or from 4° C. to 6° C. before being passed onto the motor 1218. Once the motor is on, the ambient air flowing through the system 1200 can be used to cool down the motor 1218 to prevent any overheating.

LIST OF EXAMPLE OF NUMBERED EMBODIMENTS

The following is a list of example numbered embodiments. The features recited in the below list of example embodiments can be combined with additional features disclosed herein. Furthermore, additional inventive combinations of features are disclosed herein, which are not specifically recited in the below list of example embodiments and which do not include the same features as the embodiments listed below. For the sake of brevity, the below list of example embodiments does not identify every inventive aspect of this disclosure. The below list of example embodiments is not intended to identify key features or essential features of any subject matter described herein.

1. A hydropower system for converting potential energy of a fluid into electrical energy, the hydropower system comprising:
   an upper reservoir containing a fluid;
   a lower reservoir containing the fluid, the lower reservoir positioned at a lower elevation relative to the upper reservoir such that the fluid flows from the upper reservoir to the lower reservoir via gravity;
   a fluid loop configured to circulate a primary flow of the fluid between the upper reservoir and the lower reservoir;
   a turbine disposed on the fluid loop, the turbine configured to be driven by the primary flow from the upper reservoir to the lower reservoir;
   a generator configured to be driven by the turbine to generate electrical energy; a pump disposed on the fluid loop, the pump configured to drive the primary flow from the lower reservoir to the upper reservoir;
   a first Venturi device disposed on the fluid loop, the first Venturi device downstream of the upper reservoir and upstream of the turbine, between the upper reservoir and the turbine on the fluid loop; and
   a second Venturi device disposed on the fluid loop, the second Venturi device downstream of the lower reservoir and upstream of the pump, between the lower reservoir and the pump on the fluid loop,
   wherein each of the first and the second Venturi devices comprises:
      an inlet configured to receive the primary flow;
      an outlet configured to eject the primary flow; and
      a body disposed between the inlet and the outlet, the body comprising:
         a converging portion and a diverging portion, wherein a movement of the primary flow through the converging portion and the diverging portion produces a Venturi effect; and
         a secondary input disposed between the converging portion and the outlet, the secondary input configured to direct a secondary flow of the fluid into the primary flow at an angle relative to a direction of flow of the primary flow to create a vortex for producing a suction at the inlet to pull the primary flow through the inlet and into the body causing the pressure of the primary flow to increase through the diverging portion before ejection through the outlet.

2. The hydropower system of example 1, wherein the secondary flow of the first Venturi flows from the turbine to the secondary input of the first Venturi device.

3. The hydropower system of example 2, further comprising a first conduit fluidically connected to the turbine and the secondary input of the first Venturi device, the first conduit configured to direct the secondary flow from the primary flow to the secondary input of the first Venturi device.

4. The hydropower system of any of the preceding examples, wherein the secondary flow of the second Venturi flows from the pump to the secondary input of the second Venturi device.

5. The hydropower system of example 4, further comprising a second conduit fluidically connected to the pump and the secondary input of the second Venturi device, the second conduit configured to direct the secondary flow from the primary flow to the secondary input of the second Venturi device.

6. The hydropower system of any of the preceding examples, further comprising a third conduit fluidically connected to the fluid loop between the upper reservoir and the turbine, the third conduit configured to direct the secondary flow of the second Venturi device from the primary flow to the secondary input of the second Venturi device.

7. The hydropower system of any of the preceding examples, further comprising an other pump disposed on the fluid loop, the other pump configured to drive the primary flow from the lower reservoir to the upper reservoir.

8. The hydropower system of example 7, further comprising a third Venturi device disposed on the fluid loop, the third Venturi device downstream of the lower reservoir and upstream of the other pump, between the lower reservoir and the other pump on the fluid loop.

9. The hydropower system of example 8, wherein a secondary flow of the third Venturi device flows from the other pump to a secondary input of the third Venturi device.

10. The hydropower system of example 9, further comprising a fourth conduit fluidically connected to the other pump and the secondary input of the third Venturi device, the fourth conduit configured to direct the secondary flow from the primary flow to the secondary input of the third Venturi device.

11. The hydropower system of example 9 or 10, further comprising a fifth conduit fluidically connected to the fluid loop between the upper reservoir and the turbine, the fifth conduit configured to direct the secondary flow of the third Venturi device from the primary flow to the secondary input of the third Venturi device.

12. The hydropower system any of the preceding examples, wherein the pump comprises a motor that is configured to be powered by at least one of the generator or an external power supply.

13. The hydropower system of any of the preceding examples, wherein the fluid loop comprises at least one of tubing or piping.

14. The hydropower system of any of the preceding examples, wherein the secondary input is adjustable to regulate an input of the secondary flow into the primary flow.

15. The hydropower system of any of the preceding examples, wherein the secondary input is an annular gap.

16. The hydropower system of any of the preceding examples, wherein the secondary input is a ring gap.

17. The hydropower system of any of the preceding examples, wherein the secondary input is configured to distribute the secondary flow throughout the secondary input.

18. The hydropower system of any of the preceding examples, wherein the secondary input comprises a Coanda surface configured to distribute incoming secondary flow throughout the secondary input.

19. The hydropower system of any of the preceding examples, wherein the secondary input comprises a Coanda surface.

20. The hydropower system of any of the preceding examples, wherein the secondary input is configured to encircle the primary flow.

21. The hydropower system of any of the preceding examples, wherein the secondary input is disposed downstream of the diverging portion.

22. The hydropower system of any of the preceding examples, wherein the secondary input is disposed between the diverging portion and the outlet.

23. The hydropower system of any of the preceding examples, wherein the secondary input comprises one or more apertures.

24. The hydropower system of any of the preceding examples, wherein the secondary input comprises a plurality of apertures.

25. The hydropower system of any of the preceding examples, wherein the secondary input comprises one or more openings circumferentially distributed about a flow path of the primary flow, the secondary input configured to direct the secondary flow radially inward toward the primary flow.

26. The hydropower system of any of the preceding examples, further comprising a throat disposed between the converging portion and the diverging portion, the throat comprising a diameter that is smaller than a diameter of the converging portion and a diameter of the diverging portion.

27. The hydropower system of any of the preceding examples, wherein the secondary input comprises an annular chamber configured to receive and direct the secondary flow.

28. The hydropower system of example 27, wherein the annular chamber is configured to encircle the primary flow through the body.

29. The hydropower system of any of the preceding examples, wherein the pump drives the primary flow from the from the lower reservoir to the upper reservoir while turbine is driven by the primary flow from the upper reservoir to the lower reservoir to recirculate the fluid from the lower reservoir to the upper reservoir.

30. The hydropower system of any of examples 1 to 28, wherein the pump drives the primary flow from the from the lower reservoir to the upper reservoir while flow of the fluid is stopped through the turbine.

31. A hydropower system for converting potential energy of a fluid into electrical energy, the hydropower system comprising:
an upper reservoir containing a fluid;
a lower reservoir containing the fluid, the lower reservoir positioned at a lower elevation relative to the upper reservoir such that the fluid flows from the upper reservoir to the lower reservoir via gravity;
a fluid loop configured to circulate a primary flow of the fluid between the upper reservoir and the lower reservoir;
a turbine disposed on the fluid loop, the turbine configured to be driven by the primary flow from the upper reservoir to the lower reservoir;
a generator configured to be driven by the turbine to generate electrical energy;
a pump disposed on the fluid loop, the pump configured to drive the primary flow from the lower reservoir to the upper reservoir; and
a first Venturi device disposed on the fluid loop, the first Venturi device downstream of the upper reservoir and upstream of the turbine, between the upper reservoir and the turbine on the fluid loop,
wherein the first Venturi device comprises:
an inlet configured to receive the primary flow;
an outlet configured to eject the primary flow; and
a body disposed between the inlet and the outlet, the body comprising:
a converging portion and a diverging portion, wherein a movement of the primary flow through the converging portion and the diverging portion produces a Venturi effect; and
a secondary input disposed between the converging portion and the outlet, the secondary input configured to direct a secondary flow of the fluid into the primary flow at an angle relative to a direction of flow of the primary flow to create a vortex for producing a suction at the inlet to pull the primary flow through the inlet and into the body causing the pressure of the primary flow to increase before ejection through the outlet.

32. The hydropower system of example 31, further comprising a second Venturi device disposed on the fluid loop, the second Venturi device downstream of the lower reservoir and upstream of the pump, between the lower reservoir and the pump on the fluid loop.

33. The hydropower system of example 31 or 32, further comprising any of the features of examples 1-30.

34. A hydropower system for converting potential energy of a fluid into electrical energy, the hydropower system comprising:
an upper reservoir containing a fluid;
a lower reservoir containing the fluid, the lower reservoir positioned at a lower elevation relative to the upper reservoir such that the fluid flows from the upper reservoir to the lower reservoir via gravity;
a fluid loop configured to circulate a primary flow of the fluid between the upper reservoir and the lower reservoir;
a turbine disposed on the fluid loop, the turbine configured to be driven by the primary flow from the upper reservoir to the lower reservoir;
a generator configured to be driven by the turbine to generate electrical energy;
a pump disposed on the fluid loop, the pump configured to drive the primary flow from the lower reservoir to the upper reservoir; and
a first Venturi device disposed on the fluid loop, the first Venturi device downstream of the lower reservoir and upstream of the pump, between the lower reservoir and the pump on the fluid loop,
wherein the first Venturi device comprises:
an inlet configured to receive the primary flow;
an outlet configured to eject the primary flow; and
a body disposed between the inlet and the outlet, the body comprising:
a converging portion and a diverging portion, wherein a movement of the primary flow through the converging portion and the diverging portion produces a Venturi effect; and
a secondary input disposed between the converging portion and the outlet, the secondary input configured to direct a secondary flow of the fluid into the primary flow at an angle relative to a direction of flow of the primary flow to create a vortex for producing a suction at the inlet to pull the primary flow through the inlet and into the body causing the pressure of the primary flow to increase before ejection through the outlet.

35. The hydropower system of example 34, further comprising a second Venturi device disposed on the fluid loop, the second Venturi device downstream of the upper reservoir and upstream of the turbine, between the upper reservoir and the turbine on the fluid loop.

36. The hydropower system of example 34 or 35, further comprising any of the features of examples 1-30.

37. A hydropower system for converting potential energy of a fluid into electrical energy, the hydropower system comprising:
an upper reservoir containing a fluid;
a lower reservoir containing the fluid, the lower reservoir positioned at a lower elevation relative to the upper reservoir such that the fluid flows from the upper reservoir to the lower reservoir via gravity;
a fluid conduit configured to direct a primary flow of the fluid between the upper reservoir and the lower reservoir;
a turbine and pump assembly disposed on the fluid conduit, the turbine and pump assembly configured to be driven by the primary flow from the upper reservoir to the lower reservoir and configured to drive the primary flow from the lower reservoir to the upper reservoir;
a generator configured to be driven by the turbine and pump assembly to generate electrical energy;
a first Venturi device disposed on the fluid conduit, the first Venturi device between the upper reservoir and the turbine and pump assembly on the fluid conduit;
a second Venturi device disposed on the fluid conduit, the second Venturi device between the lower reservoir and the turbine and pump assembly on the fluid conduit,
wherein each of the first and the second Venturi devices comprises:
an inlet configured to receive the primary flow;
an outlet configured to eject the primary flow; and
a body disposed between the inlet and the outlet, the body comprising:
a converging portion and a diverging portion, wherein a movement of the primary flow through the converging portion and the diverging portion produces a Venturi effect; and
a secondary input disposed between the converging portion and the outlet, the secondary input configured to direct a secondary flow of the fluid into the primary flow at an angle relative to a direction of flow of the primary flow to create a vortex for producing a suction at the inlet to pull the primary flow through the inlet and into the body causing the pressure of the primary flow to increase before ejection through the outlet;
a first bypass conduit connected to the fluid conduit upstream and downstream of the first Venturi device, the first bypass conduit configured to direct the primary flow around first Venturi device such that the primary flow does not pass through the first Venturi device with the primary flow flowing from the lower reservoir to the upper reservoir via the fluid conduit; and
a second bypass conduit connected to the fluid conduit upstream and downstream of the second Venturi device, the second bypass conduit configured to direct the primary flow around second Venturi device such that the primary flow does not pass through the second Venturi device with the primary flow flowing from the upper reservoir to the lower reservoir via the fluid conduit.

38. The hydropower system of example 37, wherein the secondary flow of the first Venturi device flows from the turbine and pump assembly to the secondary input of the first Venturi device.

39. The hydropower system of example 38, further comprising a first conduit fluidically connected to the turbine and pump assembly and the secondary input of the first Venturi device, the first conduit configured to direct the secondary flow from the primary flow to the secondary input of the first Venturi device.

40. The hydropower system of any of example 37 to 39, wherein the secondary flow of the second Venturi device flows from the turbine and pump assembly to the secondary input of the second Venturi device.

41. The hydropower system of example 40, further comprising a second conduit fluidically connected to the pump and the secondary input of the second Venturi device, the second conduit configured to direct the secondary flow from the primary flow to the secondary input of the second Venturi device.

42. The hydropower system of any of examples 37 to 41, further comprising any of the features of examples 1-30.

43. A hydropower system for converting potential energy of a fluid into electrical energy, the hydropower system comprising:
an upper reservoir containing a fluid;
a lower reservoir containing the fluid, the lower reservoir positioned at a lower elevation relative to the upper reservoir such that the fluid flows from the upper reservoir to the lower reservoir via gravity;
a fluid conduit configured to direct a primary flow of the fluid between the upper reservoir and the lower reservoir;
a turbine and pump assembly disposed on the fluid conduit, the turbine and pump assembly configured to be driven by the primary flow from the upper reservoir to the lower reservoir and configured to drive the primary flow from the lower reservoir to the upper reservoir;
a generator configured to be driven by the turbine and pump assembly to generate electrical energy;
a first Venturi device disposed on the fluid conduit, the first Venturi device between the upper reservoir and the turbine and pump assembly on the fluid conduit,
wherein the first Venturi device comprises:
an inlet configured to receive the primary flow;
an outlet configured to eject the primary flow; and
a body disposed between the inlet and the outlet, the body comprising:
a converging portion and a diverging portion, wherein a movement of the primary flow through the converging portion and the diverging portion produces a Venturi effect; and
a secondary input disposed between the converging portion and the outlet, the secondary input configured to direct a secondary flow of the fluid into the primary flow at an angle relative to a direction of flow of the primary flow to create a vortex for producing a suction at the inlet to pull the primary flow through the inlet and into the body causing the pressure of the primary flow to increase before ejection through the outlet; and
a first bypass conduit connected to the fluid conduit upstream and downstream of the first Venturi device, the first bypass conduit configured to direct the primary flow around first Venturi device such that the primary flow does not pass through the first Venturi device with the primary flow flowing from the lower reservoir to the upper reservoir via the fluid conduit.

44. The hydropower system of example 43, further comprising a second Venturi device disposed on the fluid conduit, the second Venturi device between the lower reservoir and the turbine and pump assembly on the fluid conduit.

45. The hydropower system of example 44, further comprising a second bypass conduit connected to the fluid conduit upstream and downstream of the second Venturi device, the second bypass conduit configured to direct the primary flow around second Venturi device such that the primary flow does not pass through the second Venturi device with the primary flow flowing from the upper reservoir to the lower reservoir via the fluid conduit.

46. The hydropower system of any of examples 43 to 45, further comprising any of the features of examples 1-30 and 37-41.

47. A hydropower system for converting potential energy of a fluid into electrical energy, the hydropower system comprising:
an upper reservoir containing a fluid;
a lower reservoir containing the fluid, the lower reservoir positioned at a lower elevation relative to the upper reservoir such that the fluid flows from the upper reservoir to the lower reservoir via gravity;
a fluid conduit configured to direct a primary flow of the fluid between the upper reservoir and the lower reservoir;
a turbine and pump assembly disposed on the fluid conduit, the turbine and pump assembly configured to be driven by the primary flow from the upper reservoir to the lower reservoir and configured to drive the primary flow from the lower reservoir to the upper reservoir;
a generator configured to be driven by the turbine and pump assembly to generate electrical energy;
a first Venturi device disposed on the fluid conduit, the first Venturi device between the lower reservoir and the turbine and pump assembly on the fluid conduit,
wherein the first Venturi device comprises:
an inlet configured to receive the primary flow;
an outlet configured to eject the primary flow; and
a body disposed between the inlet and the outlet, the body comprising:
a converging portion and a diverging portion, wherein a movement of the primary flow through the converging portion and the diverging portion produces a Venturi effect; and
a secondary input disposed between the converging portion and the outlet, the secondary input configured to direct a secondary flow of the fluid into the primary flow at an angle relative to a direction of flow of the primary flow to create a vortex for producing a suction at the inlet to pull the primary flow through the inlet and into the body causing the pressure of the primary flow to increase before ejection through the outlet; and
a first bypass conduit connected to the fluid conduit upstream and downstream of the first Venturi device, the first bypass conduit configured to direct the primary flow around first Venturi device such that the primary flow does not pass through the first Venturi device with the primary flow flowing from the upper reservoir to the lower reservoir via the fluid conduit.

48. The hydropower system of example 47, further comprising a second Venturi device disposed on the fluid conduit, the second Venturi device between the upper reservoir and the turbine and pump assembly on the fluid conduit.

49. The hydropower system of example 48, further comprising a second bypass conduit connected to the fluid conduit upstream and downstream of the second Venturi device, the second bypass conduit configured to direct the primary flow around second Venturi device such that the primary flow does not pass through the second Venturi device with the primary flow flowing from the lower reservoir to the upper reservoir via the fluid conduit.

50. The hydropower system of any of examples 47 to 49, further comprising any of the features of examples 1-30 and 37-41.

51. A system for converting potential energy of a fluid into electrical energy, the system comprising:
a fluid conduit configured to direct a primary flow of a fluid between an upper reservoir and a lower reservoir, the lower reservoir positioned at a lower elevation relative to the upper reservoir such that the fluid flows from the upper reservoir to the lower reservoir via gravity;
a turbine and pump assembly disposed on the fluid conduit, the turbine and pump assembly configured to be driven by the primary flow from the upper reservoir to the lower reservoir and configured to drive the primary flow from the lower reservoir to the upper reservoir;
a generator configured to be driven by the turbine and pump assembly to generate electrical energy;
a first Venturi device disposed on the fluid conduit, the first Venturi device between the lower reservoir and the turbine and pump assembly on the fluid conduit,
wherein the first Venturi device comprises:
an inlet configured to receive the primary flow;
an outlet configured to eject the primary flow; and
a body disposed between the inlet and the outlet, the body comprising:
a converging portion and a diverging portion, wherein a movement of the primary flow through the converging portion and the diverging portion produces a Venturi effect; and
a secondary input disposed between the converging portion and the outlet, the secondary input configured to direct a secondary flow of the fluid into the primary flow at an angle relative to a direction of flow of the primary flow to create a vortex for producing a suction at the inlet to pull the primary flow through the inlet and into the body causing the pressure of the primary flow to increase before ejection through the outlet; and
a first bypass conduit connected to the fluid conduit upstream and downstream of the first Venturi device, the first bypass conduit configured to direct the primary flow around first Venturi device such that the primary flow does not pass through the first Venturi device with the primary flow flowing from the upper reservoir to the lower reservoir via the fluid conduit.

52. The system of example 51, further comprising the upper reservoir for containing the fluid.

53. The system of example 52 or 53, further comprising the lower reservoir.

54. The system of any of examples 51 to 53, further comprising any of the features of examples 1-30 and 37-41.

55. A system for converting ambient thermal energy into electrical energy, the system comprising:

a fluid loop configured to circulate a primary flow of a fluid;

a turbine disposed on the fluid loop, the turbine configured to be driven by the primary flow;

a generator configured to be driven by the turbine to generate electrical energy;

a first pump disposed on the fluid loop, the first pump configured to drive the primary flow through the fluid loop;

a cooling coil disposed on the fluid loop, the cooling coil downstream of the turbine and upstream of the first pump on the fluid loop, the cooling coil configured to condense the primary flow exiting the turbine;

a first Venturi device disposed on the fluid loop, the first Venturi device downstream of the first pump and upstream of the turbine on the fluid loop;

a second Venturi device disposed on the fluid loop, the second Venturi device downstream of the turbine and upstream of the first pump on the fluid loop, wherein each of the first and the second Venturi devices comprises:

an inlet configured to receive the primary flow;

an outlet configured to eject the primary flow; and a body disposed between the inlet and the outlet, the body comprising:

a converging portion and a diverging portion, wherein a movement of the primary flow through the converging portion and the diverging portion produces a Venturi effect that decreases a temperature of the primary flow upstream of the diverging portion such that thermal energy from an ambient environment outside the body is transferred to the primary flow; and a secondary input disposed between the converging portion and the outlet, the secondary input configured to direct a secondary flow of the fluid into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase through the diverging portion before ejection through the outlet;

a reservoir tank on the fluid loop, the reservoir tank containing the fluid, the reservoir tank downstream of the second Venturi device and upstream of the first Venturi device;

a first conduit fluidically connected to the reservoir tank and the secondary input of the first Venturi device, the first conduit configured to direct the secondary flow from the primary flow to the secondary input of the first Venturi device;

a second pump disposed on the first conduit, the second pump configured to drive the secondary flow from the primary flow to the secondary input of the first Venturi device; and a heater disposed on the first conduit, the heater downstream of the second pump on the first conduit, the heater configured to heat the secondary flow of the first Venturi device such that the secondary flow at least partially phase shifts from a liquid state to a gas state.

56. The system of example 55, wherein the first Venturi device is configured to heat the primary flow passing through the first Venturi device such that primary flow at least partially phase shifts from the liquid state to the gas state.

57. The system of any of example 55 or 56, wherein the heater comprises one or more solar tubes, the one or more solar tubes configured to heat the secondary flow of the first Venturi device via solar radiation.

58. The system of example 57, wherein the first conduit comprises a solar tube manifold connected to the one or more solar tubes and to transfer heat from the one or more solar tubes to the secondary flow in the first conduit.

59. The system of any of examples 55 to 58, wherein the heater comprises a heater cartridge on the first conduit, the heater cartridge configured to heat the secondary flow in the first conduit.

60. The system of example 59, wherein the heater cartridge is powered by a solar panel assembly configured to generate electricity to heat the heater cartridge.

61. The system of any of examples 55 to 60, wherein the secondary flow of the second Venturi flows from the reservoir to the secondary input of the second Venturi device.

62. The system of example 61, further comprising a second conduit fluidically connected to the reservoir and the secondary input of the second Venturi device, the second conduit configured to direct the secondary flow from the primary flow to the secondary input of the second Venturi device.

63. The system of example 62, further comprising a third pump disposed on the second conduit, the third pump configured to drive the secondary flow from the primary flow to the secondary input of the second Venturi device.

64. The system any of examples 55 to 63, wherein the first and second pumps each comprise a motor that is configured to be powered by at least one of the generator or an external power supply.

65. The system any of examples 55 to 64, wherein the cooling coil is configured to operate using a refrigeration cycle using a refrigerant.

66. The system of example 65, wherein the refrigerant is CO2.

67. The system of any of examples 55 to 66, wherein the fluid loop comprises at least one of tubing or piping.

68. The system of any of examples 55 to 67, wherein the secondary input is adjustable to regulate an input of the secondary flow into the primary flow.

69. The system of any of examples 55 to 68, wherein the secondary input is an annular gap.

70. The system of any of examples 55 to 69, wherein the secondary input is a ring gap.

71. The system of any of examples 55 to 70, wherein the secondary input is configured to distribute the secondary flow throughout the secondary input.

72. The system of any of examples 55 to 71, wherein the secondary input comprises a Coanda surface configured to distribute incoming secondary flow throughout the secondary input.

73. The system of any of examples 55 to 72, wherein the secondary input comprises a Coanda surface.

74. The system of any of examples 55 to 73, wherein the secondary input is configured to encircle the primary flow.

75. The system of any of examples 55 to 74, wherein the secondary input is disposed downstream of the diverging portion.

76. The system of any of examples 55 to 75, wherein the secondary input is disposed between the diverging portion and the outlet.

77. The system of any of examples 55 to 76, wherein the secondary input comprises one or more apertures.

78. The system of any of examples 55 to 77, wherein the secondary input comprises a plurality of apertures.

79. The system of any of examples 55 to 78, wherein the secondary input comprises one or more openings circumferentially distributed about a flow path of the primary flow, the secondary input configured to direct the secondary flow radially inward toward the primary flow.

80. The system of any of examples 55 to 79, further comprising a throat disposed between the converging portion and the diverging portion, the throat comprising a diameter that is smaller than a diameter of the converging portion and a diameter of the diverging portion.

81. The system of any of examples 55 to 80, wherein the secondary input comprises an annular chamber configured to receive and direct the secondary flow.

82. The system of example 81, wherein the annular chamber is configured to encircle the primary flow through the body.

83. A system for converting ambient thermal energy into electrical energy, the system comprising:
- a fluid loop configured to circulate a primary flow of a fluid;
- a turbine disposed on the fluid loop, the turbine configured to be driven by the primary flow;
- a generator configured to be driven by the turbine to generate electrical energy;
- a first pump disposed on the fluid loop, the first pump configured to drive the primary flow through the fluid loop;
- a condenser disposed on the fluid loop, the condenser downstream of the turbine and upstream of the first pump on the fluid loop, the condenser configured to condense the primary flow exiting the turbine;
- a first Venturi device disposed on the fluid loop, the first Venturi device downstream of the first pump and upstream of the turbine on the fluid loop;
- a second Venturi device disposed on the fluid loop, the second Venturi device downstream of the turbine and upstream of the first pump on the fluid loop,
- wherein each of the first and the second Venturi devices comprises:
  - an inlet configured to receive the primary flow;
  - an outlet configured to eject the primary flow; and
  - a body disposed between the inlet and the outlet, the body comprising:
    - a converging portion and a diverging portion, wherein a movement of the primary flow through the converging portion and the diverging portion produces a Venturi effect that decreases a temperature of the primary flow upstream of the diverging portion such that thermal energy from an ambient environment outside the body is transferred to the primary flow; and
    - a secondary input disposed between the converging portion and the outlet, the secondary input configured to direct a secondary flow of the fluid into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase through the diverging portion before ejection through the outlet;
- a first conduit fluidically connected to the fluid loop and the secondary input of the first Venturi device, the first conduit configured to direct the secondary flow from the primary flow to the secondary input of the first Venturi device;
- a second pump disposed on the first conduit, the second pump configured to drive the secondary flow from the primary flow to the secondary input of the first Venturi device; and
- a heater disposed on the first conduit, the heater downstream of the second pump on the first conduit, the heater configured to heat the secondary flow of the first Venturi device such that the secondary flow at least partially phase shifts from a liquid state to a gas state.

84. The system of example 83, further comprising a reservoir tank on the fluid loop, the reservoir tank containing the fluid, the reservoir tank downstream of the second Venturi device and upstream of the first Venturi device.

85. The system of example 83 or 84, wherein the condenser comprises a cooling coil disposed on the first conduit.

86. The system of any of examples 83 to 85, further comprising any of the features of examples 55-82.

87. A system for converting ambient thermal energy into electrical energy, the system comprising:
- a fluid loop configured to circulate a primary flow of a fluid;
- a turbine disposed on the fluid loop, the turbine configured to be driven by the primary flow;
- a generator configured to be driven by the turbine to generate electrical energy;
- a first pump disposed on the fluid loop, the first pump configured to drive the primary flow through the fluid loop;
- a condenser disposed on the fluid loop, the condenser downstream of the turbine and upstream of the first pump on the fluid loop, the condenser configured to condense the primary flow exiting the turbine;
- a first Venturi device disposed on the fluid loop, the first Venturi device downstream of the first pump and upstream of the turbine on the fluid loop,
- wherein the first Venturi device comprises:
  - an inlet configured to receive the primary flow;
  - an outlet configured to eject the primary flow; and
  - a body disposed between the inlet and the outlet, the body comprising:
    - a converging portion and a diverging portion, wherein a movement of the primary flow through the converging portion and the diverging portion produces a Venturi effect that decreases a temperature of the primary flow upstream of the diverging portion such that thermal energy from an ambient environment outside the body is transferred to the primary flow; and
    - a secondary input disposed between the converging portion and the outlet, the secondary input configured to direct a secondary flow of the fluid into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase through the diverging portion before ejection through the outlet;

a first conduit fluidically connected to the fluid loop and the secondary input of the first Venturi device, the first conduit configured to direct the secondary flow from the primary flow to the secondary input of the first Venturi device;

a second pump disposed on the first conduit, the second pump configured to drive the secondary flow from the primary flow to the secondary input of the first Venturi device; and a heater disposed on the first conduit, the heater downstream of the second pump on the first conduit, the heater configured to heat the secondary flow of the first Venturi device such that the secondary flow at least partially phase shifts from a liquid state to a gas state.

88. The system of example 87, further comprising a second Venturi device disposed on the fluid loop, the second Venturi device downstream of the turbine and upstream of the first pump on the fluid loop.

89. The system of example 87 or 88, further comprising any of the features of examples 55-82.

90. A Venturi device, the Venturi device comprising:
an inlet configured to receive a primary flow of a fluid;
an outlet configured to eject the primary flow; and
a body disposed between the inlet and the outlet, the body comprising:
  a body wall comprising a converging portion and a diverging portion, wherein a movement of the primary flow through the converging portion and the diverging portion produces a Venturi effect, pulling the primary flow in through the inlet;
  a reducer connected to the body wall, the reducer connected to the body wall proximate the outlet relative to the inlet;
  a first nozzle disposed at least partially in the diverging portion, the first nozzle extending from the body wall, the first nozzle forming a first annular space between the first nozzle and the body wall, the first nozzle configured to create a first low pressure fluid in the first annular space relative to a high pressure fluid flow of the primary flow flowing through the first nozzle to pull the primary flow through the inlet and into the body, wherein reduction in the high pressure fluid flow of the primary flow through the first nozzle causes the first low pressure fluid to at least partially exit the first annular space for the first low pressure fluid to flow toward the outlet;
  a second nozzle disposed at least partially in the reducer, the second nozzle extending from the body wall, the second nozzle forming a second annular space between the second nozzle and the body wall, the second nozzle configured to create a second low pressure fluid in the second annular space relative to the high pressure fluid flow of the primary flow flowing through the second nozzle to move the primary flow through the outlet, wherein reduction in the high pressure fluid flow of the primary flow through the second nozzle causes the second low pressure fluid to at least partially the second annular space for the second low pressure fluid to flow toward the outlet, wherein the second annular space is larger than the first annular space,
  wherein an end of the second nozzle proximate the outlet relative to the inlet is spaced axially inward from an end of the reducer, the end of the reducer at least partially forming the outlet; and
  a secondary input disposed between the converging portion and the outlet, the secondary input configured to direct a secondary flow of the fluid into the primary flow to create a vortex, pulling the primary flow through the inlet and into the body.

91. The Venturi device of example 90, wherein a smallest cross-sectional flow area of the first nozzle is between ends of the first nozzle such that at least one of the ends of the first nozzle has a larger diameter relative to a diameter at the smallest cross-sectional flow area of the first nozzle.

92. The Venturi device of example 91, wherein both of the ends of the first nozzle have larger diameters relative to the diameter at the smallest cross-sectional flow area of the first nozzle.

93. The Venturi device of any of examples 91 to 92, wherein a smallest cross-sectional flow area of the second nozzle is between ends of the second nozzle such that at least one of the ends of the second nozzle has a larger diameter relative to a diameter at the smallest cross-sectional flow area of the second nozzle.

94. The Venturi device of example 93, wherein both of the ends of the second nozzle have larger diameters relative to the diameter at the smallest cross-sectional flow area of the first nozzle.

95. The Venturi device of any of examples 91 to 94, further comprising a conical interior surface disposed between the diverging portion and the second nozzle, the conical interior surface configured to direct the primary flow toward the outlet, the conical interior surface comprising a cross-sectional flow area that decreases in size toward the outlet.

96. The Venturi device of example 95, wherein the secondary input is configured to direct the secondary flow through the conical interior surface.

97. The Venturi device of example 95, wherein the secondary input is configured to direct the secondary flow between the conical interior surface and the second nozzle.

98. The Venturi device of any of examples 95 to 97, wherein the cross-sectional flow area of the conical interior surface converges to a size that is smaller than a cross-sectional flow area of the converging portion and a cross-sectional flow area of the diverging portion.

99. The Venturi device of any of examples 91 to 98, wherein an axial extent of the first nozzle is less than an axial extent of the diverging portion.

100. The Venturi device of any of examples 91 to 99, wherein an axial extent of the second nozzle is less than an axial extent of the reducer.

101. The Venturi device of any of examples 91 to 100, wherein the first nozzle is connected to the body wall between the converging portion and the diverging portion.

102. The Venturi device of any of examples 91 to 101, wherein the second nozzle is connected to the body wall at a junction between the diverging portion and the reducer.

103. The Venturi device of any of examples 91 to 102, wherein the secondary input is configured to direct the secondary flow of the fluid into the primary flow at an angle relative to a direction of flow of the primary flow.

104. The Venturi device of example 103, wherein the angle is ninety degrees.

105. The Venturi device of example 103, wherein the angle is between 60 and 120 degrees.

106. The Venturi device of any of examples 91 to 105, wherein the secondary input comprises an annular passageway.

107. The Venturi device of any of examples 91 to 106, wherein the secondary input comprises one or more apertures.

108. The Venturi device of any of examples 91 to 107, wherein the secondary input comprises a plurality of apertures.

109. The Venturi device of any of examples 91 to 108, wherein the secondary input comprises an annular gap.

110. The Venturi device of any of examples 91 to 109, wherein the secondary input comprises a ring gap.

111. The Venturi device of any of examples 91 to 110, wherein the secondary input is configured to encircle the primary flow through the body.

112. The Venturi device of any of examples 91 to 111, wherein the secondary input is configured to circumferentially encircle the primary flow through the body.

113. The Venturi device of any of examples 91 to 112, wherein the secondary input comprises one or more openings circumferentially distributed about a flow path of the primary flow, the secondary input configured to direct the secondary flow radially inward toward the primary flow.

114. The Venturi device of any of examples 91 to 113, further comprising a throat disposed between the converging portion and the diverging portion, the throat comprising a diameter that is smaller than a diameter of the converging portion and a diameter of the diverging portion.

115. The Venturi device of any of examples 91 to 114, further comprising an annular chamber configured to receive and direct the secondary flow to the secondary input.

116. The Venturi device of example 115, wherein the annular chamber is configured to encircle the primary flow in the body.

117. The Venturi device of example 115 or 116, wherein the annular chamber comprises a Coanda surface configured to distribute incoming secondary flow throughout the annular chamber.

118. The Venturi device of any of examples 115 to 117, further comprising an annular passageway fluidically connected to the annular chamber, the annular passageway configured to direct the secondary flow from the annular passageway into the primary flow.

119. The Venturi device of any of examples 91 to 118, wherein the secondary input comprises a Coanda surface.

120. The Venturi device of any of examples 91 to 119, further comprising a plurality of secondary inputs.

121. The Venturi device of any of examples 91 to 120, wherein the secondary input is disposed downstream of the diverging portion.

122. The Venturi device of any of examples 91 to 121, wherein the converging portion comprises a cross-sectional flow area that continuously decreases in size in the direction of flow of the primary flow.

123. The Venturi device of any of examples 91 to 122, wherein the diverging portion comprises a cross-sectional flow area that continuously increases in size in the direction of flow of the primary flow.

124. The Venturi device of any of examples 91 to 123, wherein a length of the diverging portion is greater than a length of the converging portion.

125. The Venturi device of any of examples 91 to 124, wherein a cross-sectional flow area of the outlet is smaller than a cross-sectional flow area of the inlet.

126. The Venturi device of any of examples 91 to 125, wherein the converging portion is configured to increase a velocity of the primary flow and decrease a pressure of the primary flow, and wherein the diverging portion is configured to decrease the velocity of the primary flow and increase the pressure of the primary flow.

127. The Venturi device of any of examples 91 to 126, wherein a cross-sectional flow area of the converging portion is circular.

128. The Venturi device of any of examples 91 to 127, wherein the converging portion defines a flow area having a conical shape.

129. The Venturi device of any of examples 91 to 128, wherein a cross-sectional flow area of the diverging portion is circular.

130. The Venturi device of any of examples 91 to 129, wherein the diverging portion defines a flow area having a conical shape.

131. The Venturi device of any of examples 91 to 130, wherein a size of a cross-sectional flow area of the converging portion changes less rapidly than a size of a cross-sectional flow area of the diverging portion per a unit of length.

132. The Venturi device of any of examples 91 to 131, wherein a length of the diverging portion is greater than a length of the converging portion.

133. The Venturi device of any of examples 91 to 132, wherein a cross-sectional flow area of the first nozzle continually changes in size.

134. The Venturi device of any of examples 91 to 133, wherein a cross-sectional flow area of the second nozzle continually changes in size.

135. The Venturi device of any of examples 91 to 134, wherein a cross-sectional flow area at an exit of the first nozzle is substantially the same as a cross-sectional flow area at an exit of the second nozzle.

136. A Venturi device, the Venturi device comprising:
an inlet configured to receive a primary flow of a fluid;
an outlet configured to eject the primary flow; and
a body disposed between the inlet and the outlet, the body comprising:
a body wall comprising a converging portion and a diverging portion, wherein a movement of the primary flow through the converging portion and the diverging portion produces a Venturi effect, pulling the primary flow in through the inlet;
a reducer connected to the body wall, the reducer connected to the body wall proximate the outlet relative to the inlet;
a first nozzle disposed at least partially in the diverging portion, the first nozzle extending from the body wall, the first nozzle forming a first annular space between the first nozzle and the body wall, the first nozzle configured to create a first low pressure fluid in the first annular space relative to a high pressure fluid flow of the primary flow flowing through the first nozzle to pull the primary flow through the inlet and into the body, wherein reduction in the high pressure fluid flow of the primary flow through the first nozzle causes the first low pressure fluid to at least partially exit the first annular space for the first low pressure fluid to flow toward the outlet;
a second nozzle disposed at least partially in the reducer, the second nozzle extending from the body wall, the second nozzle forming a second annular space between the second nozzle and the body wall, the second nozzle configured to create a second low pressure fluid in the second annular space relative to the high pressure fluid flow of the primary flow flowing through the second nozzle to move the primary flow through the outlet, wherein reduction in the high pressure fluid flow of the primary flow through the second nozzle causes the second low pressure fluid to at least partially the second annular space for the second low pressure fluid to flow toward the outlet; and a secondary input disposed between the converging portion and the outlet, the secondary input configured to direct a secondary flow of the fluid into the primary flow to create a vortex, pulling the primary flow through the inlet and into the body.

137. The Venturi device of example 136, wherein the second annular space is larger than the first annular space.

138. The Venturi device of example 136 or 137, wherein an end of the second nozzle proximate the outlet relative to the inlet is spaced axially inward from an end of the reducer, the end of the reducer at least partially forming the outlet.

139. The Venturi device of any of examples 136 to 138, further comprising any of the features recited in examples 90-135.

140. A Venturi device, the Venturi device comprising:
an inlet configured to receive a primary flow of a fluid;
an outlet configured to eject the primary flow; and
a body disposed between the inlet and the outlet, the body comprising:
  a body wall comprising a converging portion and a diverging portion, wherein a movement of the primary flow through the converging portion and the diverging portion produces a Venturi effect, pulling the primary flow in through the inlet;
  a first nozzle extending from the body wall, the first nozzle forming a first annular space between the first nozzle and the body wall, the first nozzle configured to create a first low pressure fluid in the first annular space relative to a high pressure fluid flow of the primary flow flowing through the first nozzle, wherein reduction in the high pressure fluid flow of the primary flow through the first nozzle causes the first low pressure fluid to at least partially exit the first annular space for the first low pressure fluid to flow toward the outlet;
  a second nozzle extending from the body wall, the second nozzle forming a second annular space between the second nozzle and the body wall, the second nozzle configured to create a second low pressure fluid in the second annular space relative to the high pressure fluid flow of the primary flow flowing through the second nozzle, wherein reduction in the high pressure fluid flow of the primary flow through the second nozzle causes the second low pressure fluid to at least partially the second annular space for the second low pressure fluid to flow toward the outlet; and
  a secondary input disposed between the converging portion and the outlet, the secondary input configured to direct a secondary flow of the fluid into the primary flow to create a vortex, pulling the primary flow through the inlet and into the body.

141. The Venturi device of example 140, further comprising a reducer connected to the body wall, the reducer connected to the body wall proximate the outlet relative to the inlet.

142. The Venturi device of example 141, wherein the second nozzle is disposed at least partially in the reducer.

143. The Venturi device of any of examples 140 to 142, wherein first nozzle is disposed at least partially in the diverging portion.

144. The Venturi device of any of examples 140 to 143, further comprising any of the features recited in examples 90-135.

145. A Venturi device, the Venturi device comprising:
an inlet configured to receive a primary flow of a fluid;
an outlet configured to eject the primary flow; and
a body disposed between the inlet and the outlet, the body comprising:
  a body wall comprising a converging portion and a diverging portion, wherein a movement of the primary flow through the converging portion and the diverging portion produces a Venturi effect, pulling the primary flow in through the inlet;
  a nozzle extending from the body wall, the nozzle forming a space between the nozzle and the body wall, the nozzle configured to create a low pressure fluid in the space relative to a high pressure fluid flow of the primary flow flowing through the nozzle, wherein reduction in the high pressure fluid flow of the primary flow through the nozzle causes the low pressure fluid to at least partially exit the annular space for the low pressure fluid to flow toward the outlet; and
  a secondary input disposed between the converging portion and the outlet, the secondary input configured to direct a secondary flow of the fluid into the primary flow to create a vortex, pulling the primary flow through the inlet and into the body.

146. The Venturi device of example 145, wherein the nozzle is disposed at least partially in the diverging portion.

147. The Venturi device of example 145 or 146, further comprising an other nozzle extending from the body wall, the other nozzle forming an other space between the other nozzle and the body wall, the other nozzle configured to create an other low pressure fluid in the other space relative to the high pressure fluid flow of the primary flow flowing through the other nozzle, wherein reduction in the high pressure fluid flow of the primary flow through the other nozzle causes the other low pressure fluid to at least partially exit the other space for the other low pressure fluid to flow toward the outlet.

148. The Venturi device of example 147, further comprising a reducer connected to the body wall, the reducer connected to the body wall proximate the outlet relative to the inlet.

149. The Venturi device of example 148, wherein the other nozzle is disposed at least partially in the reducer.

150. The Venturi device of any of examples 147 to 149, wherein the other space is annular.

151. The Venturi device of any of examples 145 to 150, wherein the space is annular.

152. The Venturi device of any of examples 145 to 151, further comprising any of the features recited in examples 90-135.

153. A forced induction system for a vehicle to induce ambient airflow to generate electrical energy from the ambient airflow, the system comprising:
an intake funnel comprising an inlet, an outlet, and a body disposed between the inlet of the intake funnel and the outlet of the intake funnel, the intake funnel configured to direct an ambient airflow from the inlet of the intake funnel through the body of the intake funnel to the outlet of the intake funnel, the inlet of the intake funnel having a cross-sectional flow area larger than a cross-section flow area of the outlet of the intake funnel, the body of the intake funnel comprising a shape changing portion configured to expand or contract to change a cross-sectional flow area of the body of the intake funnel for the ambient airflow through the body of the intake funnel;
a Venturi device in fluid communication with the intake funnel, the Venturi device comprising:
an inlet of the Venturi device in fluid communication with the outlet of the intake funnel to receive a primary flow of fluid from the outlet of the intake funnel, the primary flow comprising the ambient airflow exiting the outlet of the intake funnel;
an outlet of the Venturi device configured to eject the primary flow; and
a body of the Venturi device disposed between the inlet of the Venturi device and the outlet of the Venturi device, the body of the Venturi device comprising:
a converging portion and a diverging portion, wherein movement of the primary flow through the converging portion and the diverging portion produces a Venturi effect, pulling the primary flow in through the inlet of the Venturi device; and
a secondary input disposed between the converging portion and the outlet, the secondary input configured to direct a secondary flow of fluid into the primary flow to create a vortex for producing a suction at the inlet of the Venturi device to pull the primary flow through the inlet of the Venturi device and into the body of the Venturi device to increase the primary flow through the outlet of the Venturi device;
a turbine comprising an inlet of the turbine and an outlet of the turbine, the inlet of the turbine in fluid communication with the outlet of the Venturi device to receive the primary flow ejected from the outlet of the Venturi device, the turbine configured to be driven by the primary flow ejected from the outlet of the Venturi device;
a generator configured to be driven by the turbine to generate electrical energy;
a bypass conduit in fluid communication with the turbine and the Venturi device, the bypass conduit configured to recirculate the secondary flow from the primary flow flowing through the turbine to the secondary input of the Venturi device;
a passenger cabin duct in fluid communication with the outlet of the turbine to receive the primary flow from the outlet of the turbine, the passenger cabin duct configured to direct the primary flow toward a passenger cabin of a vehicle;
a valve in fluid communication with the outlet of the turbine to receive the primary flow from the outlet of the turbine; and
a bypass duct in fluid communication with the valve, the bypass duct configured to direct the primary flow outside of the vehicle, the valve configured to control flow of the primary flow through the bypass duct.

154. The system of example 153, wherein the shape changing portion is configured to change the cross-sectional flow area of the body of the intake funnel based on a temperature of the ambient airflow through the body of the intake funnel.

155. The system of example 153 or 154, wherein the shape changing portion is configured to change the cross-sectional flow area of the body of the intake funnel based on a pressure of the ambient airflow through the body of the intake funnel.

156. The system of any one of example 153 to 155, wherein the shape changing portion is configured to change the cross-sectional flow area of the body of the intake funnel based on a flow rate of the ambient airflow through the body of the intake funnel.

157. The system of any one of example 153 to 156, wherein the shape changing portion is configured to change the cross-sectional flow area of the body of the intake funnel based on electrical current applied to the shape changing portion.

158. The system of any one of example 153 to 157, wherein the shape changing portion is configured to change the cross-sectional flow area of the body of the intake funnel based on heat applied to the shape changing portion.

159. The system of example 158 further comprising a heating element configured to apply heat to the shape changing portion.

160. The system of example 159, wherein the heating element is disposed on or within a wall of the shape changing portion.

161. The system of example 159 or 160, wherein the heating element is an elastic resistance heater wire positioned along the shape changing portion.

162. The system of any one of example 153 to 161, further comprising a first controller, wherein the first controller is configured to at least one of cause electrical current to be applied to the shape changing portion based on at least one of pressure, temperature, or flow rate of the ambient airflow through the body of the intake funnel or cause heat to be applied to the shape changing portion based on at least one of pressure, temperature, or flow rate of the ambient airflow through the body of the intake funnel.

163. The system of any one of example 153 to 161, wherein the shape changing portion comprises a shape memory material configured to change the cross-sectional flow area of the body of the intake funnel by expanding or contracting to one or more predetermined shapes.

164. The system of example 163, wherein the shape memory material comprises metallic material.

165. The system of example 163 or 164, wherein the shape memory material comprises Nafion.

166. The system of any of examples 163 to 165, wherein the shape memory material comprises Nitinol.

167. The system of any one of example 153 to 166, wherein shape changing portion comprises a pliable material configured to change the cross-sectional flow area of the body of the intake funnel by expanding or contracting.

168. The system of example 167, wherein the pliable material is configured to expand or contract based on a force induced on the pliable material by the ambient airflow through the body of the intake funnel.

169. The system of example 167 or 168, wherein the pliable material comprises piezoelectric material.

170. The system of any one of example 153 to 169, wherein the shape changing portion comprises strips of material configured to expand or contract to change the cross-sectional flow area of the body of the intake funnel.

171. The system of example 170, wherein a longitudinal extent of each of the strips of material is oriented along a central axis the intake funnel.

172. The system of example 170, wherein a longitudinal extent of each of the strips of material is oriented perpendicular to a central axis the intake funnel.

173. The system of any of example 170 to 172, wherein the strips of material are connected to each other to form a continuous inner surface of the body of the intake funnel along which the ambient airflow flows.

174. The system of any of example 170 to 172, wherein the strips of material are spaced apart from each other to form a skeleton or a frame of the body of the intake funnel.

175. The system of any one of example 153 to 174, wherein the body of the intake funnel comprises an elastic polymer encasing the shape changing portion, the elastic polymer configured to expand or contract with the shape changing portion.

176. The system of example 175, wherein the elastic polymer is configured to contain the ambient airflow within the body of the intake funnel.

177. The system of any one of example 153 to 176, wherein the inlet of the intake funnel comprises an expandable ring configured to change in cross-sectional flow area corresponding to expansion or contraction of the shape changing portion, the expandable ring connected to the shape changing portion.

178. The system of example 177, wherein the expandable ring comprises a thick portion comprising a first end and a second end, the expandable ring comprising a thin portion comprising a first end and a second end, the first end of the thin portion connected to the first end of the thick portion, the thick portion comprising an opening at the second end of the thick portion, the second end of the thin portion positioned within the opening and configured to slide relative to the opening of the thick portion as the expandable ring expands or contracts.

179. The system of any one of example 153 to 178, wherein the outlet of the intake funnel comprises a fixed ring, the fixed ring configured to maintain a cross-sectional flow area corresponding to a cross-sectional flow area of the inlet of the Venturi device.

180. The system of any one of example 153 to 179, further comprising a second controller configured to cause electrical energy generated by the generator to flow to a battery of the vehicle based on a charge state of the battery.

181. The system of example 180, further comprising a switch configured to direct or stop flow of electrical energy generated by the generator to the battery of the vehicle, the second controller configured to cause the switch to direct or to stop electrical energy to the battery based on the charge state of the battery.

182. The system of example 180 or 181, wherein the second controller is configured to determine a percentage of range extension accumulated during generation of electrical energy by the generator.

183. The system of any one of example 153 to 182, further comprising a third controller configured to cause the valve to change flow of the primary flow through the bypass duct based on a desired flow of the secondary flow through the bypass conduit.

184. The system of example 183, wherein the third controller is configured to change flow of the primary flow through the bypass duct based on mitigating backpressure on the outlet of the turbine.

185. The system of example 184, wherein the third controller is configured to mitigate backpressure on the outlet of the turbine during startup of the turbine.

186. The system of any one of example 153 to 185, further comprising an other valve in fluid communication with the outlet of the turbine to receive the primary flow from the outlet of the turbine, the other valve configured to control flow of the primary flow through the passenger cabin duct.

187. The system of example 186, further comprising a fourth controller configured to cause the other valve to change flow of the primary flow through the passenger cabin duct based on a flow setting to the passenger cabin of the vehicle.

188. The system of any of examples 162, 180 to 185, or 187, wherein any one of the first, second, third, or fourth controllers is separate from any one of the other of the first, second, third, or fourth controllers.

189. The system of any of examples 162, 180 to 185, or 187, wherein any one of the first, second, third, or fourth controllers and any one of the other of the first, second, third, or fourth controllers are the same controllers.

190. The system of any one of example 153 to 189, wherein the bypass duct is configured to direct the primary flow to an underside of the vehicle.

191. The system of any one of example 153 to 190, further comprising a heater in fluid communication with the passenger cabin duct, the heater configured to heat the primary flow directed to the passenger cabin of the vehicle.

192. The system of example 191, wherein the heater comprises a glow plug.

193. The system of example 191, wherein the heater comprises a resistance heater.

194. The system of any one of example 153 to 193, wherein the secondary input is adjustable to regulate an input of the secondary flow into the primary flow to control a volume of flow of the secondary flow into the secondary input.

195. The system of any one of example 153 to 194, wherein the inlet of the intake funnel faces toward a front of the vehicle to direct the ambient airflow into the inlet of the intake funnel with the vehicle in motion in a forward direction.

196. The system of any one of example 153 to 195, further comprising a fan facing the inlet of the intake funnel, the fan configured to direct air into the inlet of the intake funnel.

197. The system of example 196, wherein the fan is connected to a wheel of the vehicle and configured to be driven by rotation of the wheel of the vehicle.

198. The system of example 196 or 197, wherein the fan is connected to a motor of the vehicle and configured to be driven by operation of the motor of the vehicle.

199. A forced induction system to induce ambient airflow to generate electrical energy from the ambient airflow, the system comprising:
an intake funnel comprising an inlet, an outlet, and a body disposed between the inlet of the intake funnel and the outlet of the intake funnel, the intake funnel configured to direct an ambient airflow from the inlet of the intake funnel through the body of the intake funnel to the outlet of the intake funnel, the inlet of the intake funnel having a cross-sectional flow area larger than a cross-section flow area of the outlet of the intake funnel, the body of the intake funnel comprising a shape changing portion configured to expand or contract to change a cross-sectional flow area of the body of the intake funnel for the ambient airflow through the body of the intake funnel;
a Venturi device in fluid communication with the intake funnel, the Venturi device comprising:
an inlet of the Venturi device in fluid communication with the outlet of the intake funnel to receive a primary flow of fluid from the outlet of the intake funnel, the primary flow comprising the ambient airflow exiting the outlet of the intake funnel;
an outlet of the Venturi device configured to eject the primary flow; and a body of the Venturi device disposed between the inlet of the Venturi device and the outlet of the Venturi device, the body of the Venturi device comprising:
- a converging portion and a diverging portion, wherein movement of the primary flow through the converging portion and the diverging portion produces a Venturi effect, pulling the primary flow in through the inlet of the Venturi device; and
- a secondary input disposed between the converging portion and the outlet, the secondary input configured to direct a secondary flow of fluid into the primary flow to create a vortex for producing a suction at the inlet of the Venturi device to pull the primary flow through the inlet of the Venturi device and into the body of the Venturi device to increase the primary flow through the outlet of the Venturi device;

a turbine comprising an inlet of the turbine and an outlet of the turbine, the inlet of the turbine in fluid communication with the outlet of the Venturi device to receive the primary flow ejected from the outlet of the Venturi device, the turbine configured to be driven by the primary flow ejected from the outlet of the Venturi device;

a generator configured to be driven by the turbine to generate electrical energy; and a bypass conduit in fluid communication with the turbine and the Venturi device, the bypass conduit configured to recirculate the secondary flow from the primary flow flowing through the turbine to the secondary input of the Venturi device.

200. The system of example 199, further comprising a passenger cabin duct in fluid communication with the outlet of the turbine to receive the primary flow from the outlet of the turbine, the passenger cabin duct configured to direct the primary flow toward a passenger cabin of a vehicle.

201. The system of example 199 or 200, further comprising a valve in fluid communication with the outlet of the turbine to receive the primary flow from the outlet of the turbine and comprising a bypass duct in fluid communication with the valve, the bypass duct configured to direct the primary flow away from the turbine, the valve configured to control flow of the primary flow through the bypass duct.

202. The system of any of examples 199 to 201, further comprising any of the features recited in examples 153-198.

203. An induction system for generating electrical energy from fluid flow, the system comprising:

an intake funnel comprising an inlet, an outlet, and a body disposed between the inlet of the intake funnel and the outlet of the intake funnel, the intake funnel configured to direct a fluid flow from the inlet of the intake funnel through the body of the intake funnel to the outlet of the intake funnel, the body of the intake funnel comprising a shape changing portion configured to expand or contract to change a cross-sectional flow area of the body of the intake funnel for the fluid flow through the body of the intake funnel;

a turbine comprising an inlet of the turbine and an outlet of the turbine, the inlet of the turbine in fluid communication with the outlet of the intake funnel to receive the fluid flow from the outlet of intake funnel, the turbine configured to be driven by the fluid flow exiting from the outlet of the intake funnel; and a generator configured to be driven by the turbine to generate electrical energy.

204. The system of example 203, further comprising a Venturi device in fluid communication with the intake funnel, the Venturi device comprising:

an inlet of the Venturi device in fluid communication with the outlet of the intake funnel to receive a primary flow of fluid from the outlet of the intake funnel, the primary flow comprising the fluid flow exiting the outlet of the intake funnel;

an outlet of the Venturi device configured to eject the primary flow to the inlet of the turbine; and a body of the Venturi device disposed between the inlet of the Venturi device and the outlet of the Venturi device, the body of the Venturi device comprising:
- a converging portion and a diverging portion, wherein movement of the primary flow through the converging portion and the diverging portion produces a Venturi effect, pulling the primary flow in through the inlet of the Venturi device; and
- a secondary input disposed between the converging portion and the outlet, the secondary input configured to direct a secondary flow of fluid into the primary flow to create a vortex for producing a suction at the inlet of the Venturi device to pull the primary flow through the inlet of the Venturi device and into the body of the Venturi device to increase the primary flow through the outlet of the Venturi device.

205. The system of example 204, further comprising a bypass conduit in fluid communication with the turbine and the Venturi device, the bypass conduit configured to recirculate the secondary flow from the primary flow flowing through the turbine to the secondary input of the Venturi device.

206. The system of any of examples 203 to 205, wherein the inlet of the intake funnel is configured to entrain ambient air.

207. The system of any of examples 203 to 206, wherein the inlet of the intake funnel has a cross-sectional flow area larger than a cross-section flow area of the outlet of the intake funnel.

208. The system of any of examples 203 to 207, further comprising any of the features recited in examples 153-198.

209. An intake funnel for inducing fluid flow, the intake funnel comprising:

an inlet;

an outlet; and a body disposed between the inlet of the intake funnel and the outlet of the intake funnel, the body comprising a shape changing portion configured to expand or contract to change a cross-sectional flow area of the body of the intake funnel for the fluid flow through the body of the intake funnel, wherein the intake funnel is configured to direct a fluid flow from the inlet of the intake funnel through the body of the intake funnel to the outlet of the intake funnel.

210. A system comprising the intake funnel of example 209, the system comprising a turbine comprising an inlet of the turbine and an outlet of the turbine, the inlet of the turbine in fluid communication with the outlet of the intake funnel to receive the fluid flow exiting the outlet of the intake funnel, the turbine configured to be driven by the fluid flow exiting the outlet of the intake funnel.

211. The system of example 210, further comprising a generator configured to be driven by the turbine to generate electrical energy.

212. The intake funnel of example 209 or the system of example 210 or 211, further comprising any of the features recited in examples 153-198.

213. A cooling system for cooling a motor of a vehicle with ambient airflow, the system comprising:
  a Venturi device comprising:
    an inlet of the Venturi device open to ambient air, the inlet configured to receive a primary flow of fluid, the primary flow comprising ambient air passed into the inlet;
    an outlet of the Venturi device configured to eject the primary flow; and
    a body of the Venturi device disposed between the inlet of the Venturi device and the outlet of the Venturi device, the body of the Venturi device comprising:
      a converging portion and a diverging portion, wherein movement of the primary flow through the converging portion and the diverging portion produces a Venturi effect, pulling the primary flow in through the inlet of the Venturi device; and
      a secondary input disposed between the converging portion and the outlet, the secondary input configured to direct a secondary flow of fluid into the primary flow to create a vortex for producing a suction at the inlet of the Venturi device to pull the primary flow through the inlet of the Venturi device and into the body of the Venturi device to increase the primary flow through the outlet of the Venturi device;
  an air compressor configured to compress ambient air and direct the compressed air into the secondary input of the Venturi device to provide the secondary flow; and
  a cooling duct in fluid communication the outlet of the Venturi device to receive the primary flow ejected from the outlet of the Venturi device, the cooling duct configured to direct the primary flow to a motor of a vehicle to cool the motor, the cooling duct comprising fins configured to direct the primary flow to one or more predetermined portions of the motor.

214. The system of example 213, wherein the cooling duct comprises conduits configured to move the primary flow from the outlet of the Venturi device toward the one or more predetermined portions of the motor, the conduits configured to split the primary flow into two or more fluid flows.

215. The system of example 213 or 214, further comprising a secondary flow duct connecting the air compressor and the secondary input of the Venturi device.

216. The system of any of example 213 to 215, wherein the air compressor is connected to a wheel of the vehicle, the air compressor configured to be driven by rotation of the wheel.

217. The system of any of example 213 to 216, wherein the air compressor is connected to the motor of the vehicle, the air compressor configured to be driven by operation of the motor.

218. A cooling system for cooling a motor of a vehicle with ambient airflow, the system comprising:
  a Venturi device comprising:
    an inlet of the Venturi device open to ambient air, the inlet configured to receive a primary flow of fluid, the primary flow comprising ambient air passed into the inlet;
    an outlet of the Venturi device configured to eject the primary flow; and
    a body of the Venturi device disposed between the inlet of the Venturi device and the outlet of the Venturi device, the body of the Venturi device comprising:
      a converging portion and a diverging portion, wherein movement of the primary flow through the converging portion and the diverging portion produces a Venturi effect, pulling the primary flow in through the inlet of the Venturi device; and
      a secondary input disposed between the converging portion and the outlet, the secondary input configured to direct a secondary flow of fluid into the primary flow to create a vortex for producing a suction at the inlet of the Venturi device to pull the primary flow through the inlet of the Venturi device and into the body of the Venturi device to increase the primary flow through the outlet of the Venturi device; and
  a cooling duct in fluid communication the outlet of the Venturi device to receive the primary flow ejected from the outlet of the Venturi device, the cooling duct configured to direct the primary flow to a motor of a vehicle to cool the motor.

219. The system of example 218, further comprising an air compressor configured to compress ambient air and direct the compressed air into the secondary input of the Venturi device to provide the secondary flow.

220. The system of example 218 or 219, wherein the cooling duct comprises fins configured to direct the primary flow to one or more predetermined portions of the motor.

221. The system of any of examples 218 to 220, further comprising any of the features recited in examples 213-217.

222. A cooling system for cooling with ambient airflow, the system comprising:
  a Venturi device comprising:
    an inlet of the Venturi device open to ambient air, the inlet configured to receive a primary flow of fluid, the primary flow comprising ambient air passed into the inlet;
    an outlet of the Venturi device configured to eject the primary flow, the outlet of the Venturi device configured to direct the primary flow to a component to cool the component; and
    a body of the Venturi device disposed between the inlet of the Venturi device and the outlet of the Venturi device, the body of the Venturi device comprising:
      a converging portion and a diverging portion, wherein movement of the primary flow through the converging portion and the diverging portion produces a Venturi effect, pulling the primary flow in through the inlet of the Venturi device; and
      a secondary input disposed between the converging portion and the outlet, the secondary input configured to direct a secondary flow of fluid into the primary flow to create a vortex for producing a suction at the inlet of the Venturi device to pull the primary flow through the inlet of the Venturi device and into the body of the Venturi device to increase the primary flow through the outlet of the Venturi device.

223. The system of example 222, further comprising a cooling duct in fluid communication the outlet of the Venturi device to receive the primary flow ejected from the outlet of the Venturi device, the cooling duct configured to direct the primary flow to the component to cool the component.

224. The system of example 222 or 223, wherein the component comprises a motor of a vehicle.

225. The system of any of examples 222 to 224, further comprising any of the features recited in examples 213-217.

226. The system of any of example 213 to 225, further comprising an intake funnel comprising an inlet, an outlet, and a body disposed between the inlet of the intake funnel and the outlet of the intake funnel, the intake funnel configured to direct an ambient airflow from the inlet of the intake funnel through the body of the intake funnel to the outlet of the intake funnel, the inlet of the intake funnel having a cross-sectional flow area larger than a cross-section flow area of the outlet of the intake funnel, the body of the intake funnel comprising a shape changing portion configured to expand or contract to change a cross-sectional flow area of the body of the intake funnel for the ambient airflow through the body of the intake funnel.

227. The system of example 226, wherein the shape changing portion is configured to change the cross-sectional flow area of the body of the intake funnel based on a temperature of the ambient airflow through the body of the intake funnel.

228. The system of example 226 or 227, wherein the shape changing portion is configured to change the cross-sectional flow area of the body of the intake funnel based on a pressure of the ambient airflow through the body of the intake funnel.

229. The system of any one of example 226 to 228, wherein the shape changing portion is configured to change the cross-sectional flow area of the body of the intake funnel based on a flow rate of the ambient airflow through the body of the intake funnel.

230. The system of any one of example 226 to 229, wherein the shape changing portion is configured to change the cross-sectional flow area of the body of the intake funnel based on electrical current applied to the shape changing portion.

231. The system of any one of example 226 to 230, wherein the shape changing portion is configured to change the cross-sectional flow area of the body of the intake funnel based on heat applied to the shape changing portion.

232. The system of example 231 further comprising a heating element configured to apply heat to the shape changing portion.

233. The system of example 232, wherein the heating element is disposed on or within a wall of the shape changing portion.

234. The system of example 232 or 233, wherein the heating element is an elastic resistance heater wire positioned along the shape changing portion.

235. The system of any one of example 226 to 234, wherein the shape changing portion comprises a shape memory material configured to change the cross-sectional flow area of the body of the intake funnel by expanding or contracting to one or more predetermined shapes.

236. The system of example 235, wherein the shape memory material comprises metallic material.

237. The system of example 235 or 236, wherein the shape memory material comprises Nafion.

238. The system of any of examples 235 to 237, wherein the shape memory material comprises Nitinol.

239. The system of any one of example 226 to 238, wherein shape changing portion comprises a pliable material configured to change the cross-sectional flow area of the body of the intake funnel by expanding or contracting.

240. The system of example 239, wherein the pliable material is configured to expand or contract based on a force induced on the pliable material by the ambient airflow through the body of the intake funnel.

241. The system of example 239 or 240, wherein the pliable material comprises piezoelectric material.

242. The system of any one of example 226 to 241, wherein the shape changing portion comprises strips of material configured to expand or contract to change the cross-sectional flow area of the body of the intake funnel.

243. The system of example 242, wherein a longitudinal extent of each of the strips of material is oriented along a central axis the intake funnel.

244. The system of example 242, wherein a longitudinal extent of each of the strips of material is oriented perpendicular to a central axis the intake funnel.

245. The system of any of example 242 to 244, wherein the strips of material are connected to each other to form a continuous inner surface of the body of the intake funnel along which the ambient airflow flows.

246. The system of any of example 242 to 244, wherein the strips of material are spaced apart from each other to form a skeleton or a frame of the body of the intake funnel.

247. The system of any one of example 226 to 246, wherein the body of the intake funnel comprises an elastic polymer encasing the shape changing portion, the elastic polymer configured to expand or contract with the shape changing portion.

248. The system of example 247, wherein the elastic polymer is configured to contain the ambient airflow within the body of the intake funnel.

249. The system of any one of example 226 to 248, wherein the inlet of the intake funnel comprises an expandable ring configured to change in cross-sectional flow area corresponding to expansion or contraction of the shape changing portion, the expandable ring connected to the shape changing portion.

250. The system of example 249, wherein the expandable ring comprises a thick portion comprising a first end and a second end, the expandable ring comprising a thin portion comprising a first end and a second end, the first end of the thin portion connected to the first end of the thick portion, the thick portion comprising an opening at the second end of the thick portion, the second end of the thin portion positioned within the opening and configured to slide relative to the opening of the thick portion as the expandable ring expands or contracts.

251. The system of any one of example 226 to 250, wherein the outlet of the intake funnel comprises a fixed ring, the fixed ring configured to maintain a cross-sectional flow area corresponding to a cross-sectional flow area of the inlet of the Venturi device.

252. A Venturi device, the Venturi device comprising:
an inlet configured to receive a primary flow of a fluid;
an outlet configured to eject the primary flow; and
a body disposed between the inlet and the outlet, the body comprising:
a body wall comprising a converging portion and a diverging portion, wherein a movement of the primary flow through the converging portion and the diverging portion produces a Venturi effect, pulling the primary flow in through the inlet;
a first funnel disposed at least partially in the converging portion, the first funnel extending from the body wall toward a central axis of the body, the first funnel forming a first annular space between the first funnel and the body wall, the first funnel configured to create a first low pressure fluid in the first annular space relative to a high pressure fluid flow of the primary flow flowing through the first funnel to pull the primary flow through the inlet and into the body, wherein reduction in the high pressure fluid flow of the primary flow through the first funnel causes the first low pressure fluid to at least partially exit the first annular space for the first low pressure fluid to flow toward the outlet;

a second funnel disposed at least partially in the diverging portion, the second funnel extending from the body wall toward the central axis of the body, the second funnel forming a second annular space between the second funnel and the body wall, the second funnel configured to create a second low pressure fluid in the second annular space relative to the high pressure fluid flow of the primary flow flowing through the second funnel to pull the primary flow through the inlet and into the body, wherein reduction in the high pressure fluid flow of the primary flow through the second funnel causes the second low pressure fluid to at least partially exit the second annular space for the second low pressure fluid to flow toward the outlet, wherein the second annular space is larger than the first annular space;

a secondary input disposed between the converging portion and the outlet, the secondary input configured to direct a secondary flow of the fluid into the primary flow to create a vortex, pulling the primary flow through the inlet and into the body; and a conical interior surface disposed downstream of the secondary input relative to the primary flow of the fluid, the conical interior surface configured to direct the primary flow toward the outlet, the conical interior surface comprising a cross-sectional flow area that increases in size toward the outlet.

253. The Venturi device of example 252, wherein the cross-sectional flow area of the conical interior surface increases up to the outlet.

254. The Venturi device of any of example 252 or 253, wherein the conical interior surface is a first conical interior surface and further comprising a second conical interior surface disposed between the diverging portion and the first conical interior surface, the second conical interior surface configured to direct the primary flow toward the outlet, the second conical interior surface comprising a cross-sectional flow area that decreases in size toward the outlet.

255. The Venturi device of example 254, wherein the secondary input is configured to direct the secondary flow through the second conical interior surface.

256. The Venturi device of example 254 or 255, wherein the secondary input is configured to direct the secondary flow between the first conical interior surface and the second conical interior surface.

257. The Venturi device of any of examples 254 to 256, wherein the cross-sectional flow area of the second conical interior surface converges to a size that is smaller than a cross-sectional flow area of the converging portion and a cross-sectional flow area of the diverging portion.

258. The Venturi device of any of examples 252 to 257, wherein an axial extent of the first funnel is substantially equal to an axial extent of the converging portion along the central axis.

259. The Venturi device of any of examples 252 to 258, wherein an axial extent of the second funnel is less than an axial extent of the diverging portion along the central axis.

260. The Venturi device of example 259, wherein the axial extent of the second funnel is half the axial extent of the diverging portion along the central axis.

261. The Venturi device of any of examples 252 to 260, wherein the first funnel is connected to the body wall at the inlet.

262. The Venturi device of any of examples 252 to 261, wherein the second funnel is connected to the body wall between the converging portion and the diverging portion.

263. The Venturi device of any of examples 252 to 263, wherein the secondary input is configured to direct the secondary flow of the fluid into the primary flow at an angle relative to a direction of flow of the primary flow.

264. The Venturi device of example 263, wherein the angle is ninety degrees.

265. The Venturi device of example 263, wherein the angle is between 60 and 120 degrees.

266. The Venturi device of any of examples 252 to 265, wherein the secondary input comprises an annular passageway.

267. The Venturi device of any of examples 252 to 265, wherein the secondary input comprises one or more apertures.

268. The Venturi device of any of examples 252 to 265, wherein the secondary input comprises a plurality of apertures.

269. The Venturi device of any of examples 252 to 268, wherein the secondary input comprises an annular gap.

270. The Venturi device of any of examples 252 to 269, wherein the secondary input comprises a ring gap.

271. The Venturi device of any of examples 252 to 270, wherein the secondary input is configured to encircle the primary flow through the body.

272. The Venturi device of any of examples 252 to 271, wherein the secondary input is configured to circumferentially encircle the primary flow through the body.

273. The Venturi device of any of examples 252 to 272, wherein the secondary input comprises one or more openings circumferentially distributed about a flow path of the primary flow, the secondary input configured to direct the secondary flow radially inward toward the primary flow.

274. The Venturi device of any of examples 252 to 273, further comprising a throat disposed between the converging portion and the diverging portion, the throat comprising a diameter that is smaller than a diameter of the converging portion and a diameter of the diverging portion.

275. The Venturi device of any of examples 252 to 275, further comprising an annular chamber configured to receive and direct the secondary flow to the secondary input.

276. The Venturi device of example 275, wherein the annular chamber is configured to encircle the primary flow in the body.

277. The Venturi device of example 275 or 276, wherein the annular chamber comprises a Coanda surface configured to distribute incoming secondary flow throughout the annular chamber.

278. The Venturi device of any of examples 275 to 277, further comprising an annular passageway fluidically connected to the annular chamber, the annular passageway configured to direct the secondary flow from the annular passageway into the primary flow.

279. The Venturi device of any of examples 252 to 278, wherein the secondary input comprises a Coanda surface.

280. The Venturi device of any of examples 252 to 279, further comprising a plurality of secondary inputs.

281. The Venturi device of any of examples 252 to 280, wherein the secondary input is disposed downstream of the diverging portion.

282. The Venturi device of any of examples 252 to 281, wherein the converging portion comprises a cross-sectional flow area that continuously decreases in size in the direction of flow of the primary flow.

283. The Venturi device of any of examples 252 to 282, wherein the diverging portion comprises a cross-sectional flow area that continuously increases in size in the direction of flow of the primary flow.

284. The Venturi device of any of examples 252 to 283, wherein a length of the diverging portion is greater than a length of the converging portion.

285. The Venturi device of any of examples 252 to 284, wherein a cross-sectional flow area of the outlet is smaller than a cross-sectional flow area of the inlet.

286. The Venturi device of any of examples 252 to 285, wherein the converging portion is configured to increase a velocity of the primary flow and decrease a pressure of the primary flow, and wherein the diverging portion is configured to decrease the velocity of the primary flow and increase the pressure of the primary flow.

287. The Venturi device of any of examples 252 to 286, wherein the cross-sectional flow area of the converging portion is circular.

288. The Venturi device of any of examples 252 to 287, wherein the converging portion defines a flow area having a conical shape.

289. The Venturi device of any of examples 252 to 288, wherein the cross-sectional flow area of the diverging portion is circular.

290. The Venturi device of any of examples 252 to 289, wherein the diverging portion defines a flow area having a conical shape.

291. The Venturi device of any of examples 252 to 290, wherein a size of a cross-sectional flow area of the converging portion changes more rapidly than a size of a cross-sectional flow area of the diverging portion per a unit of length.

292. The Venturi device of any of examples 252 to 291, wherein a length of the diverging portion is greater than a length of the converging portion.

293. The Venturi device of any of examples 252 to 292, wherein a cross-sectional flow area of the first funnel continually decreases in size toward the central axis in the direction of flow of the primary fluid.

294. The Venturi device of any of examples 252 to 293, wherein a cross-sectional flow area of the second funnel continually decreases in size toward the central axis in the direction of flow of the primary fluid.

295. The Venturi device of any of examples 252 to 294, wherein a cross-sectional flow area at an exit of the first funnel is substantially the same as a cross-sectional flow area at an exit of the second funnel.

296. A Venturi device, the Venturi device comprising:
an inlet configured to receive a primary flow of a fluid;
an outlet configured to eject the primary flow; and
a body disposed between the inlet and the outlet, the body comprising:
a body wall comprising a converging portion and a diverging portion, wherein a movement of the primary flow through the converging portion and the diverging portion produces a Venturi effect, pulling the primary flow in through the inlet;
a first funnel disposed at least partially in the converging portion, the first funnel extending from the body wall toward a central axis of the body, the first funnel forming a first annular space between the first funnel and the body wall, the first funnel configured to create a first low pressure fluid in the first annular space relative to a high pressure fluid flow of the primary flow flowing through the first funnel, wherein reduction in the high pressure fluid flow of the primary flow through the first funnel causes the first low pressure fluid to at least partially exit the first annular space for the first low pressure fluid to flow toward the outlet;
a second funnel disposed at least partially in the diverging portion, the second funnel extending from the body wall toward the central axis of the body, the second funnel forming a second annular space between the second funnel and the body wall, the second funnel configured to create a second low pressure fluid in the second annular space relative to the high pressure fluid flow of the primary flow flowing through the second funnel, wherein reduction in the high pressure fluid flow of the primary flow through the second funnel causes the second low pressure fluid to at least partially exit the second annular space for the second low pressure fluid to flow toward the outlet; and
a secondary input disposed between the converging portion and the outlet, the secondary input configured to direct a secondary flow of the fluid into the primary flow to create a vortex, pulling the primary flow through the inlet and into the body.

297. The Venturi device of example 296, further comprising a conical interior surface disposed downstream of the secondary input relative to the primary flow of the fluid, the conical interior surface configured to direct the primary flow toward the outlet, the conical interior surface comprising a cross-sectional flow area that increases in size toward the outlet.

298. The Venturi device of example 296 or 297, wherein the second annular space is larger than the first annular space 299. The Venturi device of any of examples 296 to 298, further comprising any of the features recited in examples 252-295.

300. A Venturi device, the Venturi device comprising:
an inlet configured to receive a primary flow of a fluid;
an outlet configured to eject the primary flow; and
a body disposed between the inlet and the outlet, the body comprising:
a body wall comprising a converging portion and a diverging portion, wherein a movement of the primary flow through the converging portion and the diverging portion produces a Venturi effect, pulling the primary flow in through the inlet;
a funnel extending from the body wall toward a central axis of the body, the funnel forming a space between the funnel and the body wall, the funnel configured to create a low pressure fluid in the space relative to a high pressure fluid flow of the primary flow flowing through the funnel, wherein reduction in the high pressure fluid flow of the primary flow through the funnel causes the low pressure fluid to at least partially exit the space for the low pressure fluid to flow toward the outlet; and
a secondary input disposed between the converging portion and the outlet, the secondary input configured to direct a secondary flow of the fluid into the primary flow to create a vortex, pulling the primary flow through the inlet and into the body.

301. The Venturi device of example 300, wherein the funnel is disposed at least partially in the converging portion.

302. The Venturi device of example 300 or 301, further comprising an other funnel extending from the body wall toward the central axis of the body, the other funnel forming an other space between the other funnel and the body wall, the other funnel configured to create an other low pressure fluid in the other space relative to the high pressure fluid flow of the primary flow flowing through the other funnel, wherein reduction in the high pressure fluid flow of the primary flow through the other funnel causes the other low pressure fluid to at least partially exit the other space for the other low pressure fluid to flow toward the outlet.

303. The Venturi device of example 302, wherein the other funnel is disposed at least partially in the diverging portion.

304. The Venturi device of example 302 or 303, wherein the other space is annular.

305. The Venturi device of any of examples 300 to 304, wherein the space is annular.

306. The Venturi device of any of examples 300 to 305, further comprising any of the features recited in examples 252-295.

307. The hydropower system of any of examples 1 to 30, further comprising any of the features recited in examples 90-152.

308. The hydropower system of any of examples 31 to 33, further comprising any of the features recited in examples 90-152.

309. The hydropower system of any of examples 34 to 36, further comprising any of the features recited in examples 90-152.

310. The hydropower system of any of examples 37 to 42, further comprising any of the features recited in examples 90-152.

311. The hydropower system of any of examples 43 to 46, further comprising any of the features recited in examples 90-152.

312. The hydropower system of any of examples 47 to 50 further comprising any of the features recited in examples 90-152.

313. The system of any of examples 51 to 54, further comprising any of the features recited in examples 90-152.

314. The system of any of examples 55 to 82, further comprising any of the features recited in examples 90-152.

315. The system of any of examples 83 to 86, further comprising any of the features recited in examples 90-152.

316. The system of any of examples 87 to 89, further comprising any of the features recited in examples 90-152.

317. The systems of any of examples 55 to 89, wherein the fluid comprises copper-propylene glycol.

318. The forced induction system of any of examples 153 to 198, further comprising any of the features recited in examples 90-152.

319. The forced induction system of any of examples 199 to 202, further comprising any of the features recited in examples 90-152.

320. The induction system of any of examples 203 to 208, further comprising any of the features recited in examples 90-152.

321. The intake funnel of any of examples 209 to 212, further comprising any of the features recited in examples 90-152.

322. The cooling systems of any of examples 213 to 251, further comprising any of the features recited in examples 90-152.

323. The hydropower system of any of examples 1 to 30, further comprising any of the features recited in examples 252-306.

324. The hydropower system of any of examples 31 to 33, further comprising any of the features recited in examples 252-306.

325. The hydropower system of any of examples 34 to 36, further comprising any of the features recited in examples 252-306.

326. The hydropower system of any of examples 37 to 42, further comprising any of the features recited in examples 252-306.

327. The hydropower system of any of examples 43 to 46, further comprising any of the features recited in examples 252-306.

328. The hydropower system of any of examples 47 to 50 further comprising any of the features recited in examples 252-306.

329. The system of any of examples 51 to 54, further comprising any of the features recited in examples 252-306.

330. The system of any of examples 55 to 82, further comprising any of the features recited in examples 252-306.

331. The system of any of examples 83 to 86, further comprising any of the features recited in examples 252-306.

332. The system of any of examples 87 to 89, further comprising any of the features recited in examples 252-306.

333. The forced induction system of any of examples 153 to 198, further comprising any of the features recited in examples 252-306.

334. The forced induction system of any of examples 199 to 202, further comprising any of the features recited in examples 252-306.

335. The induction system of any of examples 203 to 208, further comprising any of the features recited in examples 252-306.

336. The intake funnel of any of examples 209 to 212, further comprising any of the features recited in examples 252-306.

337. The cooling systems of any of examples 213 to 251, further comprising any of the features recited in examples 252-306.

Terminology

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain configurations include or do not include, certain features, elements, and/or steps. Thus, such conditional language is not generally intended to imply that features, elements, and/or steps are in any way required for one or more configurations.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain configurations require the presence of at least one of X, at least one of Y, and at least one of Z.

Some configurations have been described in connection with the accompanying drawings. Components can be added, removed, and/or rearranged. Orientation references such as, for example, "top" and "bottom" are for ease of discussion and may be rearranged such that top features are proximate the bottom and bottom features are proximate the top. Further, the disclosure herein of any particular feature, aspect, method, property, characteristic, quality, attribute, element, or the like in connection with various configurations can be used in all other configurations set forth herein. Additionally, it will be recognized that any methods described herein may be practiced using any device suitable for performing the recited steps.

In summary, various configurations and examples of energy converting devices and methods have been disclosed. Although the systems and methods have been disclosed in the context of those configurations and examples, it will be understood by those skilled in the art that this disclosure extends beyond the specifically disclosed configurations to other alternative configurations and/or other uses of the configurations, as well as to certain modifications and equivalents thereof. This disclosure expressly contemplates that various features and aspects of the disclosed configurations can be combined with, or substituted for, one another. Accordingly, the scope of this disclosure should not be limited by the particular disclosed configurations described above, but should be determined only by a fair reading of the claims that follow.

What is claimed is:

1. A system for converting ambient thermal energy into electrical energy, the system comprising:
    a fluid loop configured to circulate a primary flow of a fluid;
    a turbine disposed on the fluid loop, the turbine configured to be driven by the primary flow;
    a generator configured to be driven by the turbine to generate electrical energy;
    a first pump disposed on the fluid loop, the first pump configured to drive the primary flow through the fluid loop;
    a cooling coil disposed on the fluid loop, the cooling coil downstream of the turbine and upstream of the first pump on the fluid loop, the cooling coil configured to condense the primary flow exiting the turbine;
    a first Venturi device disposed on the fluid loop, the first Venturi device downstream of the first pump and upstream of the turbine on the fluid loop;
    a second Venturi device disposed on the fluid loop, the second Venturi device downstream of the turbine and upstream of the first pump on the fluid loop,
    wherein each of the first and the second Venturi devices comprises:
        an inlet configured to receive the primary flow;
        an outlet configured to eject the primary flow; and
        a body disposed between the inlet and the outlet, the body comprising:
            a converging portion and a diverging portion, wherein a movement of the primary flow through the converging portion and the diverging portion produces a Venturi effect that decreases a temperature of the primary flow upstream of the diverging portion such that thermal energy from an ambient environment outside the body is transferred to the primary flow; and
            a secondary input disposed between the converging portion and the outlet, the secondary input configured to direct a secondary flow of the fluid into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase through the diverging portion before ejection through the outlet;
    a reservoir tank on the fluid loop, the reservoir tank containing the fluid, the reservoir tank downstream of the second Venturi device and upstream of the first Venturi device;
    a first conduit fluidically connected to the reservoir tank and the secondary input of the first Venturi device, the first conduit configured to direct the secondary flow from the primary flow to the secondary input of the first Venturi device;
    a second pump disposed on the first conduit, the second pump configured to drive the secondary flow from the primary flow to the secondary input of the first Venturi device; and
    a heater disposed on the first conduit, the heater downstream of the second pump on the first conduit, the heater configured to heat the secondary flow of the first Venturi device such that the secondary flow at least partially phase shifts from a liquid state to a gas state.

2. The system of claim 1, wherein the first Venturi device is configured to heat the primary flow passing through the first Venturi device such that primary flow at least partially phase shifts from the liquid state to the gas state.

3. The system of claim 1, wherein the heater comprises one or more solar tubes, the one or more solar tubes configured to heat the secondary flow of the first Venturi device via solar radiation.

4. The system of claim 3, wherein the first conduit comprises a solar tube manifold connected to the one or more solar tubes and to transfer heat from the one or more solar tubes to the secondary flow in the first conduit.

5. The system of claim 1, wherein the heater comprises a heater cartridge on the first conduit, the heater cartridge configured to heat the secondary flow in the first conduit.

6. The system of claim 5, wherein the heater cartridge is powered by a solar panel assembly configured to generate electricity to heat the heater cartridge.

7. The system of claim 1, wherein the first and second pumps each comprise a motor that is configured to be powered by at least one of the generator or an external power supply.

8. The system of claim 1, wherein the cooling coil is configured to operate using a refrigeration cycle using a refrigerant.

9. The system of claim 8, wherein the refrigerant is CO2.

10. A system for converting ambient thermal energy into electrical energy, the system comprising:
    a fluid loop configured to circulate a primary flow of a fluid;
    a turbine disposed on the fluid loop, the turbine configured to be driven by the primary flow;
    a generator configured to be driven by the turbine to generate electrical energy;

a first pump disposed on the fluid loop, the first pump configured to drive the primary flow through the fluid loop;

a condenser disposed on the fluid loop, the condenser downstream of the turbine and upstream of the first pump on the fluid loop, the condenser configured to condense the primary flow exiting the turbine;

a first Venturi device disposed on the fluid loop, the first Venturi device downstream of the first pump and upstream of the turbine on the fluid loop;

a second Venturi device disposed on the fluid loop, the second Venturi device downstream of the turbine and upstream of the first pump on the fluid loop, wherein each of the first and the second Venturi devices comprises:
 an inlet configured to receive the primary flow;
 an outlet configured to eject the primary flow; and
 a body disposed between the inlet and the outlet, the body comprising:
  a converging portion and a diverging portion, wherein a movement of the primary flow through the converging portion and the diverging portion produces a Venturi effect that decreases a temperature of the primary flow upstream of the diverging portion such that thermal energy from an ambient environment outside the body is transferred to the primary flow; and
  a secondary input disposed between the converging portion and the outlet, the secondary input configured to direct a secondary flow of the fluid into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase through the diverging portion before ejection through the outlet;

a first conduit fluidically connected to the fluid loop and the secondary input of the first Venturi device, the first conduit configured to direct the secondary flow from the primary flow to the secondary input of the first Venturi device;

a second pump disposed on the first conduit, the second pump configured to drive the secondary flow from the primary flow to the secondary input of the first Venturi device; and a heater disposed on the first conduit, the heater downstream of the second pump on the first conduit, the heater configured to heat the secondary flow of the first Venturi device such that the secondary flow at least partially phase shifts from a liquid state to a gas state.

11. The system of claim 10, further comprising a reservoir tank on the fluid loop, the reservoir tank containing the fluid, the reservoir tank downstream of the second Venturi device and upstream of the first Venturi device.

12. The system of claim 11, wherein the secondary flow of the second Venturi flows from the reservoir to the secondary input of the second Venturi device.

13. The system of claim 12, further comprising a second conduit fluidically connected to the reservoir and the secondary input of the second Venturi device, the second conduit configured to direct the secondary flow from the primary flow to the secondary input of the second Venturi device.

14. The system of claim 13, further comprising a third pump disposed on the second conduit, the third pump configured to drive the secondary flow from the primary flow to the secondary input of the second Venturi device.

15. The system of claim 10, wherein the condenser comprises a cooling coil disposed on the first conduit.

16. The system of claim 10, wherein the secondary input is configured to distribute the secondary flow throughout the secondary input.

17. A system for converting ambient thermal energy into electrical energy, the system comprising:
 a fluid loop configured to circulate a primary flow of a fluid;
 a turbine disposed on the fluid loop, the turbine configured to be driven by the primary flow;
 a generator configured to be driven by the turbine to generate electrical energy;
 a first pump disposed on the fluid loop, the first pump configured to drive the primary flow through the fluid loop;
 a condenser disposed on the fluid loop, the condenser downstream of the turbine and upstream of the first pump on the fluid loop, the condenser configured to condense the primary flow exiting the turbine;
 a first Venturi device disposed on the fluid loop, the first Venturi device downstream of the first pump and upstream of the turbine on the fluid loop,
 wherein the first Venturi device comprises:
  an inlet configured to receive the primary flow;
  an outlet configured to eject the primary flow; and
  a body disposed between the inlet and the outlet, the body comprising:
   a converging portion and a diverging portion, wherein a movement of the primary flow through the converging portion and the diverging portion produces a Venturi effect that decreases a temperature of the primary flow upstream of the diverging portion such that thermal energy from an ambient environment outside the body is transferred to the primary flow; and
   a secondary input disposed between the converging portion and the outlet, the secondary input configured to direct a secondary flow of the fluid into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase through the diverging portion before ejection through the outlet;
 a first conduit fluidically connected to the fluid loop and the secondary input of the first Venturi device, the first conduit configured to direct the secondary flow from the primary flow to the secondary input of the first Venturi device;
 a second pump disposed on the first conduit, the second pump configured to drive the secondary flow from the primary flow to the secondary input of the first Venturi device; and a heater disposed on the first conduit, the heater downstream of the second pump on the first conduit, the heater configured to heat the secondary flow of the first Venturi device such that the secondary flow at least partially phase shifts from a liquid state to a gas state.

18. The system of claim 17, further comprising a second Venturi device disposed on the fluid loop, the second Venturi device downstream of the turbine and upstream of the first pump on the fluid loop.

19. The system of claim 17, wherein the fluid loop comprises at least one of tubing or piping.

20. The system of claim 17, wherein the secondary input is adjustable to regulate an input of the secondary flow into the primary flow.

* * * * *